United States Patent [19]
Morehouse et al.

[11] Patent Number: 5,442,266
[45] Date of Patent: Aug. 15, 1995

[54] MINIATURE DISK DRIVE WITH SPIN MOTOR CONTROL SYSTEM

[75] Inventors: James H. Morehouse, Jamestown; Steven B. Volk, Boulder; Michael R. Utenick, Englewood; John H. Blagaila, Boulder, all of Colo.

[73] Assignee: Intégral Peripherals, Inc., Boulder, Colo.

[21] Appl. No.: 121,847

[22] Filed: Sep. 14, 1993

Related U.S. Application Data

[62] Division of Ser. No. 629,948, Dec. 19, 1990.

[51] Int. Cl.⁶ .............................................. H02P 1/00
[52] U.S. Cl. .................... 318/272; 318/138; 318/439; 318/254
[58] Field of Search ................ 38/254, 138, 439, 272; 369/228, 233

[56] References Cited

U.S. PATENT DOCUMENTS

| | | |
|---|---|---|
| 3,531,788 | 9/1970 | Brown et al. |
| 3,629,675 | 12/1971 | Porath |
| 3,670,189 | 6/1972 | Monroe |
| 3,984,873 | 10/1976 | Pejcha |
| 4,488,187 | 12/1984 | Alaimo |
| 4,492,903 | 1/1985 | Knight et al. |
| 4,518,904 | 5/1985 | MacLeod |
| 4,535,374 | 8/1985 | Anderson et al. |
| 4,536,691 | 8/1985 | Sakakibara |
| 4,553,183 | 11/1985 | Brown et al. |
| 4,568,988 | 2/1986 | McGinlay et al. |
| B1 4,568,988 | 11/1988 | McGinlay et al. |
| 4,630,190 | 12/1986 | Alaimo |
| 4,638,383 | 1/1987 | McGinlay et al. |
| B1 4,638,383 | 11/1988 | McGinlay et al. |
| 4,737,867 | 4/1988 | Ishikawa et al. |
| 4,748,385 | 5/1988 | Van Hout |
| 4,750,059 | 6/1988 | Syracuse |
| 4,772,974 | 9/1988 | Moon et al. |

(List continued on next page.)

FOREIGN PATENT DOCUMENTS

| | | |
|---|---|---|
| WO91/02349 | 2/1991 | WIPO |
| WO91/02354 | 2/1991 | WIPO |
| WO91/06094 | 5/1991 | WIPO |
| WO91/06096 | 5/1991 | WIPO |

OTHER PUBLICATIONS

Publication entitled "Quantum Low Power Products: Go Drive-2 ½-inch Hard Disk Drives, ProDrive Gem Series-3 ½-inch Small Frame Drives, Technical Highlights", Sep. 1990, pp. 1-5, Quantum Corp., 1804 McCarthy Blvd., Milpitas, Calif.

Brochure entitled "Quantum Go Drive Series" comprising three pages, date and the place of publication unknown.

*Primary Examiner*—William M. Shoop, Jr.
*Assistant Examiner*—Karen Masih
*Attorney, Agent, or Firm*—Skjerven, Morrill, MacPherson, Franklin & Friel; David W. Heid

[57] ABSTRACT

Disclosed is a disk drive information storage device having a housing and a disk means for recording and reproducing information. The disk drive information storage device utilizes a spin motor control system having a start-up control circuit which includes a counter and is programmable to accommodate for changing system parameters. The start-up control circuit does not require an external capacitor and provides stable generation of the start-up pulses. The spin motor control system also includes a BEMF commutation circuit which operates utilizing digital techniques. The BEMF commutation circuit includes first and second counters that are programmable to accommodate for changing system parameters. In one embodiment, the housing has a first external dimension of about 51 mm. In another embodiment, the disk means has a diameter in the range of from about 45 mm to about 50 mm.

31 Claims, 43 Drawing Sheets

U.S. PATENT DOCUMENTS

| | | |
|---|---|---|
| 4,780,866 | 10/1988 | Syracuse . |
| 4,783,705 | 11/1988 | Moon et al. . |
| 4,794,293 | 12/1988 | Fujisaki et al. . |
| 4,819,218 | 4/1989 | Barnard . |
| 4,825,321 | 4/1989 | Hassel et al. . |
| 4,831,469 | 5/1989 | Hanson et al. . |
| 4,839,756 | 6/1989 | Chew et al. . |
| 4,858,034 | 8/1989 | Hassel et al. . |
| 4,864,437 | 9/1989 | Couse et al. . |
| 4,876,491 | 10/1989 | Squires et al. . |
| 4,894,734 | 1/1990 | Fischler . |
| 4,928,043 | 5/1990 | Plunkett ............................... 318/254 |
| 4,933,785 | 6/1990 | Morehouse et al. . |
| 4,963,801 | 10/1990 | Yamazaki ............................ 318/254 |
| 4,965,684 | 10/1990 | Stefansky . |
| 4,979,055 | 12/1990 | Squires et al. . |
| 4,979,056 | 12/1990 | Squires et al. . |
| 4,987,355 | 1/1991 | Leaper et al. . |
| 5,001,578 | 5/1991 | Yamauchi . |
| 5,016,124 | 5/1991 | Fukushima et al. . |
| 5,017,845 | 5/1991 | Carobolante et al. . |
| 5,023,527 | 6/1991 | Erdman et al. . |
| 5,025,335 | 6/1991 | Stefansky . |
| 5,025,336 | 6/1991 | Morehouse et al. . |
| 5,027,241 | 6/1991 | Hatch et al. . |
| 5,030,864 | 7/1991 | Van Hout et al. . |
| 5,047,876 | 9/1991 | Genheimer et al. . . |
| 5,050,013 | 9/1991 | Holsinger . |
| 5,050,014 | 9/1991 | Maeda et al. . |
| 5,050,016 | 9/1991 | Squires et al. . |

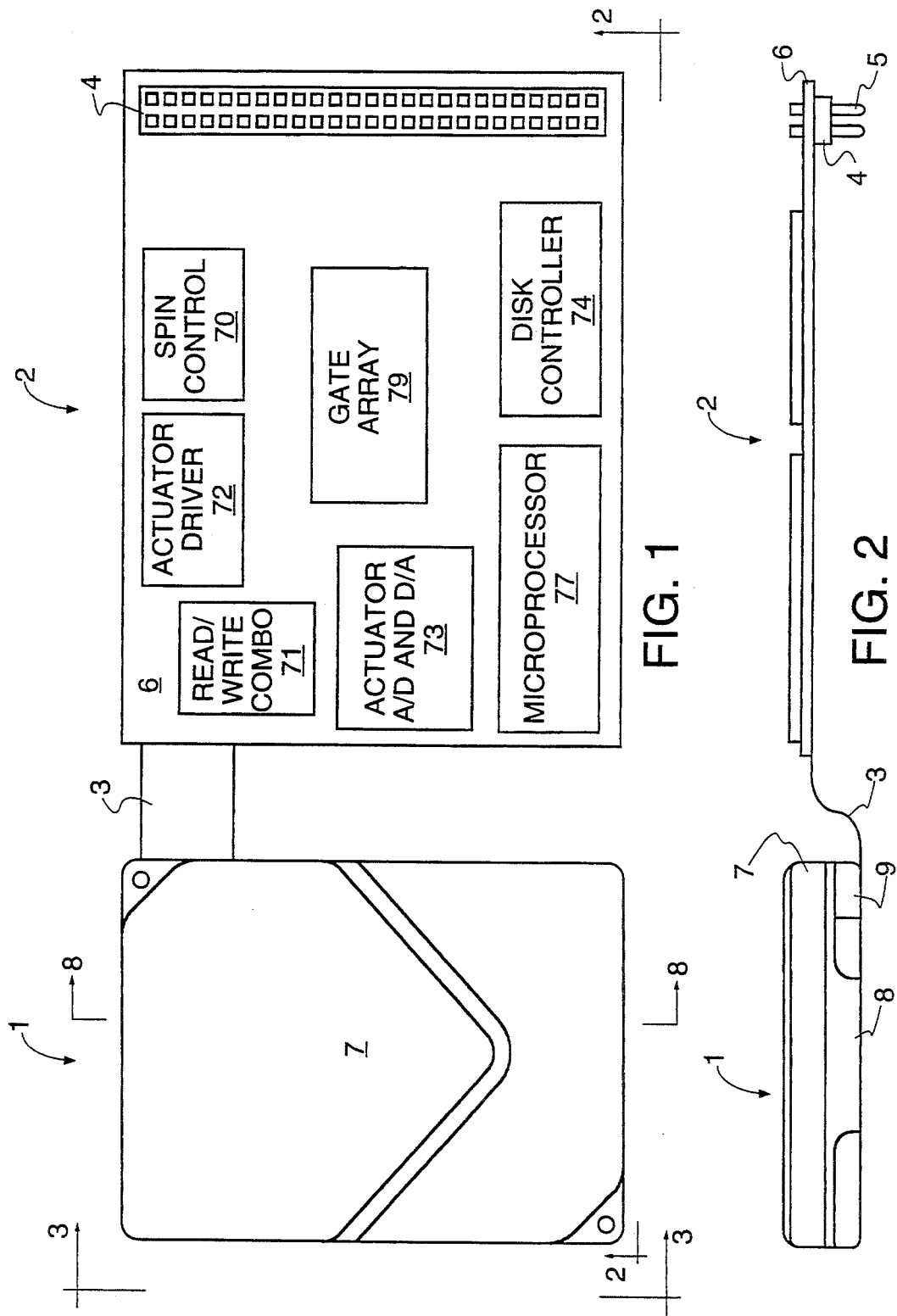

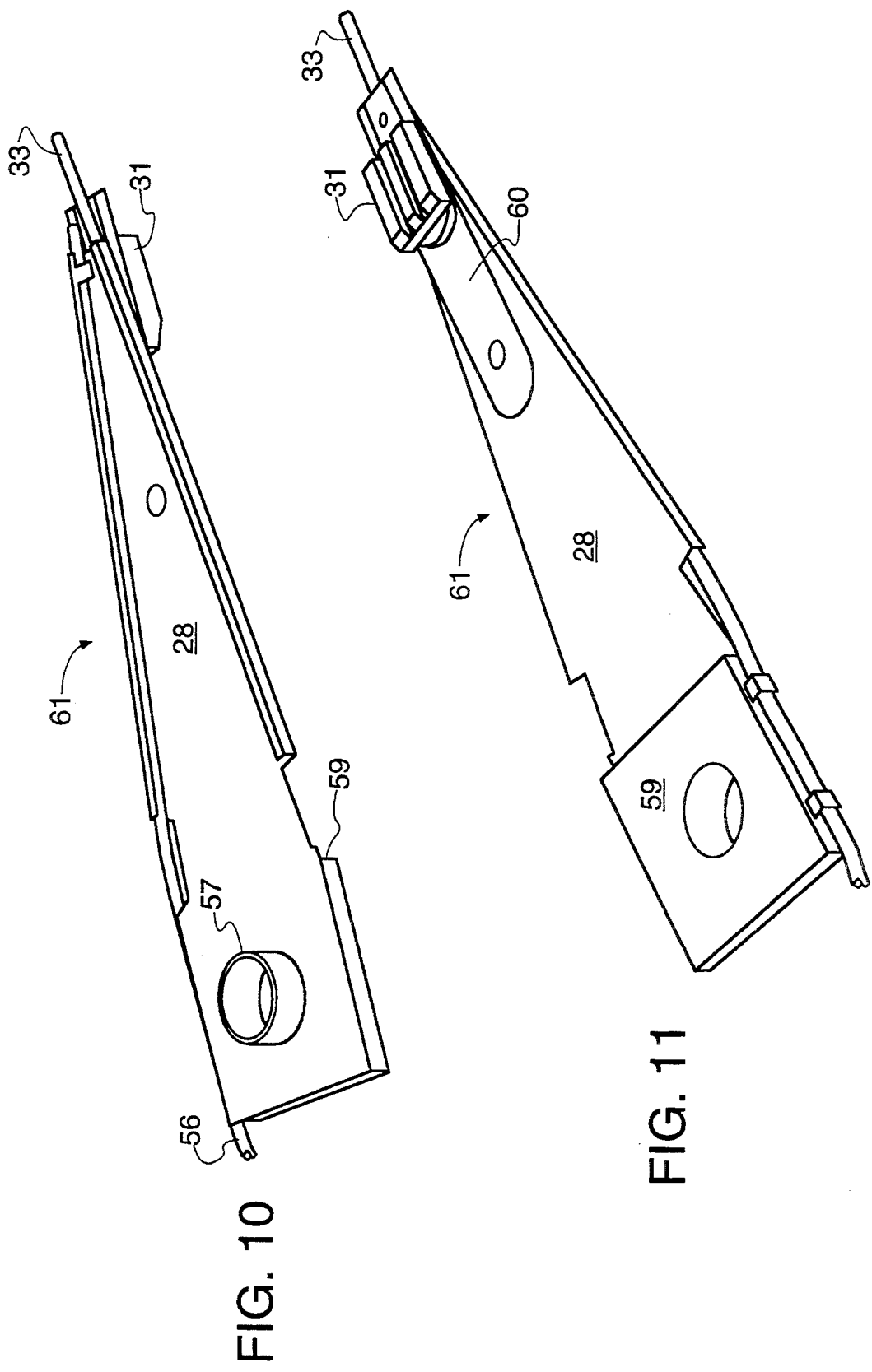

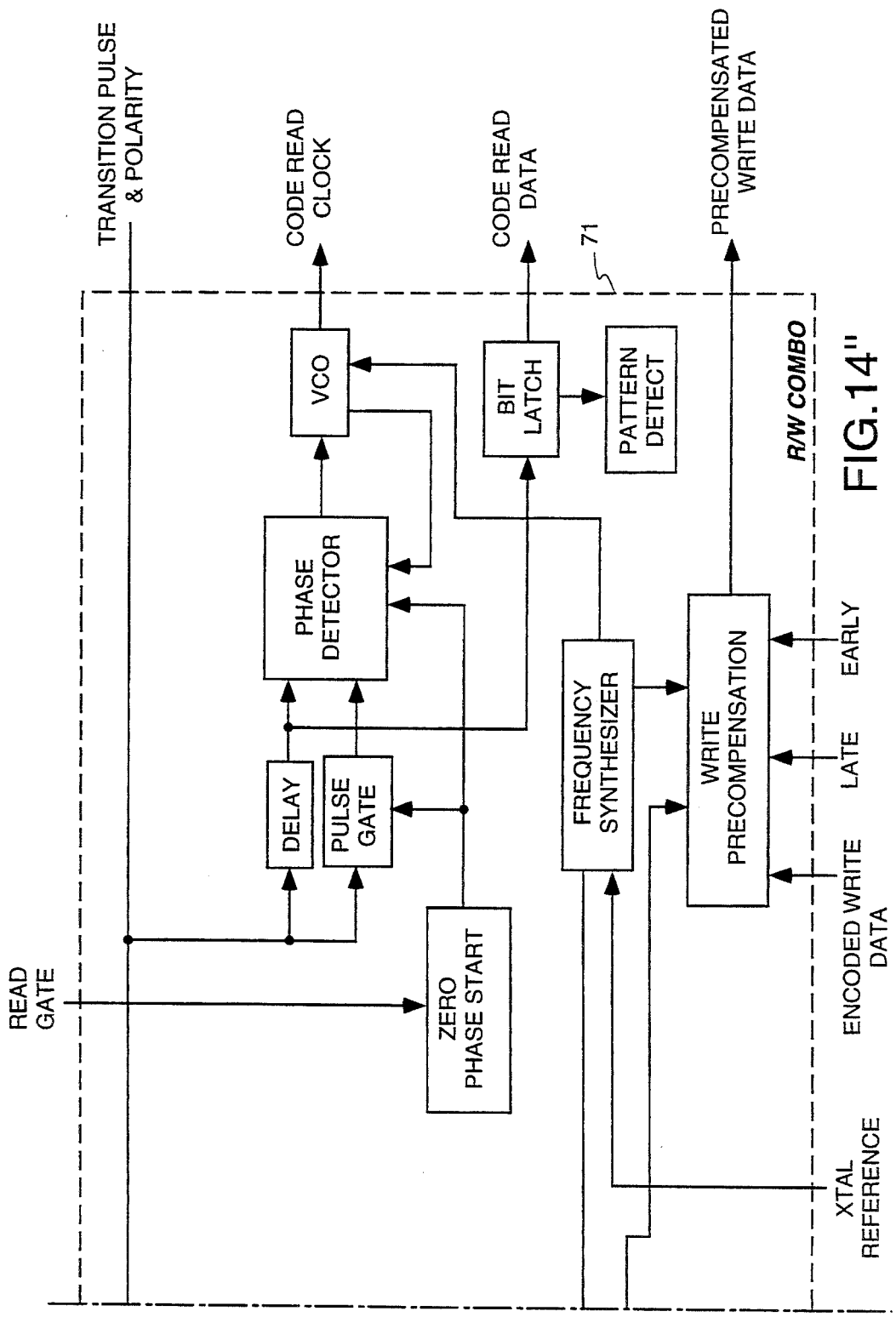
FIG. 14"

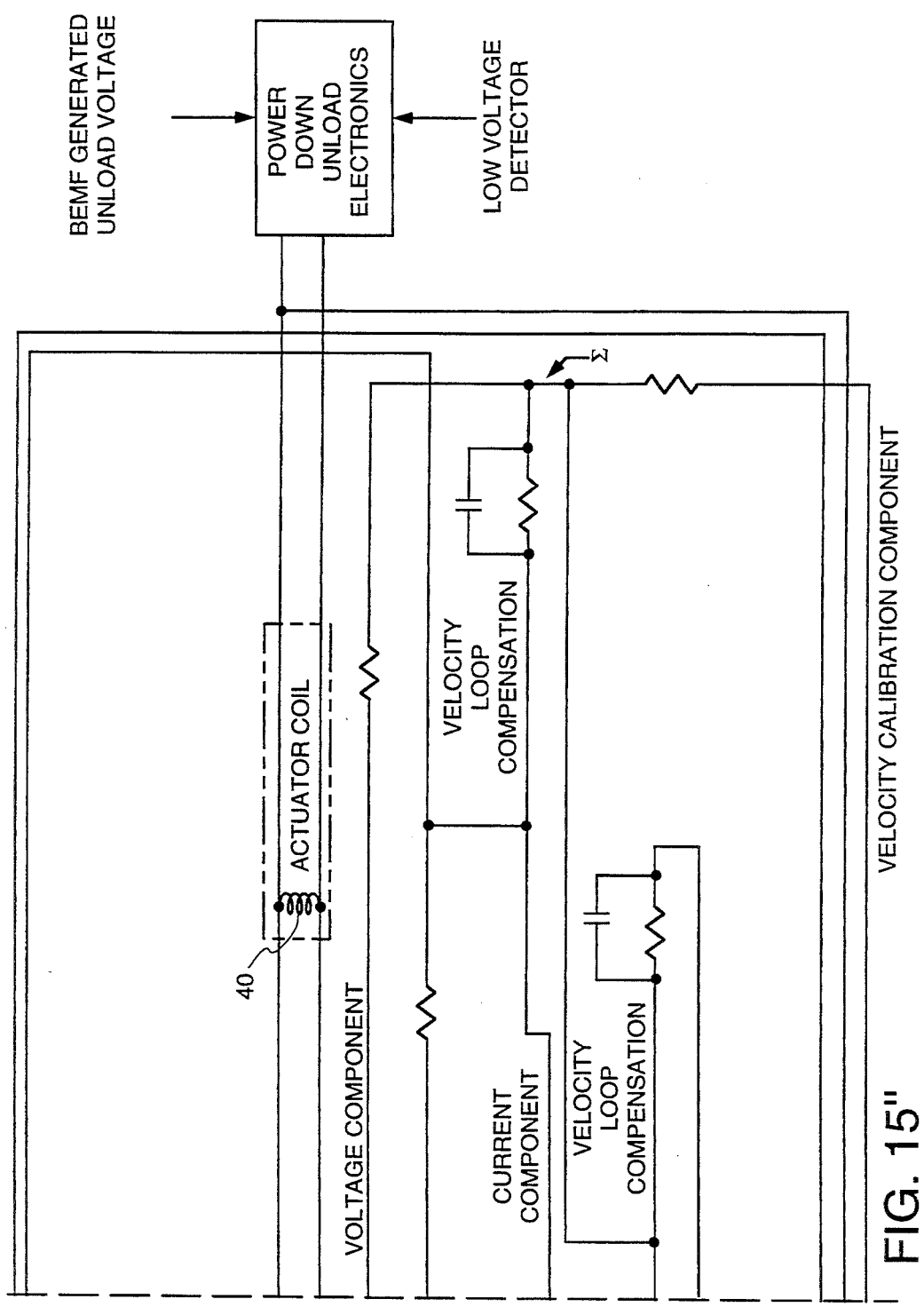
FIG. 15"

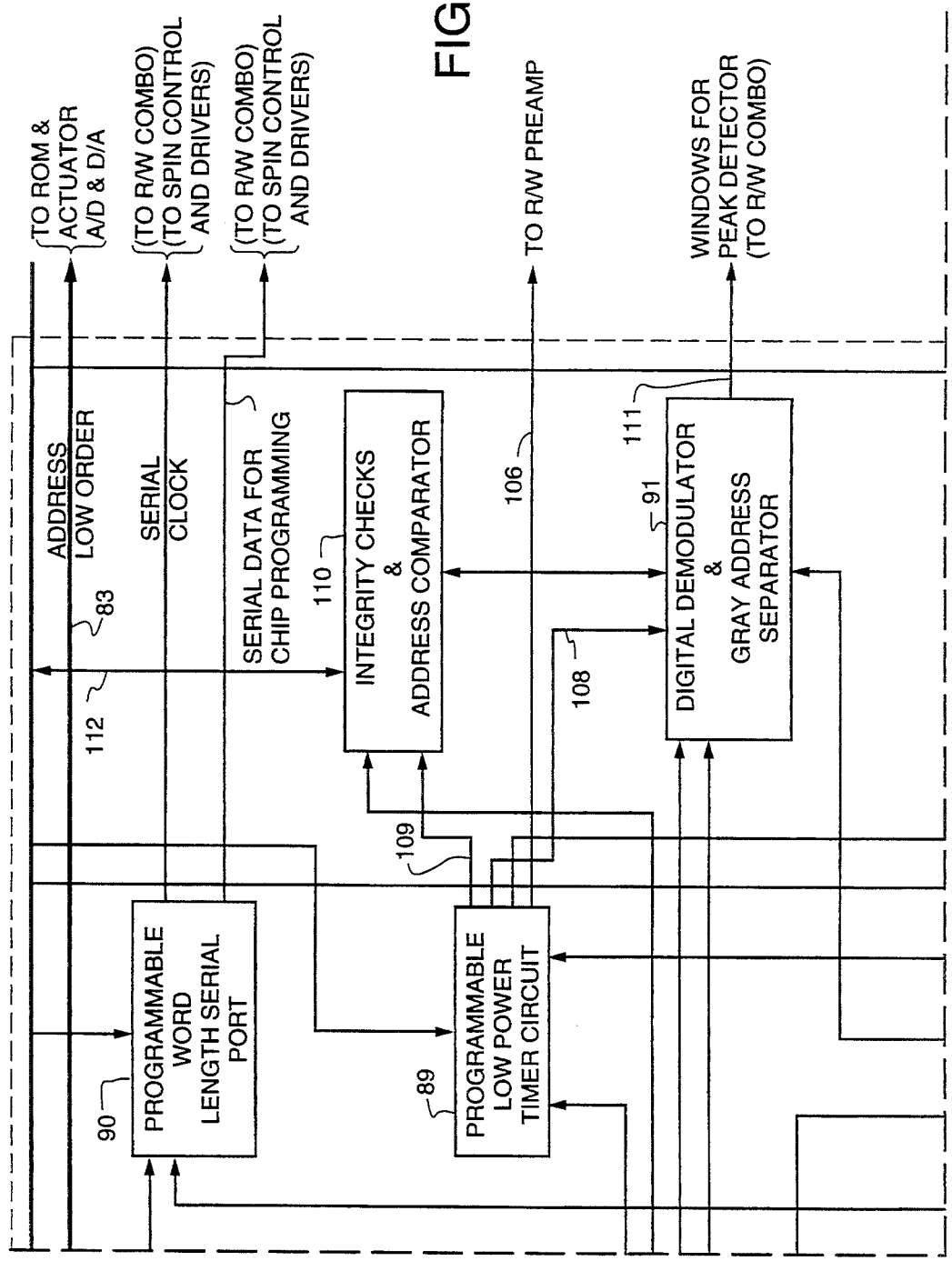

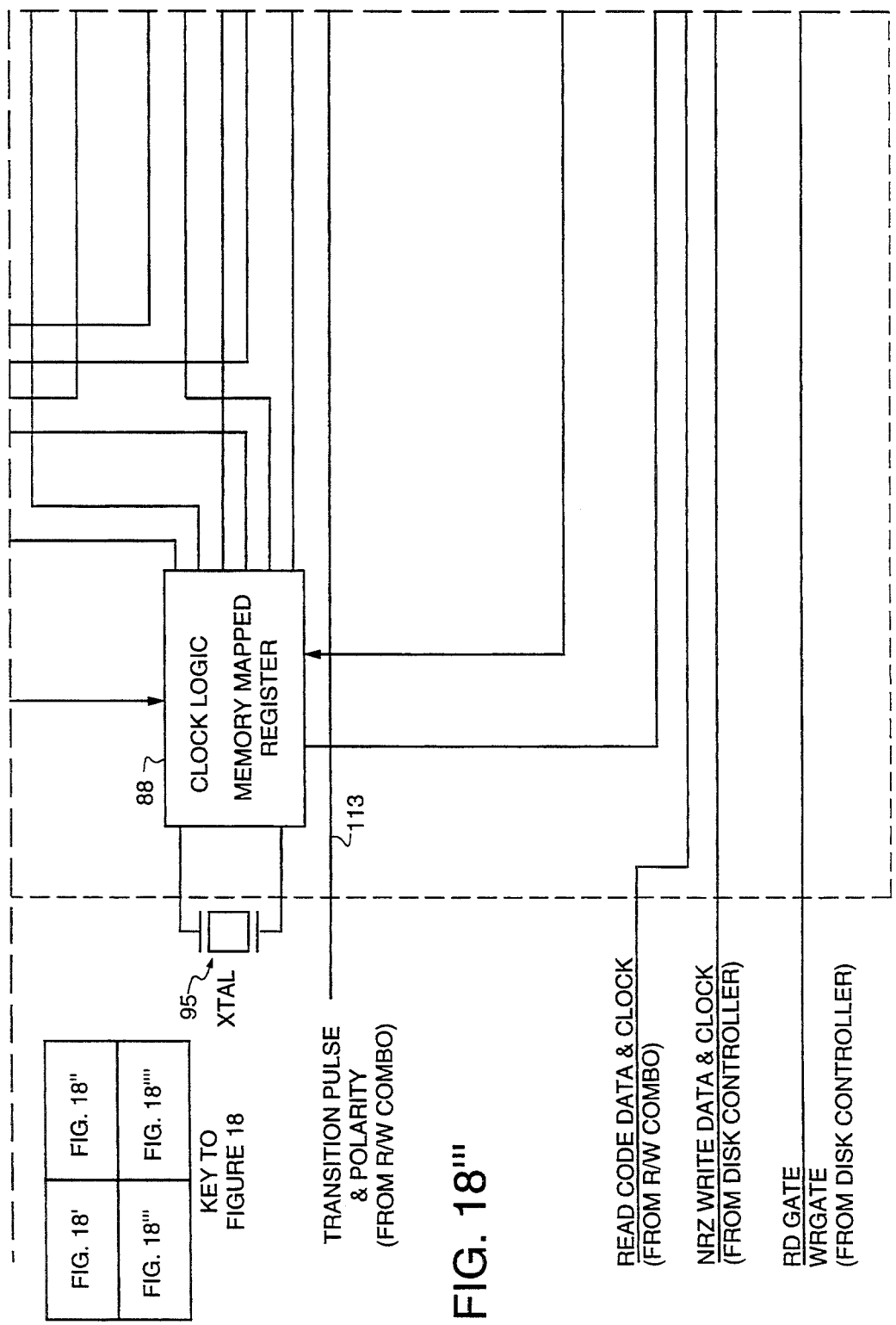

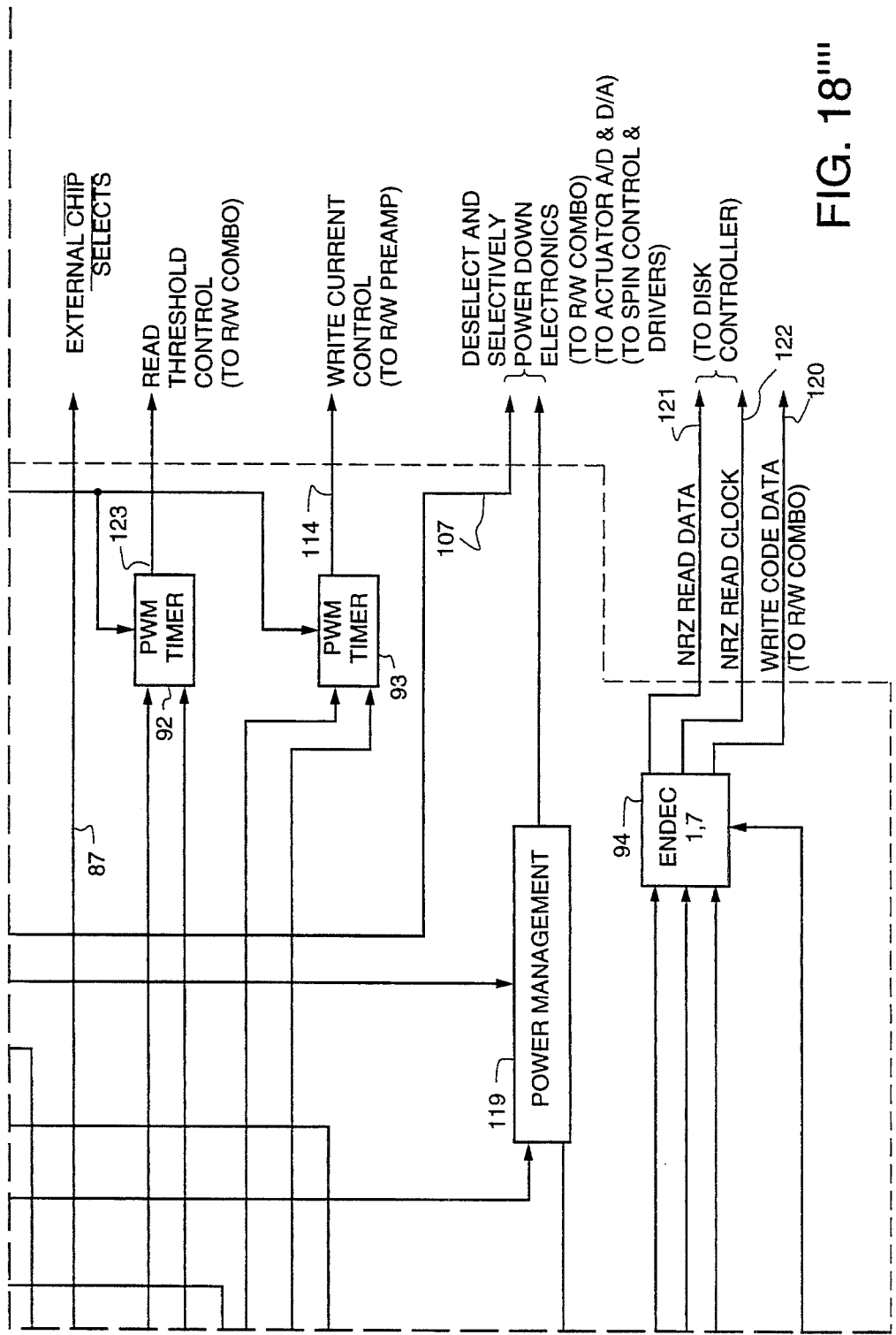

FIGURE 28A TACHOMETER 
FIGURE 28B COUNTER 102"
OF CNTS 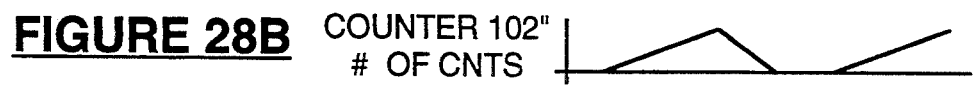
FIGURE 28C COUNTER 104"
OF CNTS 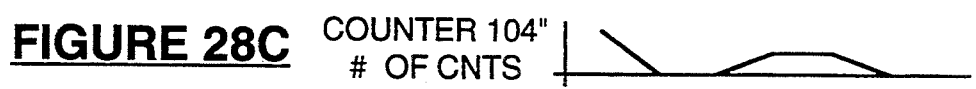

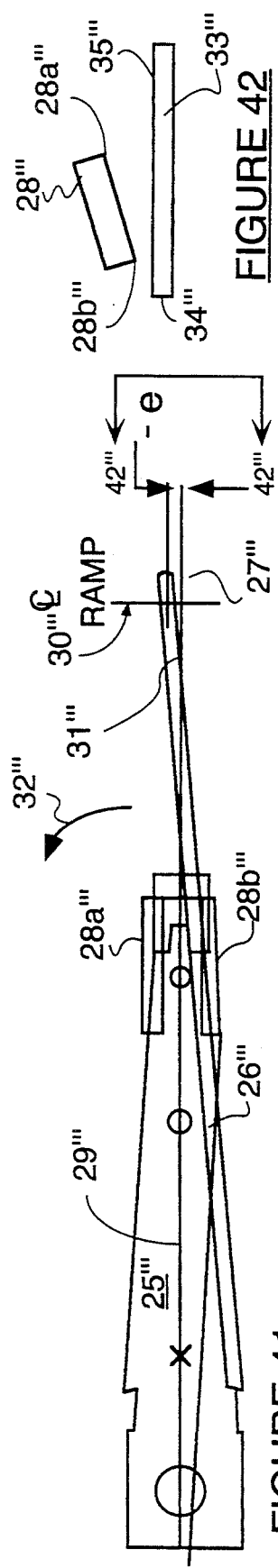
FIGURE 41a
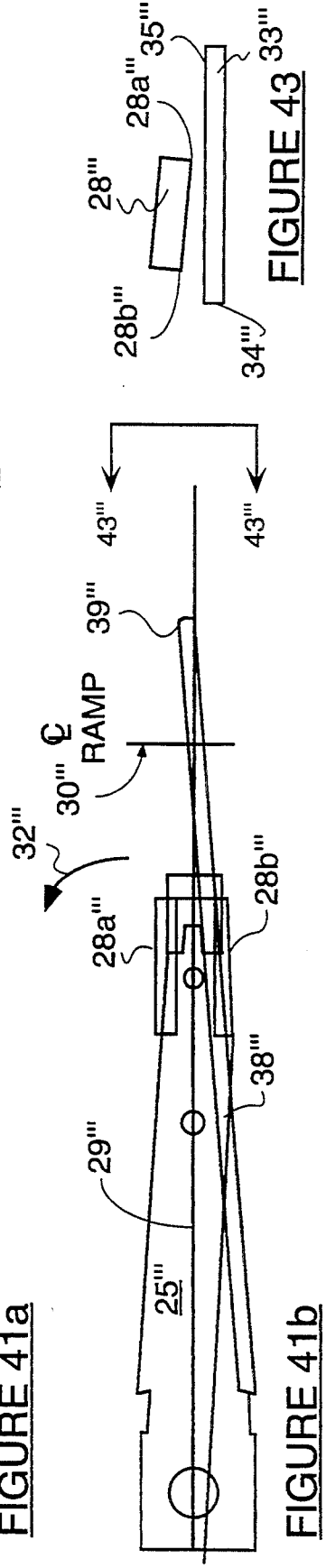
FIGURE 41b
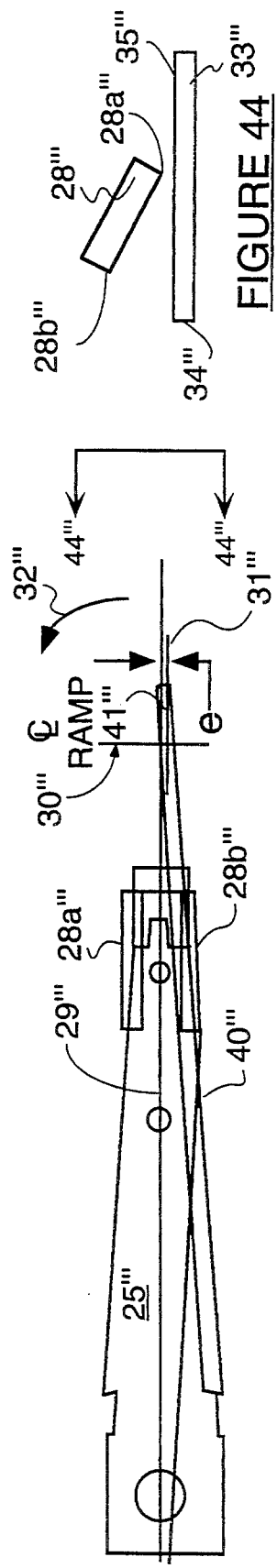
FIGURE 41c
FIGURE 42
FIGURE 43
FIGURE 44

MINIATURE DISK DRIVE WITH SPIN MOTOR CONTROL SYSTEM

This application is a division of application Ser. No. 07/629,948, filed Dec. 19, 1990.

BACKGROUND OF THE INVENTION

1. Field of the Invention

This invention relates to the storage of digital information, and more particularly to a miniature disk drive and associated circuitry for storage of digital information on a rotating disk.

2. Description of Prior Art

As computerized devices have been reduced in size over the years, the demand for smaller disk drives has correspondingly increased to keep pace with the reduced sized computing devices. One hard disk drive in the prior art, which includes a 3.5" rigid disk, is described in U.S. Pat. No. 4,568,988 issued Feb. 4, 1986 to McGinlay et al. This patent was reexamined, resulting in the issuance of Reexamination Certificate B1 4,568,988, issued Nov. 29, 1988. McGinlay et al. describe a 3.5" Winchester disk drive which utilizes a disk having a diameter in the range of 85-100 mm. in diameter, with a recording density of 600 tracks per inch, utilizes open loop servo positioning system and reports a storage capacity in excess of 5 megabytes per disk when formatted. McGinlay et al. also disclose the use of a rotary actuator which is driven by a stepper motor through a band.

A further reduction in size of computer equipment lead to the development of a 2.5" form factor rigid disk drive. An example of such a disk drive is illustrated in U.S. Pat. 4,933,785 issued Jun. 12, 1990 to Morehouse et al. The rigid disk drive disclosed in Morehouse et al. used two rigid disks, each having a diameter of about 2.5" and utilized a rotary actuator for positioning magnetic recording heads above the tracks of the disks. The "footprint" (width by length measurement) of the drive described in the above-noted Morehouse et al. patent was described as being 2.8"×4.3". That is, the housing used to enclose the rigid disk drive was 2.8" wide and 4.3" long. A rigid disk drive of this size is generally applicable to computers having a size of 8.5"×11"×1". As computers become smaller, such as, for example, a "palm top", "hand held" or "pocket" size, it is necessary to provide a rigid disk drive which is smaller than either of the foregoing described drives.

SUMMARY OF THE INVENTION

An object of the present invention is to provide a rigid disk drive having a "footprint" and height suitable for "palm top", "hand held" or "pocket" sized computers Another object of the present invention is to provide a rigid disk drive having an increased areal recording density.

In accordance with the invention, a disk drive information storage device is provided which comprises a rigid disk having a diameter in the range from about 45 mm. to 50 mm., a housing for the disk drive information storage device having a width of about 51 mm., the disk storage device utilizing a spin motor supported on the housing for rotating a rigid disk, and a rotary actuator for positioning read/write transducer elements over the surface of the disk for the record and play back of digital information. In accordance with another feature of the invention, a disk storage device as described above is provided in which the length of the housing is about 70 mm.

In accordance with another feature of the invention, the transducer support arm of the disk storage device includes a lift tab which cooperates with a cam assembly supported on the disk drive housing to provide for dynamic loading and unloading of the transducer above the surface of the disk.

In accordance with a further feature of the invention, the disk drive of the present invention includes embedded servo fields in each track, these fields being of different lengths, which permit the storage of increased amount of additional information in each track.

In accordance with yet another feature of the present invention, a jacket fabricated from a resilient, shock absorbent material such as foam rubber, is provided for supporting the disk storage device in a housing.

In accordance with yet another feature of the present invention, the rigid disk storage device includes an inertial latch in operative relationship with the rotary actuator to prevent the actuator from being rotated as the result of the disk drive being subjected to rotational forces.

In accordance with yet another feature of the present invention, the disk drive apparatus is provided with a spin motor which includes a stator having a plurality of windings associated therewith and a rotor having a plurality of magnetic poles. Each winding is made up of first and second portions, with only one portion of each winding being used during normal running of the motor, but both winding portions being used during power down of the spin motor to generate back electromagnetic force to unload the heads from the disk when the drive is powered down.

In accordance with yet another feature of the invention, the rigid disk drive of the present invention is provided with a spin motor control system which includes a back electromotive force commutation circuit which uses digital techniques to generate commutation pulses, a start up circuit also employing digital techniques to initially generate commutation pulses for starting the spin motor, and a monitor circuit for determining the motor spin direction and making correction of direction if necessary, as well as providing blanking of back EMF signals directly after a commutation occurs.

In accordance with a further aspect of the present invention, a disk drive information storage device is provided which is comprised of a disk for recording and reproducing information, a housing having a first external dimension of about 51 mm, a spin motor supported by the housing for rotating the disk means, and a startup control circuit coupled to the spin motor to allow a smooth transition from a startup mode to a BEMF commutation mode of the spin motor.

In accordance with an additional aspect of the present invention, a disk drive information storage device is provided which comprises a disk for recording and reproducing information, a housing having a first external dimension of about 51 mm, a permanent magnet direct current spin motor supported by said housing for rotating said disk, and a circuit for blanking a BEMF commutation pulse for the spin motor.

In accordance with another feature of the present invention, a disk drive information storage device in accordance with each of the two immediately preceding embodiments is provided where the disk has a diameter in the range of from about 45 mm to about 50 mm.

In accordance with yet another feature of the present invention, the height of the head disk assembly utilized in the rigid disk drive is reduced by utilizing a single magnet along with a flux plate to focus the flux field across the actuator coil.

BRIEF DESCRIPTION OF THE DRAWINGS

Other objects and advantages of the invention will become apparent from the study of the specification and drawings in which:

FIG. 1 is a top plan view of the rigid disk drive and its associated printed circuit board which includes drive and controller electronics;

FIG. 2 is a view of the disk drive and printed circuit board of FIG. 1 taken along lines 2—2 of FIG. 1;

FIG. 10 is a perspective view of one of the sliders and support arms used in the head disk assembly;

FIG. 11 is a perspective view of the underside of the slider and support arm illustrated in FIG. 10;

FIG. 28A is a waveform illustrating a tachometer signal.

FIGS. 28B and 28C are graphs illustrating the value of counters within the BEMF commutation control circuit.

FIGS. 41a–41c illustrate the structure for achieving negative roll, no roll and positive roll for a slider supported on a head gimbal assembly.

FIGS. 42 to 44 illustrate, respectively, a slider having a negative roll, no roll and positive roll attitudes.

DETAILED DESCRIPTION OF THE INVENTION

Figure 3:
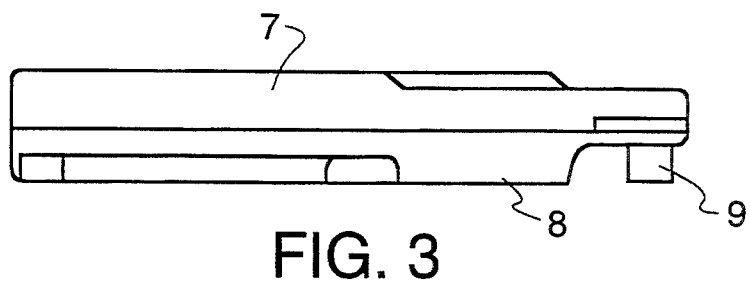
FIG. 3 is a side view of the head disk assembly taken along the lines 3—3 of FIG. 1.

Referring to FIG. 1, head disk assembly 1 is illustrated in top plan view along with its associated drive and controller electronics board 2. Interconnection between head disk assembly 1 and drive and controller electronics board 2 is provided by flexible cable 3. By providing the drive and controller electronics on a separate board, it is possible to significantly reduce the "footprint" as well as the volume of the disk drive. Head disk assembly 1 has a width of approximately 50.8 mm., a length of 70 mm. and a thickness of approximately 10 mm. Utilizing a housing of the foregoing dimensions along with a rigid disk having a diameter of approximately 48 mm. and recording on both sides of the disk, provides a storage capacity from 11.5 megabytes to 23.0 megabytes (both quoted as a formatted disk). This compact size along with the substantial recording capacity lends the head disk assembly with its associated drive and controller electronics uniquely applicable to "palm top" or "pocket" computer applications. Alternative sized disks, in the range of from 45 mm to 50 mm in diameter, with, of course modified sized components to accommodate these disks, also are included in the present invention.

The high storage capacity is achieved by, among other things, utilizing a unique servo field in an embedded servo system, which is described and claimed in copending and commonly assigned U.S. patent application Ser. No. 07/630,475 of J. Blagaila et al. filed on Dec. 19, 1990 entitled: "Servo Field Scheme for High Sampling Rate and Reduced Overhead Embedded Servo Systems In Disk Drives" which is incorporated herein by reference in its entirety. In addition to the high storage capacity, the disk drive and controller require very low power for operation, which is achieved by, among other things, using a spin motor having windings on the stator which are made up of two portions. Only one of the winding portions is used when the spin motor is being powered to drive the disk, however when the drive is powered down the two portions are connected in series and the back EMF generated drives actuator coil 40 to unload the heads from the disk. The spin motor is described and claimed in commonly assigned U.S. Pat. No. 5,218,253 of J. Morehouse et al. issued Jun. 8,1993, entitled: "Spin Motor for a Hard Disk Assembly", which is incorporated herein by reference in its entirety; the utilization of a spin motor control system, which is described in co-pending and commonly assigned U.S. Pat. No. 5,258,695 of M. Utenick et al., issued Nov. 2, 1993 and entitled: "Spin Motor Control System for a Hard Disk Assembly", which is incorporated herein by reference in its entirety; as well as the utilization of dynamic head loading so that the heads are unloaded from the surface of the disk to reduce the amount of start up power required (as opposed to take off and landing of a head slider on the surface of the disk) this feature being described and claimed in commonly assigned U.S. Pat. No. 5,289,325 of J. Morehouse et al. issued Feb. 22, 1994, and entitled: "Rigid Disk Drive With Dynamic Head Loading Apparatus" which is incorporated herein by reference in its entirety. The above-noted power saving features are required by smaller sized computers since the batteries used in such computers are also of smaller size and capacity.

Figure 4:
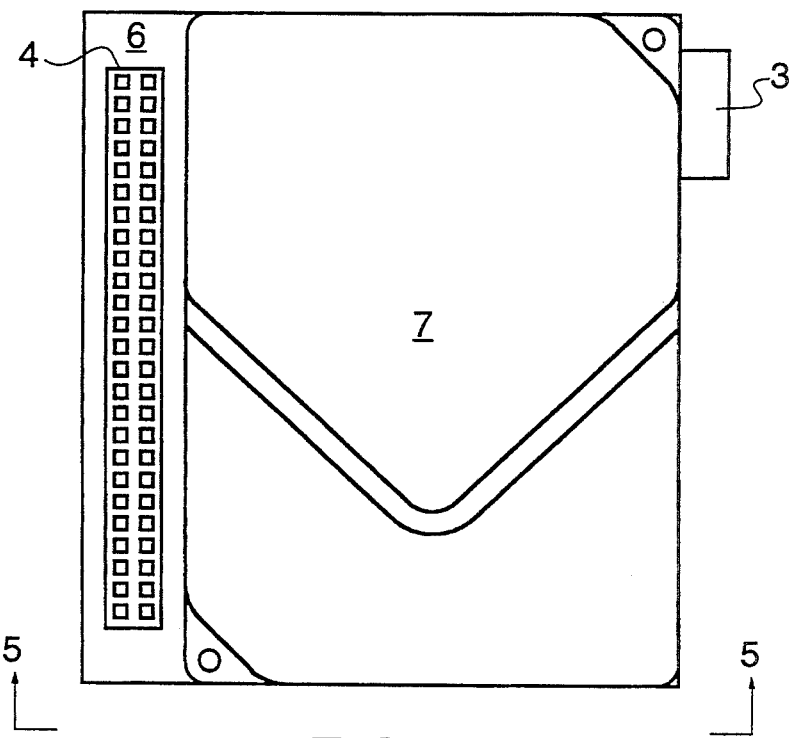
FIG. 4 is a top plan view of the head disk assembly and the drive controller electronics board with the drive and controller electronics board positioned beneath the head disk assembly.
Figure 5:
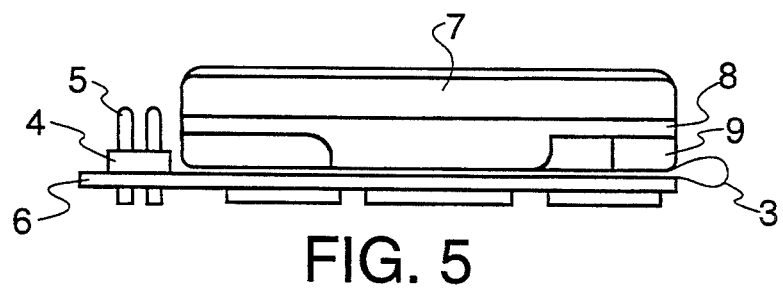
FIG. 5 is a view of the head disk assembly and the controller electronics taken along the lines 5—5 of FIG. 4.

Returning to FIG. 1, drive and controller electronics board 2 has the dimensions of approximately 58 mm. in width, 70 mm. in length and 7 mm. in thickness. The head disk assembly and drive and controller electronics board may be mounted in a personal computer in the orientation illustrated in FIGS. 1 and 2, or if the generally planar orientation is less desirable, a stacked orientation as illustrated in FIGS. 4 and 5 may be utilized. FIG. 5 illustrates a view of head disk assembly 1 and drive and controller electronics board 2 in the stacked orientation as viewed along the lines 5—5 of FIG. 4. In this orientation, the overall thickness (or height as viewed in FIG. 5, for example, is approximately 15 mm. Electrical connections for the signals going to and coming from the host device are provided utilizing interface connector 4 which is illustrated in FIGS. 1, 2, 4 and 5.

In FIG. 1, the portion of interface connector 4 which is illustrated is the backside of the connector. Turning to FIG. 2, which is a view taken along the lines 2—2 of FIG. 1, it will be noted that pins 5 of connector 4 extend from the side of circuit board 6 which is opposite to the side of circuit board 6 which includes the integrated circuits which are identified by their function in FIG. 1. The details of the circuits utilized in disk drive and control electronics board 2 will be described hereinafter. As illustrated in FIG. 2, as well as other figures, head disk assembly 1 is enclosed in a housing which includes cover 7 and baseplate 8. A detailed description of cover 7, baseplate 8 and the internal components of head disk assembly 1 will be described hereinafter in detail.

Turning to FIG. 3, a side view, taken along lines 3—3 of FIG. 1, of head disk assembly 1 is illustrated. As will be appreciated by reference to FIG. 3, cover 7 and baseplate 8 have a reduced thickness in the right hand portions thereof (viewed in FIG. 3). The detail of the structure of cover 7 and baseplate 8 in this area will be better appreciated by the discussion hereinafter and the reference to FIG. 8 which is a cross-section of head disk assembly 1 taken along the lines 8—8 in FIG. 1. To supply additional stability to head disk assembly 1 in view of the reduced thickness of baseplate 8 along the front edge, a standoff 9, as illustrated in FIGS. 2, 3 and 5, is provided.

As indicated above, the disk drive according to the present invention is capable of in one version storing 11.5 megabytes of data utilizing a single disk, and in another version, also utilizing a single disk, storing up to 23.0 megabytes of information. In the following chart, the major parameters utilized in each of these versions of the drive to achieve the foregoing capacities are set forth.

|  | VERSION I | VERSION II |
|---|---|---|
| CAPACITY FORMATTED | | |
| Per Drive (Megabytes) | 11.5 | 23.0 |
| Per Track (Bytes) | 11,776 | 23,552 |
| Per Sector (Bytes) | 512 | 512 |
| Sectors Per Track | | |
| (ID) | 23 | 23 |
| (OD) | 23 | 46 |
| FUNCTIONAL | | |
| Recording Density (BPI) | 38,100 | 46,400 |
| Flux Density (FCI) | 28,600 | 34,800 |
| Areal Density | 56 | 86 |
| Disks | 1 | 1 |
| Data Head | 2 | 2 |
| Data Cylinders | 480 | 610 |
| Track Density (TPI) | 1,486 | 1,857 |

-continued

|  | VERSION I | VERSION II |
| --- | --- | --- |
| Recording Method | 1,7 | 1,7 |
| PERFORMANCE | | |
| Media transfer Rate | 0.92 | 1.84 |
| Interface Transfer Rate | 4.0 | 4.0 |
| Rotational Speed | 3,490 | 3,490 |
| Latency | 8.6 | 8.6 |
| Average Seek Time | 29 | 29 |
| Track to Track Seek Time | 8 | 8 |
| Maximum Seek Time | 40 | 40 |
| Start Time (Typical) | 1.5 | 1.5 |
| Buffer Size | 32 | 32 |
| Interface | AT/XT | AT/XT |
| POWER | | |
| +5 VDC ± 5% Startup Current | 0.8 Amps | |
| Typical Heat Dissipation | | |
| Spin-up | 3.5 watts | |
| Idle | 1.0 watt | |
| Read/Write/Seek | 2.0 watts | |
| Power Savings Mode | 0.5 watts | |
| Standby Mode | 0.03 watts | |
| Sleep Mode | 0.01 watts | |

Figure 6:
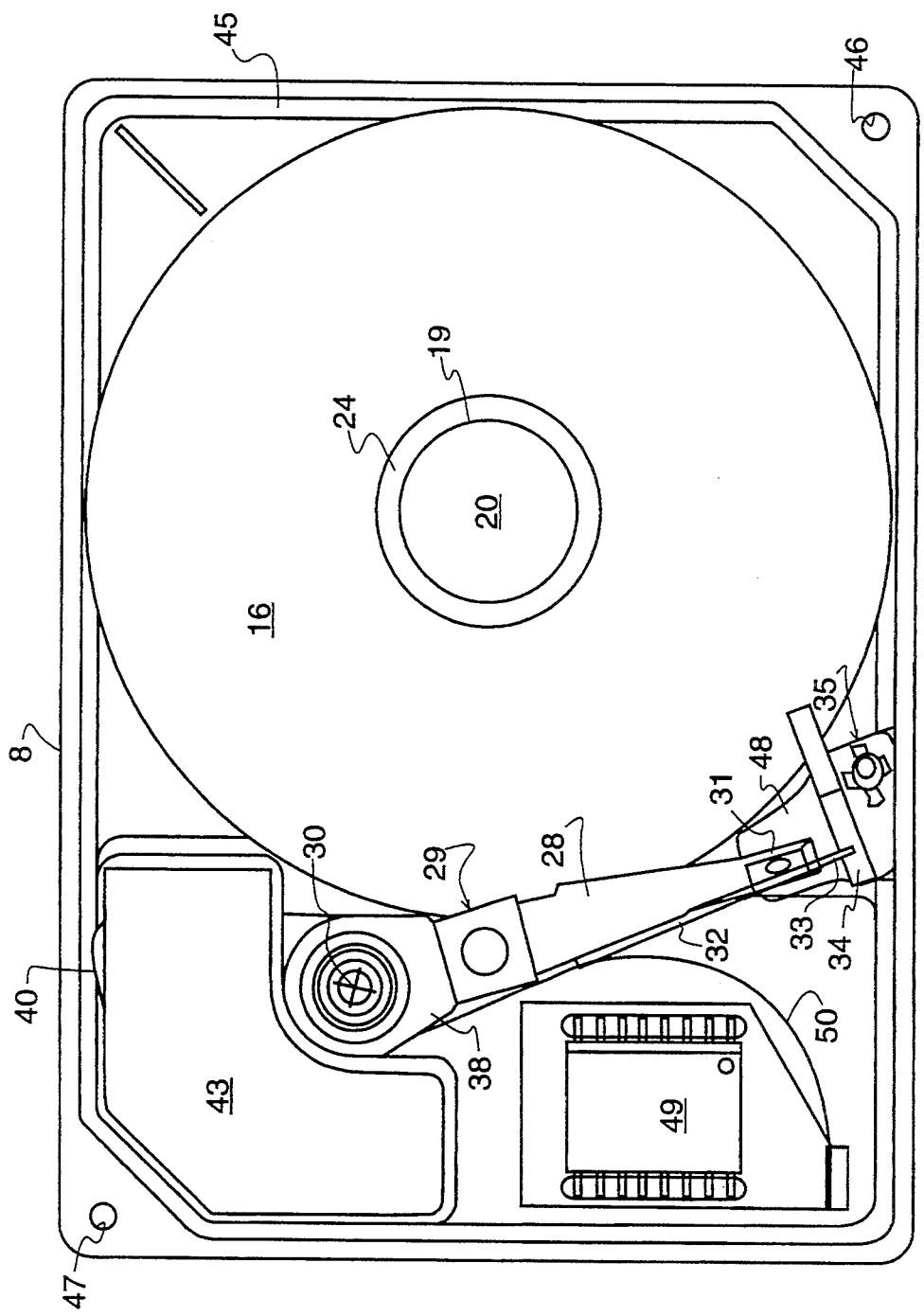
FIG. 6 is a top plan view, highly enlarged, of the head disk assembly with the cover of the head disk assembly removed and with the heads unloaded.
Figure 8:
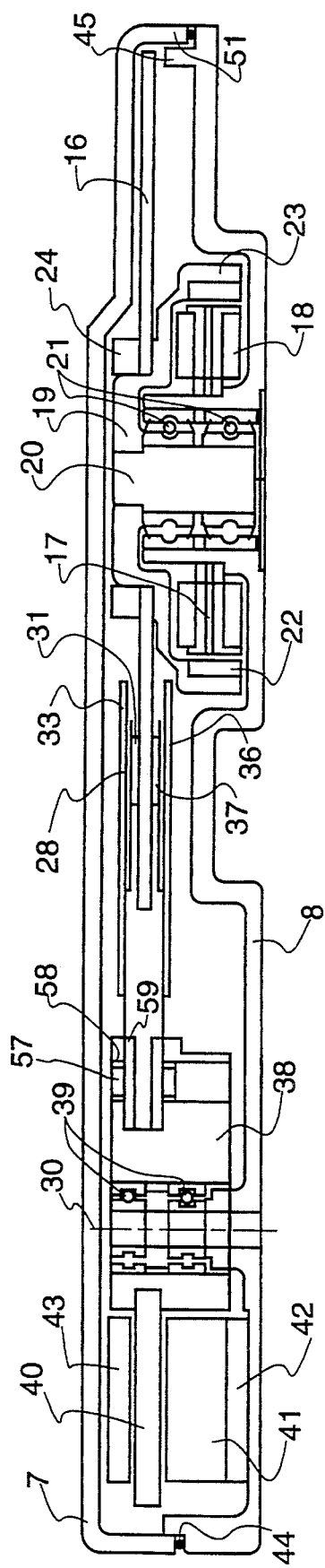
FIG. 8 is a highly enlarged cross-sectional view of the head disk assembly taken along the lines 8—8 of FIG. 1.

A highly enlarged top plan view of the head disk assembly 1, with cover 7 removed, is illustrated in FIG. 6. Turning to FIG. 6, head disk assembly 1 utilizes a single rigid disk 16 having its generally planar surfaces coated with a suitable magnetizable coating for the recording and playback of digital information. Rigid disk 16 has an outside diameter of approximately 48 millimeters and an inside diameter of approximately 12 millimeters. Rigid disk 16 may be, for example, comprised of an aluminum platter having a suitable magnetic coating applied to the upper and lower planar surfaces, which coating may be for example a cobalt alloy. To better appreciate the explanation of the structural characteristics of head disk assembly 1, concurrent reference with FIG. 6 and FIG. 8 (which is a cross-sectional view of head disk assembly 1 taken along the lines 8—8 in FIG. 1) will be helpful. Rigid disk 16 is supported for rotation in baseplate 8 by a brushless DC spin motor. A detailed description of this brushless DC spin motor is included in U.S. Pat. No. 5,218,253 issued Jun. 8, 1993. Portions of this motor will also be described herein for the purposes of illustration with regard to the head disk assembly. Referring to FIGS. 6 and 8, the brushless DC motor includes a stator portion having nine lamination portions 17, each of which has windings 18. The stator portion is supported on baseplate 8. Rotor 19 is rigidly affixed to shaft 20 which is supported in baseplate 8 utilizing a bearing assembly, the bearings of which are indicated at 21. Permanent magnet ring 22 is supported in operative relationship to the plurality of lamination portion 17 and windings 18, permanent magnet ring being supported on lower portion 23 of rotor 19. Rigid disk 16 is supported on rotor 19 for rotation therewith by clamp ring 24 which is pressfit onto rotor 19. The details of the start-up commutation as well as direction detection for the spin motor fully described in the above referenced U.S. patent application Ser. No. 630,470.

Smaller computers of the portable variety have a limited power capacity since it is desirable to have a small battery pack for such devices. In order to reduce the power requirements of head disk assembly 1, the power required for motor start-up is reduced by utilizing dynamic head loading to eliminate stiction between the recording head slider and the disk. Dynamic head loading permits unlimited start-stop capability which results in power reduction by allowing power down immediately after utilization. Referring to FIG. 6, the head disk assembly I is illustrated with the read-write recording head and its associated slider in the at rest position where the slider is supported outside the periphery of rigid disk 16. The detail structure for accomplishing dynamic head loading and unloading for a disk drive according to the present invention is described in detail herein and in the above-referenced U.S. Pat. No. 5,289,325. Briefly, load beam 28 of head gimbal assembly 29 pivots about center of rotation 30, load beam 28 supporting at its free end, adjacent to disk 16, in this Figure slider body 31 which includes a read-write recording element. Included on load beam 28 is lift tab 32 having a free end 33 which contacts cam surface 34 of cam assembly 35. The detailed operation of dynamic head loading and unloading utilized in the above structure is described in the above-identified patent application.

Referring to FIG. 8, this cross-sectional view illustrates the utilization of upper load beam 28 which supports down slider body 31 which includes a read/write element (not shown) which is positioned above the upper surface of hard disk 16. Also illustrated in FIG. 8 is up load beam 36 which supports up slider body 37 which includes a read-write recording element (not shown) which is positioned adjacent to the lower surface of rigid disk 16. The respective terms "up" and "down" with regard to the slider body are utilized to indicate the operative orientation of the read-write recording element associated with the slider body. For example, down slider body 31 is so named because the read-write recording element associated with that body is facing downwardly as viewed from the position of head disk assembly 1 in FIG. 6. Similarly, up slider body 37 is so denominated because the read-write recording element included on up slider body 37 is facing upwardly.

As is best illustrated in FIG. 8, upper load beam 28 and lower load beam 36 are supported for rotation about center of rotation 30 by actuator body 38. Actuator body 38 is rotatably supported on baseplate 8 by a suitable bearing assembly which includes actuator bearings 39. It will of course be recognized by those skilled in the art that the head positioning mechanism using head disk assembly 1 is of the moving coil rotary actuator type. Actuator coil 40 is provided with appropriate driving signals to position the read-write recording element over the appropriate track based on commands received from actuator driver circuits which will be described hereinafter. Permanent magnet 41 in conjunction with lower magnet plate 42 and return plate 43 provide a magnetic flux field across actuator coil 40. To reduce the height of head disk assembly 1, a single permanent magnet (permanent magnet 41) is utilized in conjunction with lower magnet plate 42 and return plate 43. The physical size and shape of actuator coil 40 is determined in part by the available clearance and space within baseplate 8, and will be appreciated by reference to FIGS. 6 and 7. A portion of actuator coil 40 extends beyond the edge of return plate 43. From an electrical standpoint, the number of turns and the gauge of the wire used in actuator coil 40 are provided such that the resistance of actuator coil 40 is approximately the same as the resistance of the spin motor. It is important that this relationship be established since during power down the back EMF of the spin motor is used to drive the actuator coil and move the head gimbal assembly into the unloaded position as illustrated in FIG. 6. This equal resistance relationship is also important because for a given coil geometry the unload torque generated is at a maximum when the wire size and number of turns produces a coil resistance equal to the resistance of the series combination of the two spin motor windings plus circuit and trace resistances.

To protect the components in head disk assembly 1 from contamination by particles which could among other things, cause a head crash, cover 7 is sealed to baseplate 8 by providing appropriate interfitting relationship between cover 7, baseplate 8 and the utilization of a resilient cover seal 44 (FIG. 8). Resilient cover seal 44 extends around the periphery of baseplate 8 outside of lip 45 illustrated in FIGS. 6 and 8. Referring to FIG. 8, it will be noted that peripheral free edge 51 of cover 7 extends below the upper edge of lip 45, thereby providing an overlapping fit between baseplate 8 and cover 7. This overlapping configuration advantageously reduces susceptibility of the read/write recording elements inside the head disk assembly to EMI from external sources such as circuits of the computer to which the drive is attached. Cover 7 is secured to baseplate 8 using a pair of suitable fastening means which cooperate with openings 46 and 47 in baseplate 8. Corresponding openings are provided in cover 7 to receive these fastening means.

As will be appreciated by reference to FIG. 6, when the head gimbal assemblies are positioned as shown in FIG. 6, the up slider body 37 and down slider body 38 are facing each other and shocks transmitted to the disk drive could cause them to impact and damage read/write recording elements on the sliders. To prevent this, protective member 48, which is supported by baseplate 8 extends outwardly from cam assembly 35 and is positioned between up slider body 37 and down slider body 31. Protective member 48 extends in substantially the same plane as rigid disk 16 and is a planar structure the preferred composition of which is a PTFE filled acetal resin.

Also illustrated in FIG. 6, read/write integrated circuit 49, which will be described hereinafter is included within the housing of head disk assembly 1. Also illustrated in FIG. 6 is flexible cable 50 which is used to carry the signals to and from the read/write recording elements on the ends of the respective load beams. Cable 50 also supplies signals to actuator coil 40.

Figure 7:
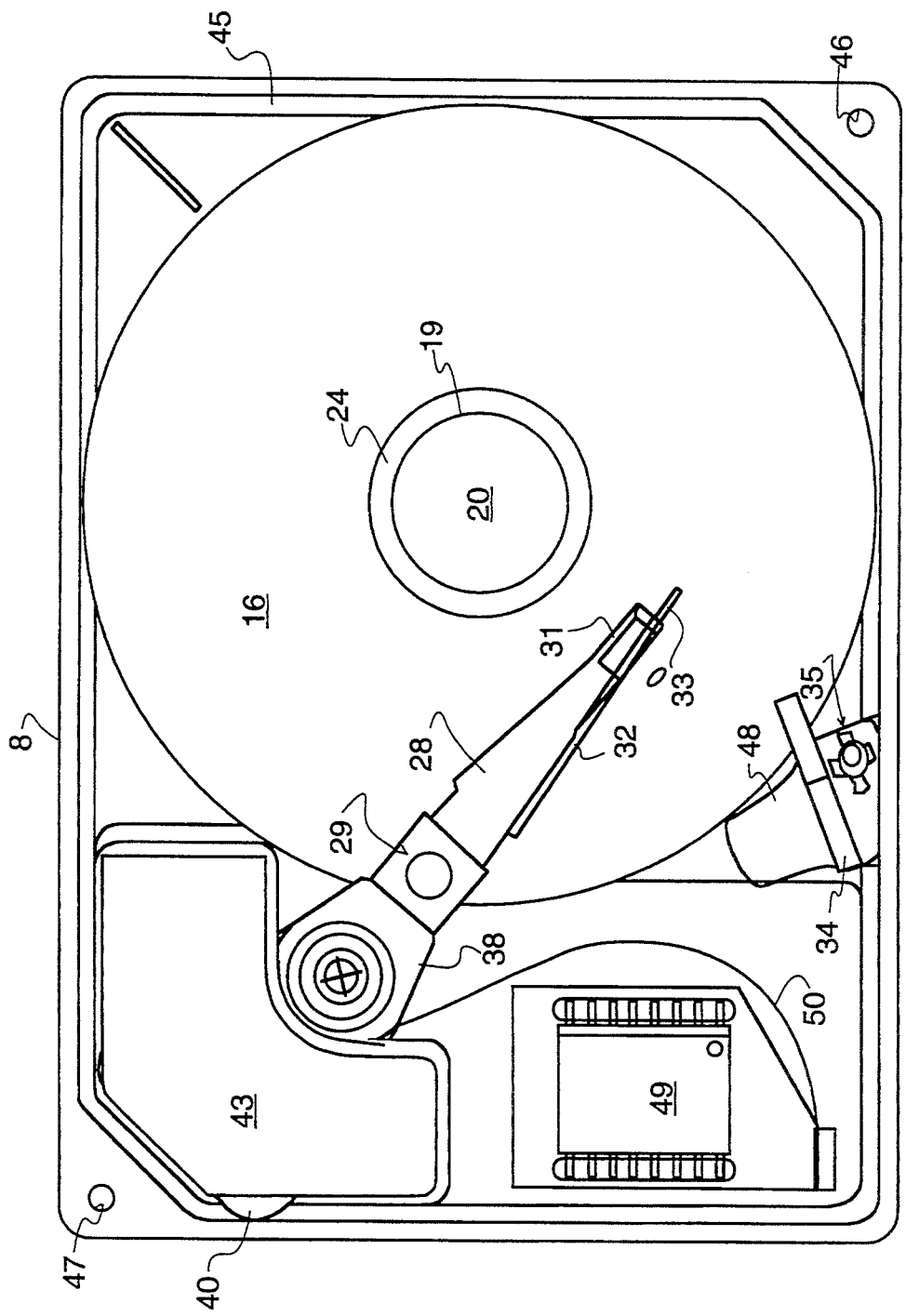
FIG. 7 is a top plan view of the head disk assembly with the cover removed and with the head arm positioned for reading or writing information to the disk.
Figure 9:
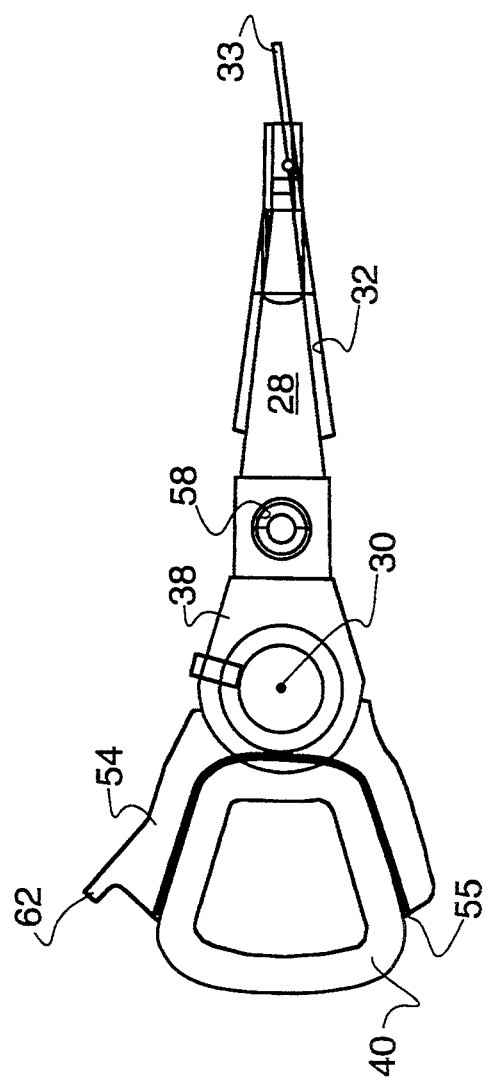
FIG. 9 is a top plan view of the rotary actuator used in the head disk assembly.

FIG. 7 is a top plan view of head disk assembly 1 illustrating the actuator moved such that the read/write recording elements on their respective slider bodies are in operative position above the surface of rigid disk 16. In this Figure, the configuration of protective member 48 is more clearly shown and it will also be appreciated that a portion of actuator coil 40 is visible beneath one edge of return plate 43. Also illustrated in FIG. 7 is an arrow which indicates the direction of rotation of rigid disk 16 when it is spinning for operation. To better illustrate the structure of the actuator body 38 and actuator coil 40, attention is directed to FIG. 9 which is a top plan view of the actuator assembly as viewed in FIGS. 6 and 7. As illustrated in FIG. 9, actuator body 38 includes coil support extension 54, which in conjunction with gap filling adhesive 55 supports actuator coil 40. Actuator coil 40 includes a plurality of turns of insulated wire and has a generally planar configuration in a plane which is parallel to the plane of rigid disk 16 and a truncated triangular shape as illustrated in FIG. 9 in the axis perpendicular to the surface of rigid disk 16.

FIG. 10 is a perspective view of head gimbal assembly 61 which includes down load beam 28. In FIG. 10 cable 56 is illustrated in position on down load beam 28, cable 56 providing electrical connection to the read/write recording element supported on down slider body 31. Also illustrated in FIG. 10 is cylindrical extension 57 of swage plate 59, which extends through down load beam 28 and supports down load beam 28 in opening 58 (FIGS. 8 and 9) in actuator body 38. Up load beam 36 is supported in actuator body 38 using the same type of support, as will be appreciated by reference to FIG. 8.

FIG. 11 is a perspective view of the side of down load beam 28 which supports down slider body 31. Briefly, down slider body 31 is supported on down load beam 28 using head flexure 60. It will be appreciated by those skilled in the art that head gimbal assembly 61 is of the Watrous-type, and is also referred to as a Whitney-type suspension. Additional details of the head gimbal assembly are provided below.

Figure 37:
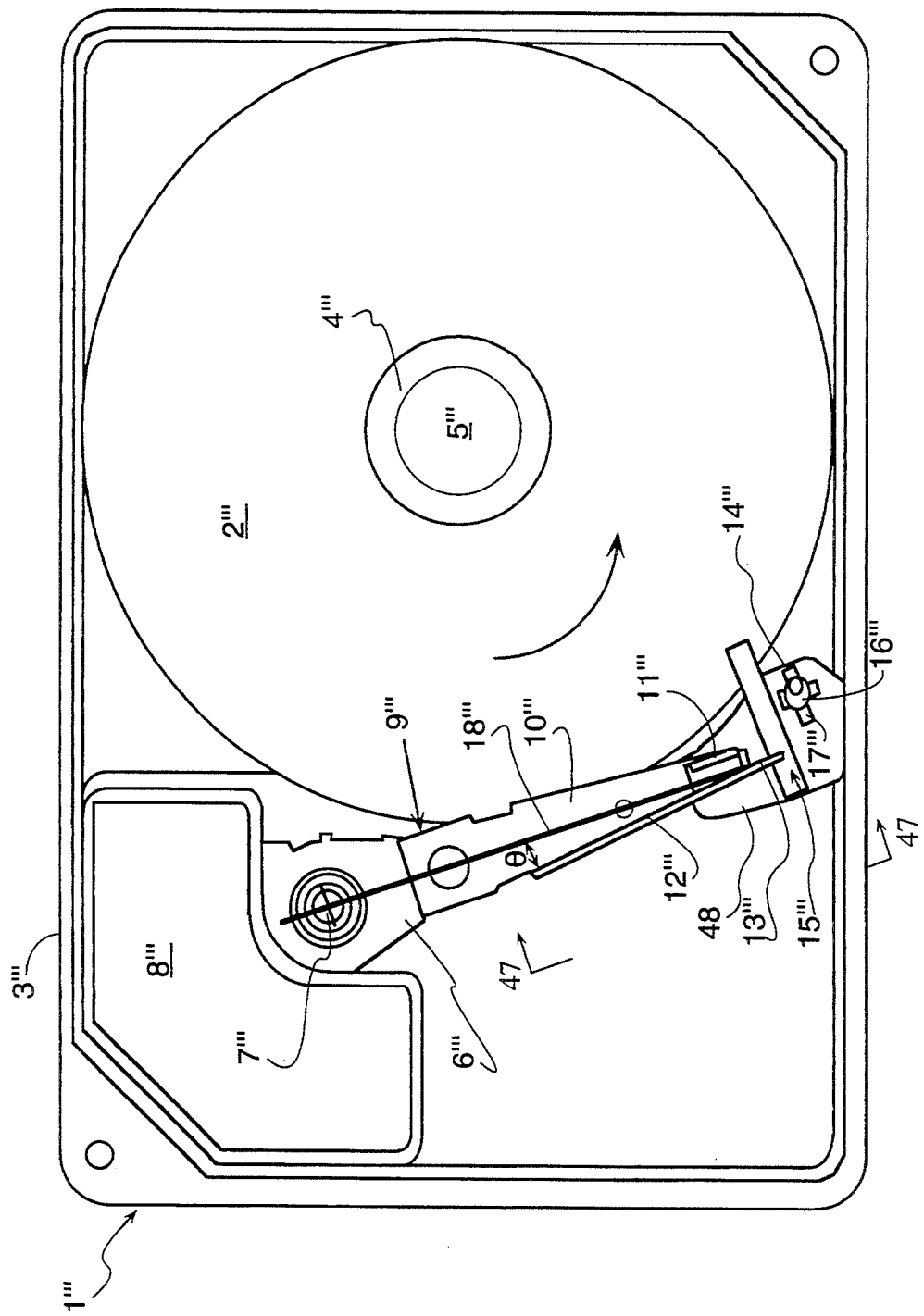
FIG. 37 is a top plan view of a rigid disk drive incorporating the dynamic head loading apparatus in accordance with the present invention.
Figure 38:
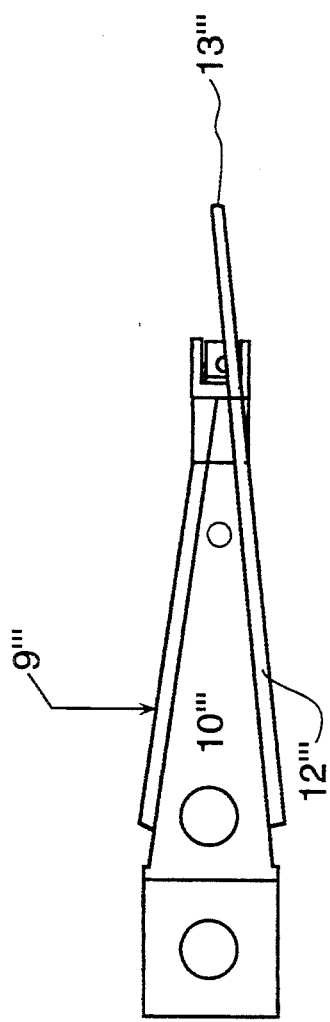
FIG. 38 is a top plan view of the down-facing head gimbal assembly utilized in the rigid disk drive of FIG. 37.
Figures 39, 40:
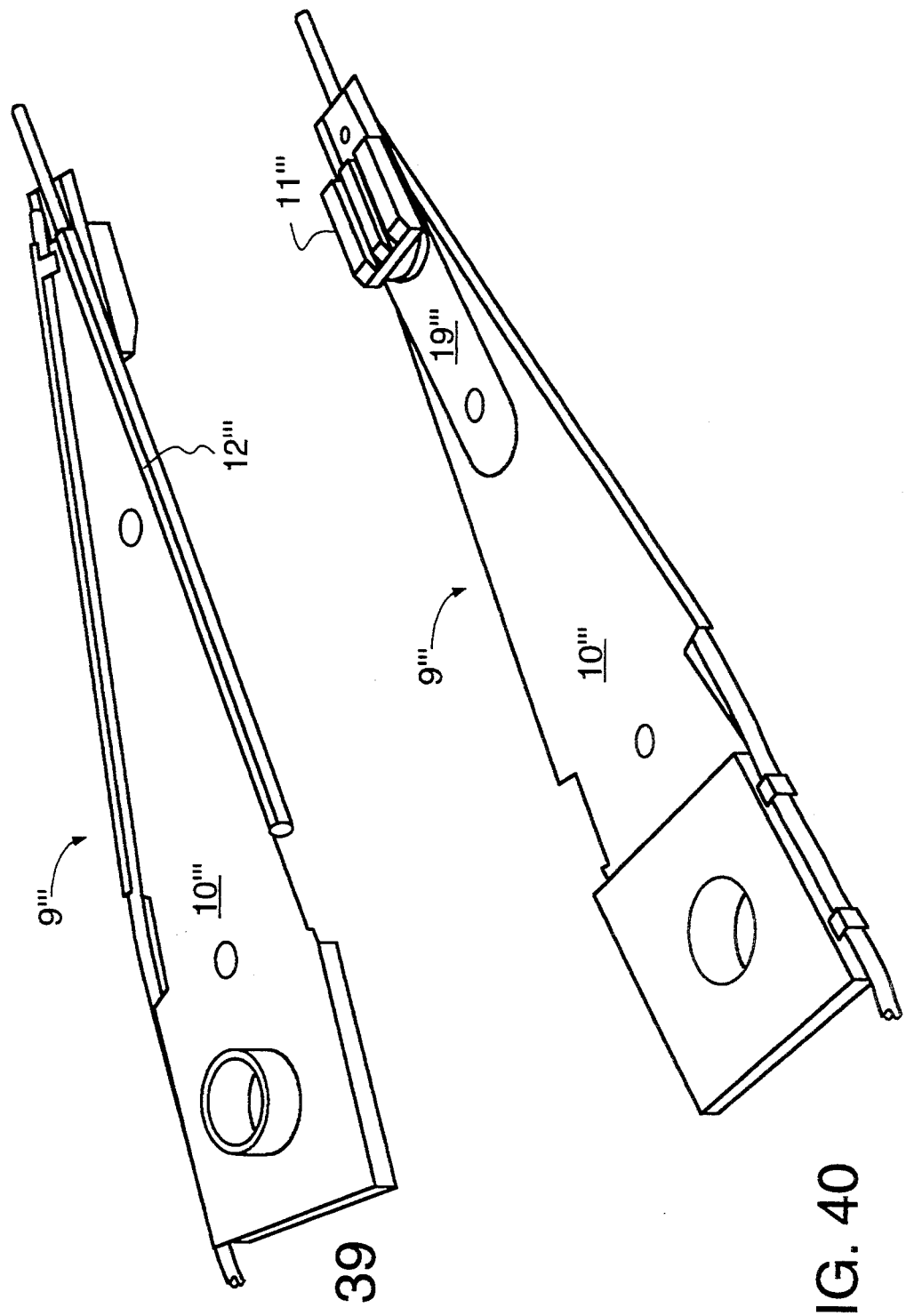
FIG. 39 is a perspective view of the head gimbal assembly of FIG. 38.
FIG. 40 is a perspective view of the lower side of the head gimbal assembly illustrated in FIG. 39.
Figure 45:
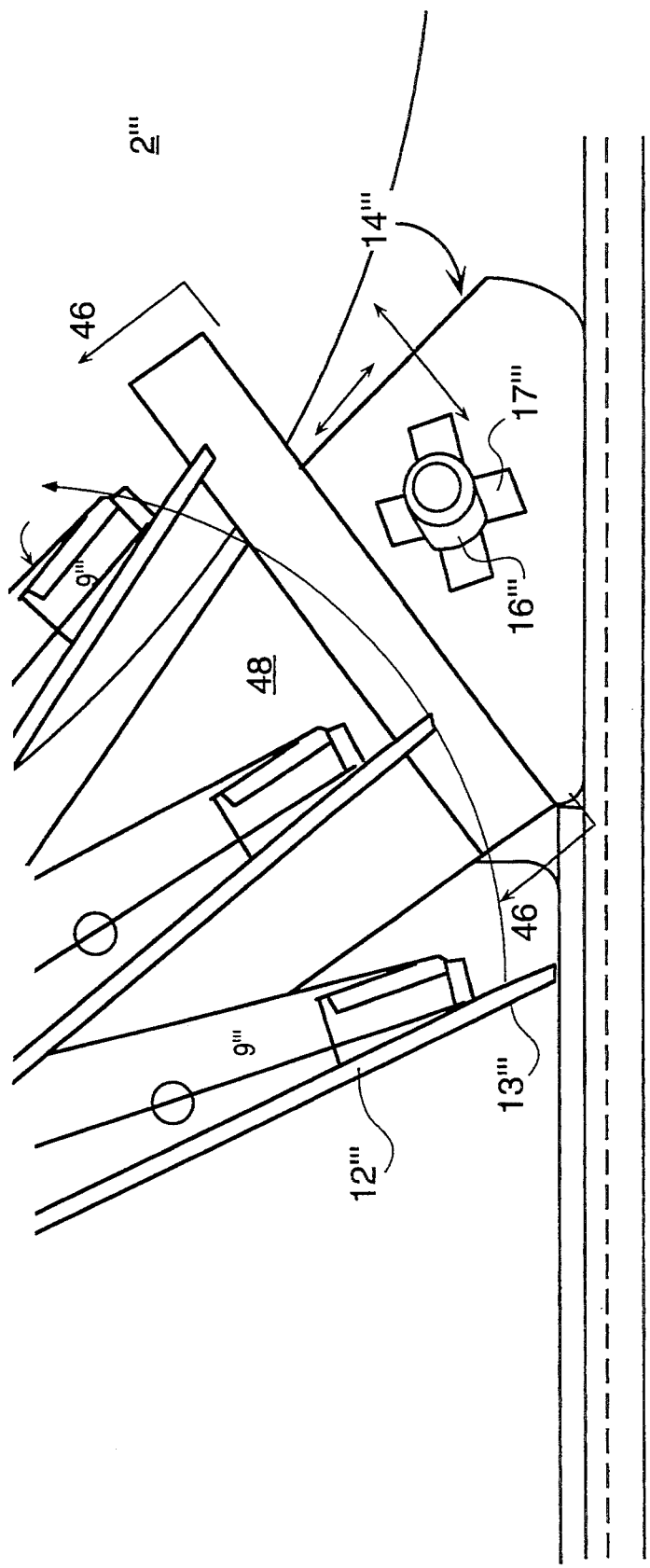
FIG. 45 is a highly enlarged view of a porion of the disk drive illustrated in FIG. 37 showing the head gimbal assembly in a plurality of locations in its travel with respect to the cooperating cam assembly.

Referring to FIG. 37, rigid disk drive 1''' in accordance with the present invention illustrated in a top plan view. Rigid disk drive 1''' is illustrated in highly enlarged scale for illustrative purposes. Included in rigid disk drive 1''' is rigid disk 2''', which may include magnetic coated surfaces for the recording and reproduction of digital information. Rigid disk 2''' is supported for rotation by a suitable motor and spindle combination (not shown). Clamp 4''' secures rigid disk 2''' to hub 5''' of the motor for rotation with the rotor portion of the motor. Rigid disk drive 1''' utilizes a rotary actuator which includes actuator body 6''' which rotates about a center of rotation 7'''. A suitable coil and permanent magnet motor (not shown) of the type well known in the art are positioned beneath return plate 8''' of the permanent magnet actuator motor assembly. Although in the disclosed embodiment of the invention a permanent magnet motor is used to position the actuator, other types of suitable drive mechanisms may be used for moving the rotary actuator. Head gimbal assembly 9''' is secured to actuator body 6''' and rotates about center of rotation 7'''. Head gimbal assembly 9''' includes a generally flat, triangular shaped load beam 10''' which supports near its free end a slider body 11''' which includes a read/write element for writing information to and reading information from magnetic recording disk 2'''. Attention is directed to FIGS. 38, 39 and 40 where additional views of head gimbal assembly 9''' are illustrated. In accordance with the present invention, a second head gimbal assembly may be utilized beneath the surface of rigid disk 2''' to provide for record and reproduction of data on the lower surface of rigid disk 2'''. Head gimbal assembly 9''' includes lift tab 12''', which in the embodiment illustrated comprises a rod, which is suitably affixed to the upper surface of load beam 10'''. Alternatively, the lift tab could be formed integrally with the load beam. Although in the embodiment illustrated herein lift tab 12''' is positioned on the side of load beam 10''' which is beyond (with respect to the center of disk 2''') center line 18''' lift tab 12''' could be positioned on the other side of center line 18''' (that is between center line 18''' and the edge of load beam 10''' which is nearer the center of disk 2'''). Supported in operative relationship with the free end 13''' of lift tab 12''' is a cam assembly 14''' which is supported on baseplate 3'''. Included on cam assembly 14''' is cam surface 15''', the contour of which will be best appreciated by reference to FIG. 42. Load beam 10''' of head gimbal assembly 9''' provides a downward force (when viewed as illustrated in FIG. 37) which maintains free end 13''' of lift tab 12''' in contact with cam surface 15'''. As will be appreciated by reference to FIGS. 37, 45 and 46, a portion of cam surface 15''' extends over the upper surface of rigid disk 2'''. Cam assembly 14''' is affixed to baseplate 3''' using a suitable fastening means, such as a bolt 16''' having a threaded end (not shown) which cooperates with a threaded opening (not shown) in baseplate 3'''. As illustrated in FIGS. 37 and 45, cross-shaped slot 17''' permits adjustment of cam assembly 14''' in the directions indicated by the arrows in FIG. 45. Adjustability of cam assembly 14''' in the direction of arrows which we generally radial with respect to the disk provides the ability to vary the landing position of the slider on the disk and thereby compensate for manufacturing tolerances. Load beam 10''' may be constructed of 0.0025" thick, 300 series stainless steel, although other material may be utilized. In the embodiment illustrated herein, lift tab 12''' comprises a stainless steel rod and Delrin (an acetal resin compound) is used for cam surface 15'''. This combination of materials provides a low friction interface, however it will of course be appreciated that other combinations of materials may be utilized. Other suitable low friction materials, such as an acetal resin compound impregnated with PTFE, or other plastic material with low friction characteristics could alternatively be used for cam surface 15'''. A suitable adhesive, such as an epoxy, is used to secure the stainless steel rod to load beam 10'''. An alternate construction would be to weld or braze rod 12''' to load beam 10'''.

The center line of load beam 10''' (indicated in FIG. 37 by reference character 18''') passes through center of rotation 7'' of rotation of rotary actuator 7''' and extends to the free end of load beam 10'''. In the present embodiment, as will be appreciated by reference to FIG. 37, the center line of lift tab 12''' is not parallel to center line 18''' of load beam 10'''. The angle of deviation between center line 18''' of load beam 10''' and the center line of lift tab 12''' is indicated in FIG. 37 by the greek letter theta ($\theta$). In the embodiment illustrated herein, lift tab 12''' extends along one edge of load beam 10''', however other variations may be utilized and it is not essential to the practice of the invention that lift tab 12''' have its central axis parallel with an edge of load beam 10'''. The important relationship to be maintained with respect to the center line of lift tab 12''' and the center line of load beam 10''' is that the angular relationship of lift tab 12''' provide an asymmetrical lifting force on load beam 10''' to provide a roll attitude to slider 11''' as it approaches the surface of rigid disk 2''' during loading of slider 11''' above disk 2'''. As will be described more fully hereinafter, the roll applied to the slider may be either "positive" or "negative" and both provide advantageous results. After lift tab 12''' has been moved out of contact with cam surface 15''', load beam 10''' (and slider 11''') assume an attitude such that the lower surface of slider 11''' and the lower surface of load beam 10''' are substantially parallel to the plane of the surface of disk 2'''.

Referring to FIG. 39, head gimbal assembly 9''' is illustrated in perspective and it will be appreciated that lift tab 12''' extends angularly with respect to the center line of load beam 10'''. Head gimbal assembly 9''' may also be referred to as the "down" assembly since the read/write element (not shown) which is supported on slider body 11''' faces down toward the upper surface of rigid disk 2 as is illustrated in the orientation in FIG. 37.

With lift tab 12''' in the orientation in FIG. 39, the downward force of load beam 10''' tilts the inner edge of the slider 11''' closer to the surface of disk 2''' than the outer edge of slider 11''' torque valve thereby imparting a positive roll to slider 11'''.

Referring to FIG. 40, which is a view of the underside of head gimbal assembly 9''' illustrated in FIG. 39, slider body 11''' is supported on flexure 19''' for gimbaling movement above the surface of the disk 2'''. Head gimbal assembly 9''' is of the Watrous-type, or also known as Whitney type suspension; however, the particular type of suspension is not relevant with respect to the present invention. Other suitable slider support arrangements may be utilized to couple slider 11''' to actuator body 6'''. The asymmetrical relationship between the axis of lift tab 12''' and the center line of head gimbal assembly 9''' may also be appreciated by reference to FIG. 38 which is a top plan view of head gimbal assembly 9'''.

Attention is directed to FIGS. 41a, 41b, 41c and 42-44 wherein the relationship between the lift tab and center line of the load beam to which it is affixed, or of which it is a part, will be described to illustrate how a negative roll, no roll or a positive roll attitude is provided to the slider affixed to the load beam. First, referring to FIG. 41a, load beam 25''' is illustrated, and includes lift tab 26''' having a free end 27'''. Supported near the end of load beam 25''' is slider 28''' which is obscured by load beam 25''' however edges 28a''' and 28b''' (also shown in FIGS. 42-44) are visible in this view. For convenience of explanation, load beam 25''' is analogous to load beam 10''' of the previous figures and is a "down" load beam. The center line of load beam 25''' is indicated by reference character 29'''. With this configuration, the lift tab 26''' extends outwardly and contacts a cam surface (not shown) along a center line 30'''. Line 31''' indicates the point of contact between free end 27''' of lift tab 26''' and center line 31''' of cam surface. It will be appreciated by reference to FIG. 41a that the intersection between the cam center line (indicated by reference character 30''') and the contact point, indicated by line 31''' of lift tab 26''' is displaced from center line 29''' of load beam 25'''. The amount of deviation is indicated by the arrows pointing to the center line of load beam 25''' and the line of contact between lift tab 26''' and the cam surface. As shown in FIG. 41a, this distance denoted as "-e" indicates the eccentricity of the geometry. The loading direction of slider 28''' onto a disk is indicated by the arrow denoted by reference character 32'''. With the relationships indicated in FIG. 41a, a "negative" roll is imparted to slider 28''' as is loaded onto a surface of a disk (not shown in FIG. 41a). Attention is directed to FIG. 42, which is a view taken along the lines 42-42 of FIG. 41a, which illustrates what is meant by a negative roll attitude which is imparted to slider 28''' as it is being loaded above disk 33''' the outer edge of which is indicated by reference character 34'''. As will be appreciated by reference to FIG. 42, edge 28a''' of slider 28''' (which is nearer the center of disk 33''' than is edge 28b''') is higher above surface 35''' than is edge 28b'''. By adjusting the point of contact between free end 27''' of lift tab 26''' and the contact point on the cam surface (not shown), the eccentricity value will be changed and similarly the roll attitude of slider 28''' will also be changed. In the rigid disk drive of FIG. 37, this adjustment is achievable by use of cross-shaped slot 17'''' on cam assembly 17''''.

Referring to FIG. 41b, for illustrative purposes a no roll embodiment is illustrated. In FIG. 41b, load beam 25''' is provided with lift tab 38''' having free end 39''', and lift tab 38''' is dimensioned such that free end 39''' contacts the cam surface (not shown) at intersection line center line 29''' of load beam 25'''. Since the cam surface contact corresponds to the center line of load beam 25''' no torque is applied to load beam 25''' and accordingly no roll results. Therefore, as will be appreciated by reference to FIG. 43, upon loading of slider 28''' above surface 35''' of disk 33''' edge 28a''' of slider 28''' is approximately the same distance from surface 35''' as is edge 28b''' accordingly this is a "no roll" or zero roll loading attitude. As will be more fully pointed out hereinafter, it is desirable that when loading a slider that either a positive or negative roll be applied; however, the no roll or zero roll attitude is described for explanatory purposes.

Referring to FIG. 41c, along with FIG. 44, a positive roll implementation of a load beam with lift tab is illustrated. In FIG. 41c, lift tab 40''' is shorter in length than either of lift tabs 38''' or 26'''. Therefore, when free end 41''' of lift tab 40''' intersects the cam (not shown) at cam center line 31''' the deviation between center line of load beam 25''' and point of contact along cam center line 30''' between the free end 41''' of lift tab 40''' provides a torque which lifts edge 28b''' higher above surface 35''' of disk 33''' than edge 28a''' as a result of the off center lifting provided by eccentricity "e". Referring to FIG. 44, it will be appreciated that edge 28a''' of slider 28''' is nearer the surface 35''' of disk 33''' than is edge 28b''' (which is near outer edge 34''' of disk 33'''). As pointed out above, a positive roll attitude (as illustrated in FIG. 44), or a negative roll attitude (as illustrated in FIG. 42), are preferable to a no roll attitude as illustrated in FIG. 43. It will be appreciated that the lift tab utilized on the load beam could be positioned on the other side of the center line and by appropriately adjusting the length of the lift tab to achieve the contact point with the cam surface positive, negative and no roll attitudes may be achieved.

The resulting torque is given by the following formula:

Torque (T) = preload × eccentricity where:
preload = force exhibited by the load beam; and
eccentricity = offset distance.

It has been found that the upper limit on torque is approximately 8–10 gm-cm. The preferable values for a device according to applicants' invention is in the range of $-0.5$ gm-cm $< T < +0.5$ gm-cm. The "$-$" and "$+$" in the foregoing range indicates negative and positive roll respectively. It will of course be appreciated that other torque values may be appropriate for different load beam structures.

Figure 46:
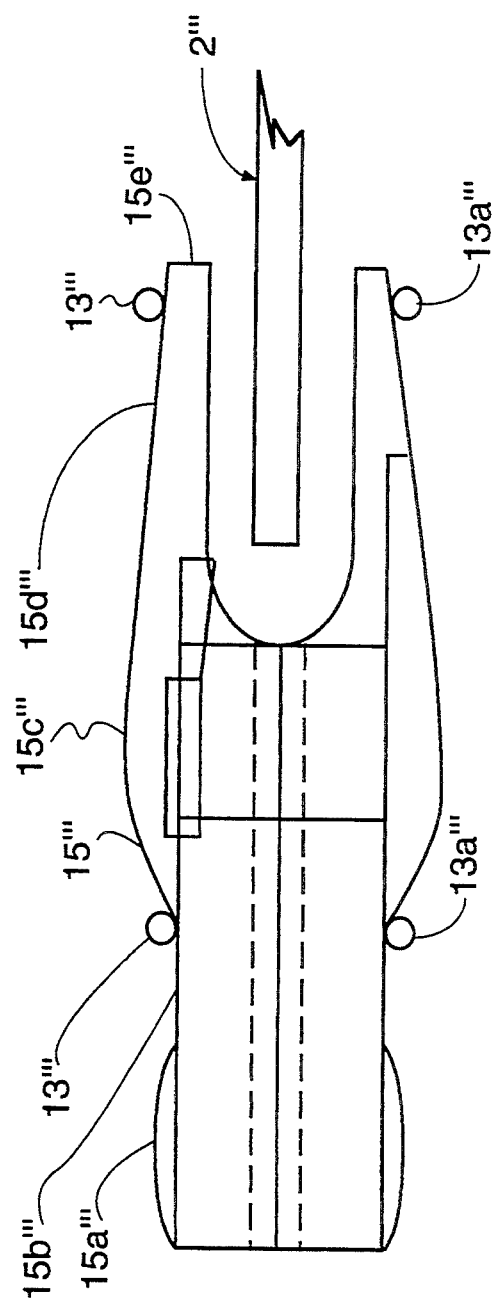
FIG. 46 is a cross-sectional view taken along the lines 46—46 in FIG. 45.

Referring to FIG. 45, a highly enlarged portion of rigid disk drive 1''' (in top plan view) adjacent to the end of head gimbal assembly 9''' which supports slider 11''' is illustrated. In FIG. 45, head gimbal assembly 9''' is illustrated in three positions for purposes of illustrating how the head gimbal assembly 9''' is initially loaded and placed into position for cooperation with cam assembly 14''' and further how, as best illustrated in FIG. 46, head gimbal assembly 9''' and a lower head gimbal assembly if utilized, cooperates with cam assembly 14''' for the dynamic loading and unloading of the sliders supported on the ends of respective head gimbal assemblies 9'''. The position of head gimbal assembly 9''' to the left-most portion of FIG. 45 is the beginning load position after installation of the rotary actuator into the drive for initial assembly purposes. This initial installation position is illustrated in the left-hand portion of FIG. 45 in which, it will be appreciated by reference to the figure, that free end 13''' of lift tab 12''' is unrestrained. Head gimbal assembly 9''' is rotated in a counter-clockwise direction and free end 13''' of lift tab 12''' travels over lobe portion 15a''' (as illustrated in FIG. 42) and with no further force being applied to rotate head gimbal assembly 9''' free end 13''' comes to rest in the detent position in valley portion 15b''' of cam surface 15'''. In FIG. 45, this position is illustrated as the central position of the three positions of head gimbal assembly 9'''. This is the at rest (or unloaded) position for head gimbal assembly 9''' and is where the assembly would be located prior to loading the heads on the disk. In operation, during start-up power is applied the drive motor and rigid disk 2''' is brought up to rotational speed after which suitable current is applied to the coil of the drive motor for the rotary actuator and head gimbal assembly 9''' is rotated in a counter-clockwise direction during which free end 13''' moves to the right as viewed in FIGS. 45 and 46), travels over lobe portion 15c''' and then down descending portion 15d''' of cam surface 15''' to the position illustrated in the right-most portion of FIGS. 45 and 46 where slider 11''' moves adjacent to the surface of disk 2'''. As a result of the asymmetrical position of lift tab 12''' on load beam 9''' during this loading operation the edge of slider 11''' closer to the inner diameter of disk 2''' will be lower than the edge of slider 11''' nearer the outer diameter of disk 2'''. This provides a positive roll attitude to slider 11'''. It will be recalled from above that a positive roll is the type illustrated in FIG. 44.

Even though the dynamically loaded head does not contact the disk directly, after several thousand load-/unloads a small amount of wear which appears as edge blending at one corner or edge of the head is evident. This blending is caused by the head contacting the higher asperities (4 to 8 microinches high) on the disk and burnishing them off. Once the burnishing has occurred, both the lower asperity height and blended head no longer contact each other and wear does not progress. The head has sustained some minor wear (1 to 10 microinches) at a position of initial approach to the disk. This wear can be at a sensitive area of the head or an insensitive area. The tunable roll feature of the present invention permits controlling the location of the blending and guaranteeing that it occurs at a non-sensitive area.

The read/write element is generally located at the rear of the slider in order to be as close as possible to the magnetic media (most often 5 to 10 microinches flying height). If the blending occurs at the read/write gap, a change in gap separation may occur, changing the magnetic performance of the head. However, if the blending occurs along an edge of the air bearing, the flying height of the whole head is little affected since its surface area is very large compared to the blended area. By introducing some roll into the head during loading and unloading, the blending is forced away from the sensitive area and the system integrity is improved.

Referring to FIG. 46, the slope of portion 15d''' of cam surface 15''' measured with respect to the surface of rigid disk 2''' may be in the range of from about 7° to 18°. The preferable range has been found to be between about 9° to 12°. As will be appreciated by reference to FIG. 46, rigid disk 2''' extends at its outer periphery interiorly at the end 15e''' of cam surface 15''', as well as interiorly of the lower cam surface (not numbered). Adjustability of cam assembly 14''' in the direction generally radial to rigid disk 2''' permits, as will be appreciated by reference to FIGS. 45 and 46, adjustment of the landing position of slider body 11''' on the surface of rigid disk 2'''.

Figure 47:
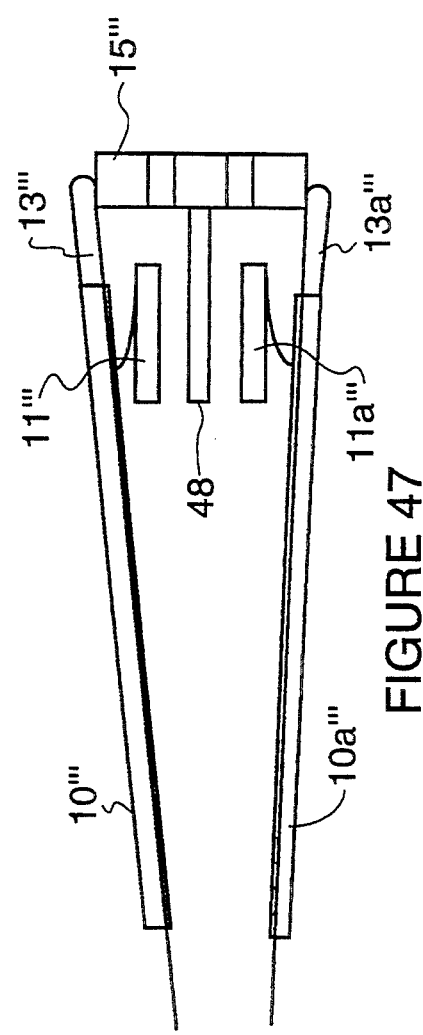
FIG. 47 is a view taken along lines 47—47 of FIG. 37.

As mentioned previously, a second head gimbal assembly may be supported beneath head gimbal assembly 9'''. By utilizing a similar support arrangement to that used for head gimbal assembly 9''', the second head gimbal assembly with its associated slider and read/write element may be dynamically loaded into operative relationship with the lower surface of disk 2'''. In FIG. 46 reference characters 13a''' indicate the respective detent and load positions of the end of a lift tab used on a lower gimbal assembly. When upper and lower actuator arms are utilized, it is desirable to include protective member 48 (illustrated in FIGS. 37, 41a–41c and 47) which extends intermediate the upper and lower head gimbal assemblies and is positioned in a plane generally parallel with the plane of disk 2'''. Referring to FIG. 47, a view along the lines of 47—47 of FIG. 37 is provided to better illustrate protective member 48. In FIG. 47, up load beam 10a''' along with its associated up slider 11a''' and free end 13a''' of up load beam 10a''' are illustrated, along with load beam 10''', down slider 11''' and lift tab 12''' with its free end 13''', all in the unloaded position. For simplification of view, rigid disk 2''' and the remaining portion of cam assembly 14''' are not shown in FIG. 47. It will be appreciated by a reference to FIG. 47 that protective member 48 prevents the unwanted impact between slider 11''' and slider 11a''' should a shock be transmitted to disk drive 1''' while the sliders are in the unloaded position. When the head gimbal assemblies are positioned outside of the travel above the surface of disk 2''', by utilizing protective member 48 shocks which may be transmitted to disk drive 1''' which would move flexure 19''' and would otherwise cause slider 11''' to impact up slider 11a''' of up load beam 10a''' are no longer a problem since protective member 48 prevents slider-to-slider impacts. Without the use of protective member 48, the read/write elements on their respective sliders may be damaged. Protective member 48 also limits destructive overtravel of flexure 19'''. Protective member 48 may either be a separate planar structure or formed as part of cam assembly 14'''. When formed as part of cam assembly 14''' it would of course be constructed of the same material; however, if a separate member is utilized, it is preferred that it be composed of a soft resin impregnated with PTFE (which is also referred to by the tradename Teflon).

In view of the compact footprint and thickness of head disk assembly 1 in accordance with the present invention, the environment in which the present invention will be utilized lends itself to palm top, hand held and lap top computers which in their use may readily be subjected to strong rotational forces as they are jarred, bumped and sometimes dropped when being carried about or otherwise not in use. Such rugged environment may, without appropriate protection, cause the slider utilized with the rigid disk to be moved into contact with the disk surface which may damage the slider and the disk surface as well making the disk drive inoperative and potentially causing the loss of data. Head disk assembly 1 of the present invention includes an inertial latch to prevent the rotary actuator from being moved into operative relationship with disk when the device which includes head disk assembly 1 may be jarred or subjected to inertial forces which would otherwise cause the slider body on the respective load beams to come into contact with the surface of rigid disk 16. The inertial latch utilized in head disk assembly 1 is positioned beneath return plate 43. A detailed description of the inertial latch is included in commonly assigned and copending U.S. Pat. No. 5,189,576 issued Feb. 23,1993 by J. Morehouse et al. and entitled "Rotary Inertial Latch For Disk Drive Actuator", which is incorporated herein by reference in its entirety. The rotary inertial latch described in the above-identified patent application includes an inertial body which is mounted on a shaft which is substantially parallel to center of rotation 30 of the rotary actuator. The inertial body includes a pin which is capable of engaging finger 62 of coil support extension 54 of the actuator body so as to prevent the actuator from rotating. The inertial body is free to rotate about its shaft, but a small spring biases it in an unlocked position such that the locking members on the inertial member are positioned such that the actuator may be freely moved when the disk drive is not being subjected to rotational forces. However, when the disk drive is subjected to a strong rotational force or shock, the main body of the disk drive accelerates angularly in a direction of the force, the inertial body rotates and assuming the shock is in a direction which would tend to swing the rotary actuator such that the heads would swing toward the disk, the locking members of the inertial body engage finger 62 and prevent the actuator from angular movement with respect to the head disk assembly. In addition the actuator is balanced as nearly as possible (considering manufacturing tolerances) with respect to its center of rotation. This balanced design minimizes torque on the actuator when the drive is subjected to translational shocks, thereby minimizing rotational forces on the actuator.

Figure 33:
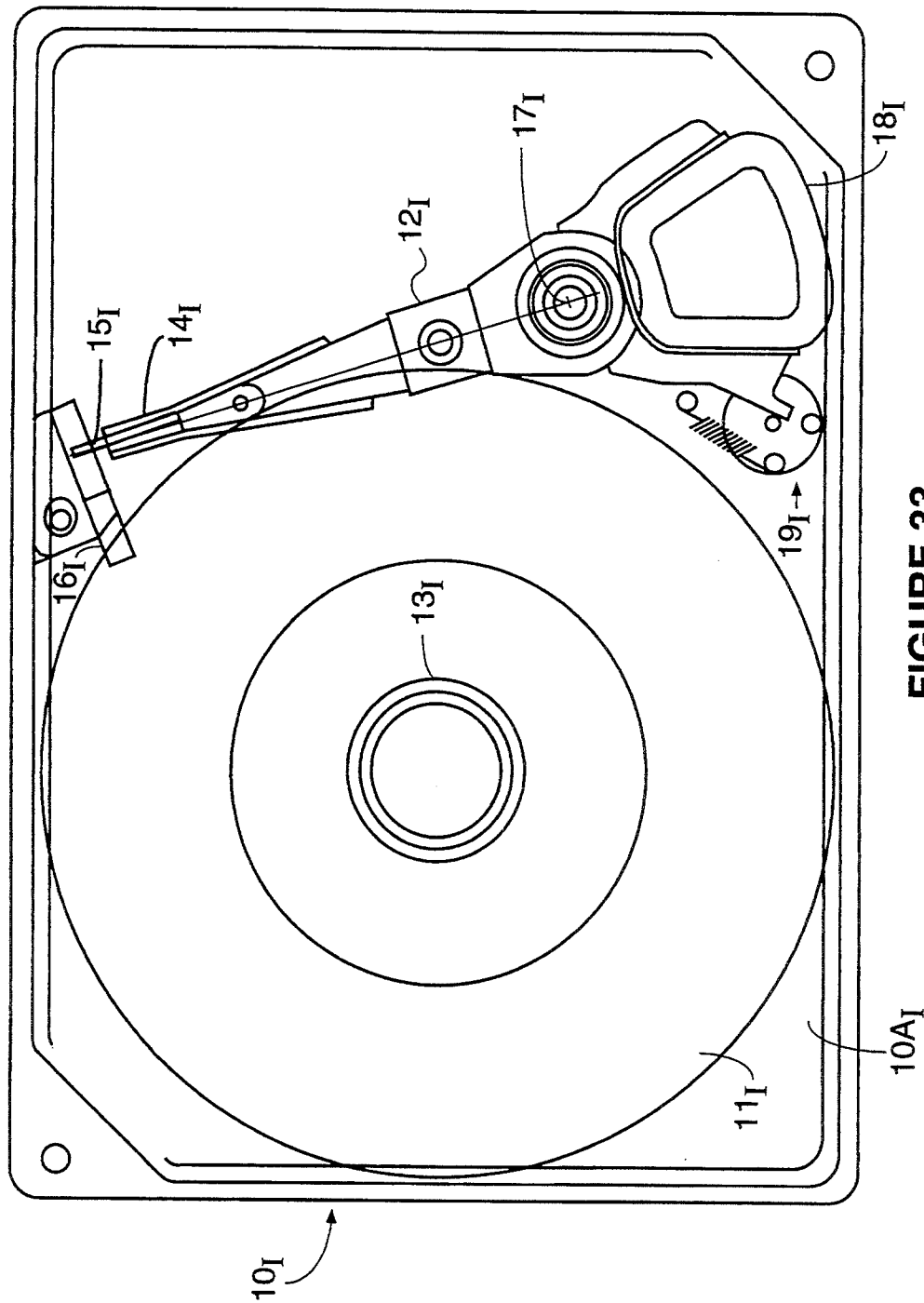
FIG. 33 is a general overhead view of a dynamic loading disk drive, showing the relative positions of a rotary actuator and an inertial latch in accordance with this invention.
Figure 35:
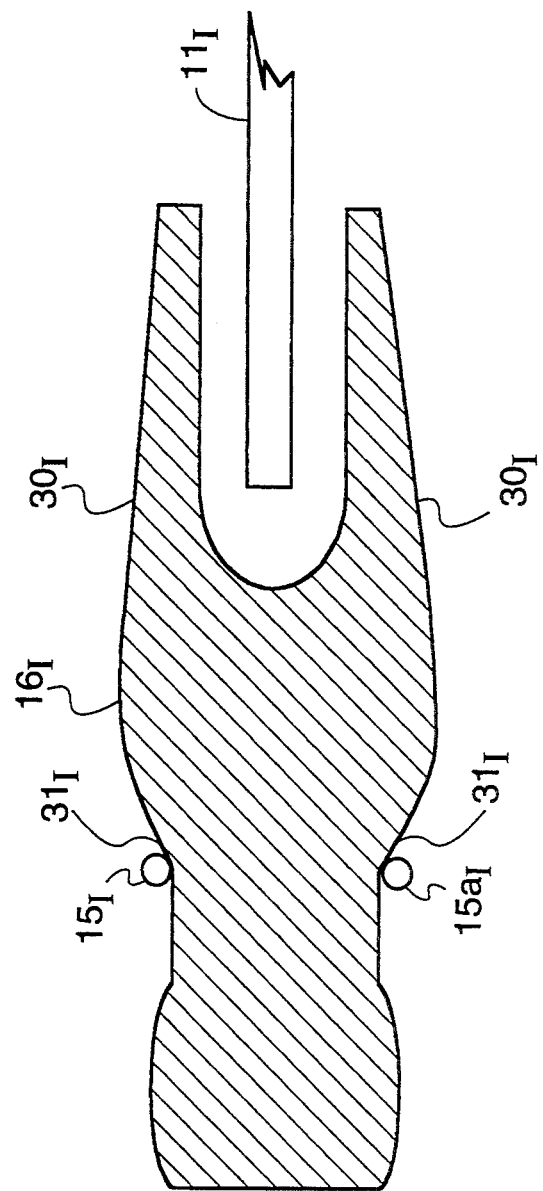
FIG. 35 is a side view of the ramp and related elements shown in FIG. 33.

FIG. 33 shows a general overhead view of a dynamic loading disk drive $10_I$, which includes a drive body $10A_I$, a disk $11_I$ and a rotary actuator $12_I$. Disk $11_I$ is driven by and rotates around a combined spindle and motor $13_I$. At one end of actuator $12_I$ are mounted a magnetic head $14_I$ and a cam follower $15_I$, the latter of which rides on a ramp $16_I$. FIG. 35 shows the structure of cam follower $15_I$ and ramp $16_I$ in more detail.

Actuator $12_I$ rotates about pivot shaft $17_I$ and is driven by an actuator coil $18_I$ in conjunction with a magnet assembly (not shown) which together make up a voice coil motor which swivels actuator $12_I$ so as to position magnetic head $14_I$ over a desired location on disk $11_I$. Positioned adjacent an end of actuator $12_I$ is an inertial latch $19_I$, which will now be described in greater detail with reference to FIG. 34A.

Figure 34A:
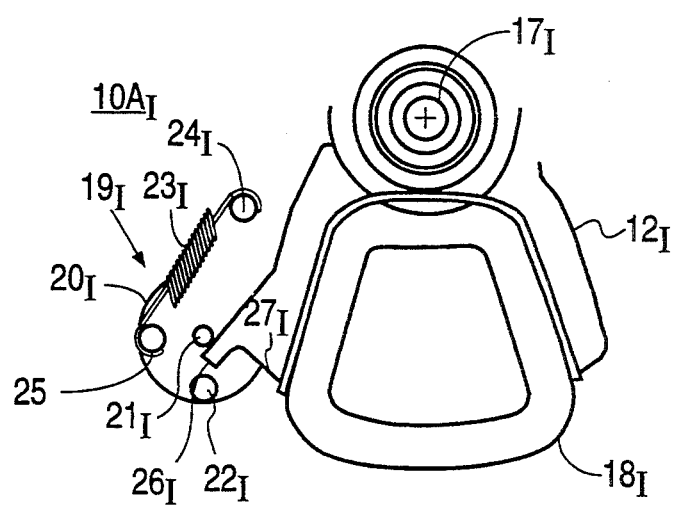
FIGS. 34A and 34B show a portion of a rotary actuator and an inertial latch in accordance with the invention, with the latch in unlocked and locked positions, respectively.

FIG. 34A shows inertial latch $19_I$ when it is in an open or unlocked condition. One end of a shaft $21_I$ is journaled into an inertial body $20_I$ so as to allow inertial body $20_I$ to rotate in either direction. The other end of shaft $21_I$ is attached to body $10A_I$. Inertial body $20_I$ is shown as being circular in FIG. 34A, but this is not in any respect intended to be limiting. Inertial body $20_I$ may be configured in virtually any shape, since its shape is not critical to its operation. A locking pin $22_I$ is attached to the surface of inertial body $20_I$. When inertial latch $19_I$ is in its unlocked condition, as shown in FIG. 34A, the angular position of locking pin $22_I$ about shaft $21_I$ is determined by a coil spring $23_I$, which extends between a pin $24_I$ joined to drive body $10A_I$ and a pin $25_I$ joined to inertial body $20_I$. A finger $26_I$ protrudes from actuator $12_I$, adjacent to which is a striking surface $27_I$, which is aligned to be in the path of pin $22_I$ as it rotates in a counterclockwise direction.

When drive $10_I$ is not operative, magnetic head $14_I$ is normally restrained by the structure shown in FIG. 35, which shows ramp $16_I$ viewed from the side away from actuator $12_I$. This structure is described in greater detail in copending and commonly assigned U.S. patent application Ser. No. 07/629,948 of J. Morehouse et al. filed on Dec. 19, 1990 and entitled: "Miniature Hard Disk Drive For Portable Computer" which is incorporated herein by reference in its entirety. As shown in FIG. 35, cam follower $15_I$ is mirrored by a similar cam follower $15a_I$ beneath ramp $16_I$. Cam followers $15_I$ and $15a_I$ encounter inclines $30_I$ on ramp $16_I$ when they swing away from disk $11_I$. As cam followers $15_I$ and $15a_I$ slide further leftward along inclines $30_I$, magnetic head $14_I$ is lifted away from the surface of disk $11_I$, until cam followers $15_I$ and $15a_I$ reach locking positions $31_I$. A stop (not shown) prevents cam followers $15_I$ and $15a_I$ from moving substantially beyond locking positions $31_I$.

Figure 34B:
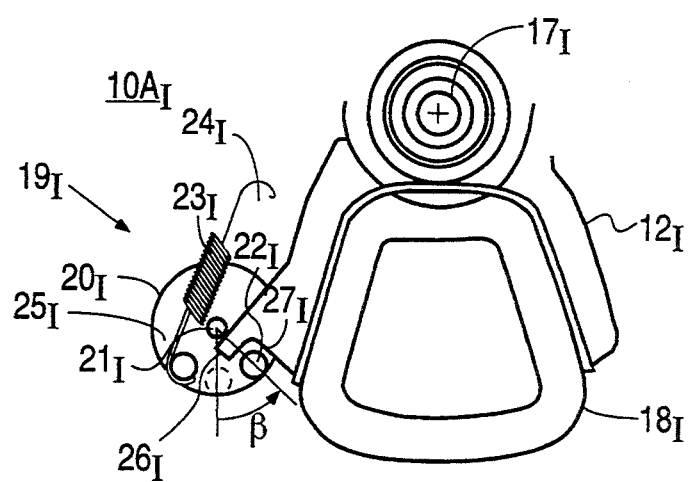

The Operation of inertial latch $19_I$ will now be described. When the disk drive is turned off, cam followers $15_I$ and $15a_I$ normally rest in locking positions $31_I$, and inertial latch $19_I$ is in the unlocked condition shown in FIG. 34A. The frictional force between cam followers $15_I$ and $15a_I$ and ramp $16_I$ is enough to restrain actuator $12_I$ from swinging as a result of a minor rotational shock. If disk drive $10_I$ incurs a strong clockwise rotational force, however, actuator $12_I$ will tend to rotate in a counterclockwise direction with respect to body $10A_I$, potentially allowing magnetic head $14_I$ to make contact with disk $11_I$. In this case, the inertia of inertial body $20_I$ will overcome the force of spring $23_I$, and inertial body $20_I$ will also rotate in a counterclockwise direction with respect to body $10A_I$. Pin $22_I$ will therefore rotate through an angle $\beta$ as shown in FIG. 34B until it strikes surface $27_I$. In this position, pin $22_I$ blocks any appreciable movement of arm $26_I$ to the right and thereby prevents actuator $12_I$ from rotating in a counterclockwise direction. Following the shock, spring $23_I$ will urge inertial body $20_I$ back to the unlocked position shown in FIG. 34A, and cam followers $15_I$ and $15a_I$ will return to locking positions $31_I$.

If disk drive $10_I$ incurs a strong counterclockwise force, no problem will arise since actuator $12_I$ will tend to rotate clockwise with respect to body $10A_I$ until it reaches the stop (not shown), after which cam followers $15_I$ and $15a_I$ will return to locking positions $31_I$.

It will be apparent that the effective operation of inertial latch $19_I$ depends in part on the correct adjustment of the torque impressed by spring $23_I$ on inertial body $20_I$ as compared with the moment of inertia of inertial body $20_I$. In practice, it has been found that spring $23_I$ should exert just enough force to maintain latch $19_I$ in an unlocked condition when disk drive $10_I$ is not being exposed to significant rotational forces.

It should be stressed that the configuration shown in FIGS. 34A and 34B, including inertial body $20_I$, pin $22_I$ and finger $26_I$ is illustrative only. As noted above, inertial body $20_I$ need not be round and can in fact assume a wide variety of shapes and sizes. Pin $22_I$ and finger $26_I$ may be replaced by any two members or devices which are capable of engaging or interlocking in any way upon the rotation of inertial body $20_I$, so as to prevent actuator $12_I$ from rotating in a manner to threaten contact between magnetic head $14_I$ and disk $11_I$. While inertial body $20_I$ is shown as being positioned under actuator $12_I$, this relationship likewise need not be adhered to. Inertial member $20_I$ could be below actuator $12_I$, above actuator $12_I$, laterally adjacent actuator $12_I$, or any combination of the foregoing. Moreover, inertial latch $19_I$ need not be located at the position on housing $10A_I$ shown in FIG. 33 and FIGS. 34A and 34B. It can be located at a position adjacent any portion or surface of actuator $12_I$. The moment of force applied by inertial latch $19_I$ against the unwanted rotation of actuator $12_I$ will, of course, be greater to the extent that inertial latch $19_I$ is distanced from pivot $17_I$.

Spring $23_I$ may likewise be replaced by a variety of mechanisms that will maintain inertial latch $19_I$ in an unlocked condition and prevent it from locking inadvertently when disk drive $10_I$ is not being subjected to a rotational force. For example, an elastic or elastomeric device could be used in place of spring $23_I$. A torsional spring could be placed around shaft $21_I$, or spring $23_I$ and shaft $21_I$ could be integrated into a flexural spring pivot. A passive magnet might also be used to hold inertial member $20_I$ in an unlocked position in normal situations.

Figure 36:
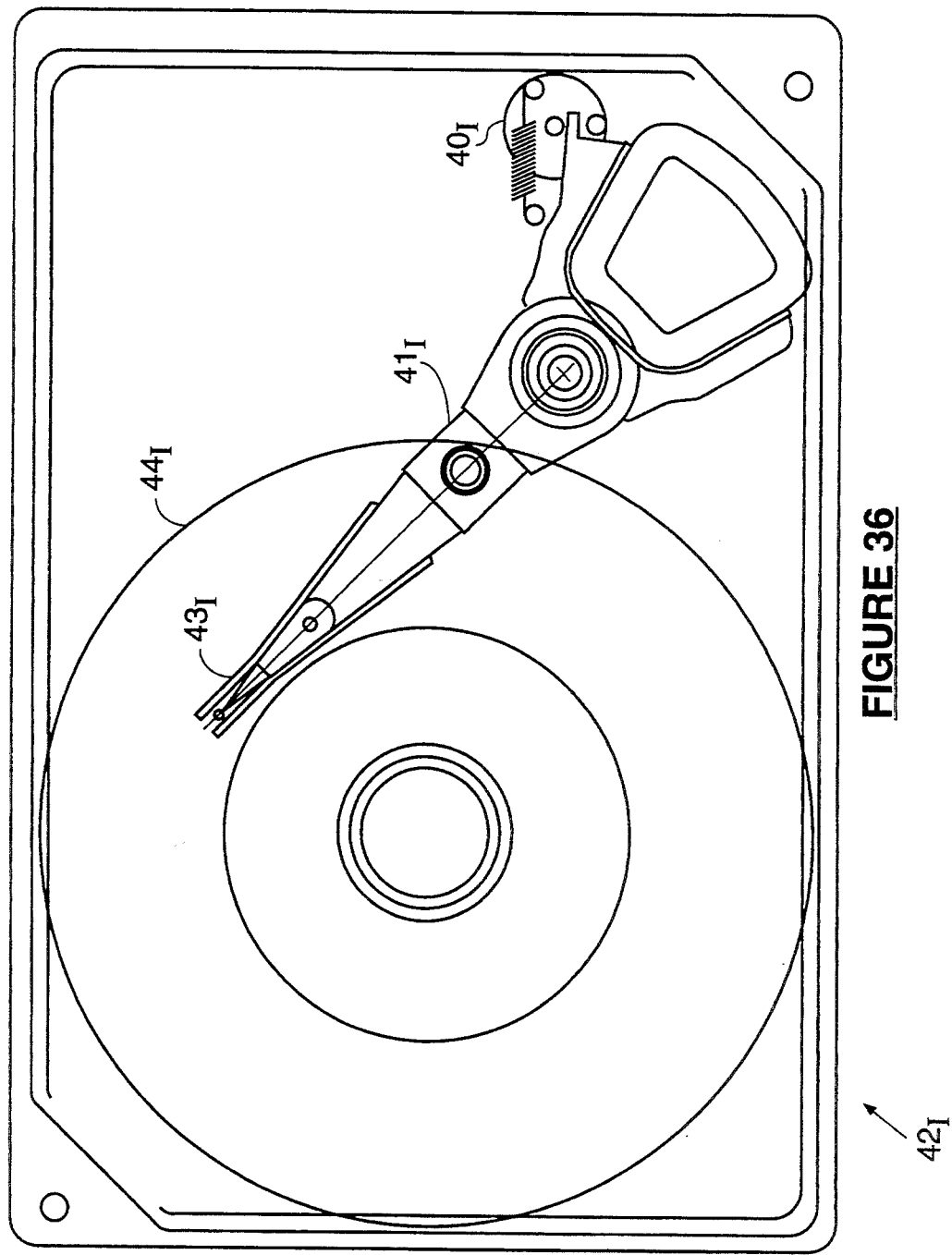
FIG. 36 is an overhead view of a contact start/stop (CSS) disk drive having an inertial latch in accordance with the invention.

An inertial latch according to this invention may also be used with a contact start/stop disk drive. Such an embodiment is shown in FIG. 36, where an inertial latch $40_I$ is configured so as to prevent clockwise rotation of an actuator 41 with respect to the remainder of a contact start/stop disk drive $42_I$. A head $43_I$ is shown in its "parking" position on an inner portion of a disk $44_I$ while disk drive $42_I$ is not in operation. FIG. 36 shows inertial latch $40_I$ in a locked condition, preventing head $43_I$ from sliding across disk $44_I$ in a clockwise direction when drive $42_I$ encounters a counter-clockwise rotational force.

Further protection of the disk drive in accordance with the present invention is provided through the use of a shock absorbing mounting arrangement to further isolate the head disk assembly from outside forces which may damage the device. A detailed description of the shock absorbent mounting for the head disk assembly of the present invention is found in commonly assigned U.S. Pat. No. 5,161,770 issued Nov. 10, 1992, and by J. Morehouse et al. and entitled "Shock Absorbent Mounting Arrangement For Disk Drive Or Other Component", which patent is incorporated herein by reference in its entirety.

Figure 21:
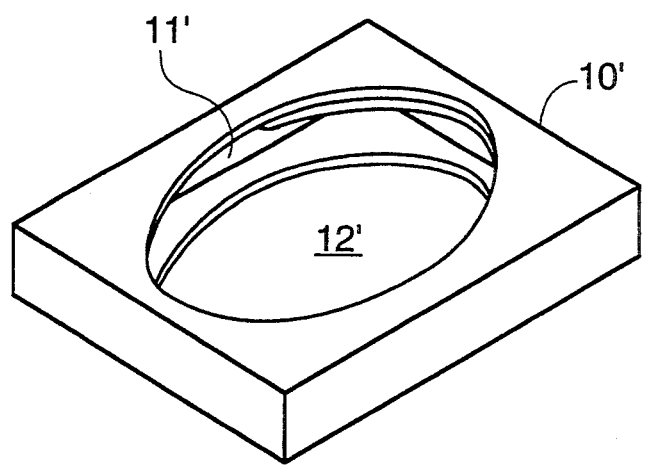
FIG. 21 shows a perspective view of a shock absorbent jacket in accordance with the invention.

FIG. 21 shows a shock absorbent jacket 10' in accordance with the invention. Jacket 10' is fabricated or molded from foam rubber or another soft material. Oval-shaped apertures 11' and 12' in jacket 10' are sized to permit a disk drive to be inserted into the jacket.

Figure 22:
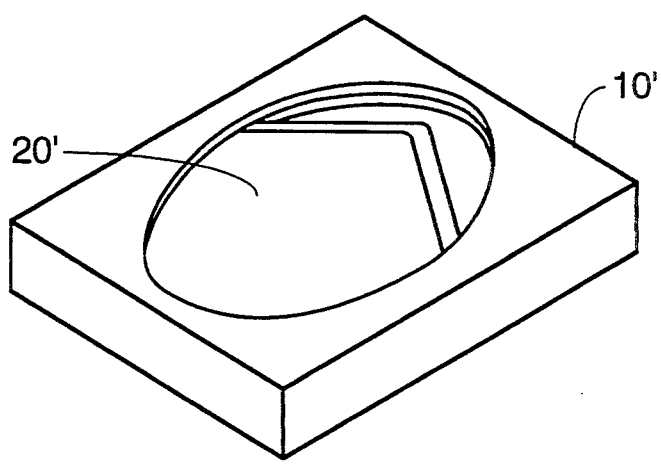
FIG. 22 shows the jacket of FIG. 21 with a disk drive enclosed.

FIG. 22 shows jacket 10' with a disk drive 20' enclosed inside.

Figure 23:
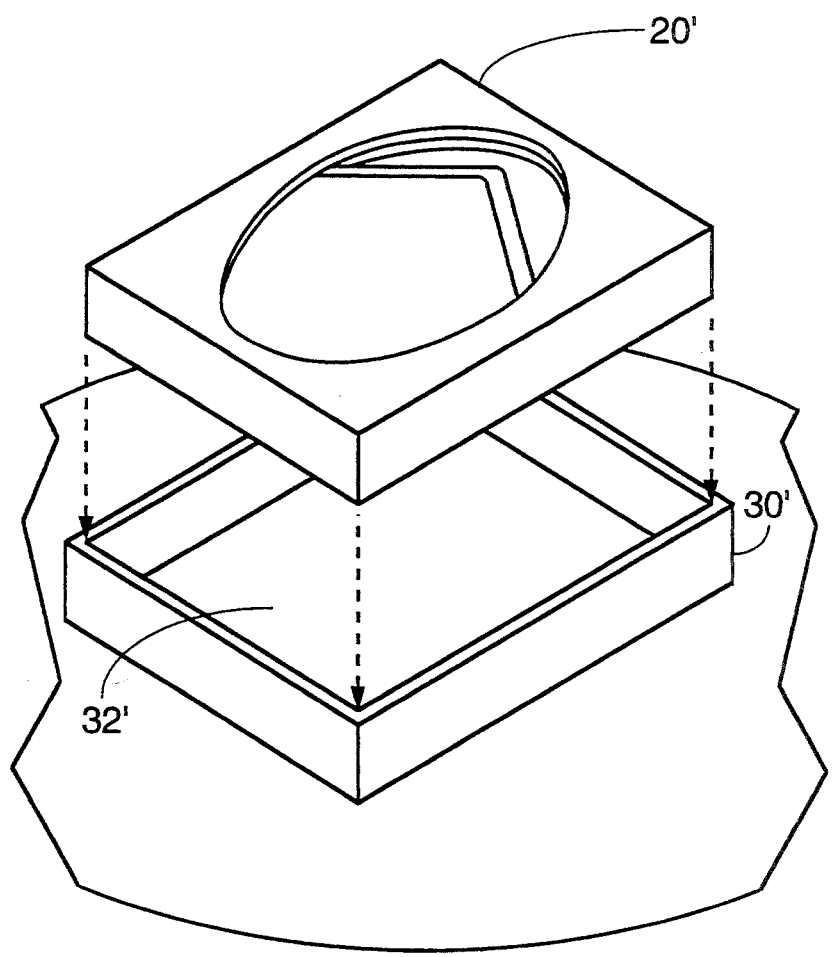
FIG. 23 shows a disk drive mounted in a computer housing in accordance with the invention.

FIG. 23 illustrates the manner in which disk drive 20' is mounted in a housing 31' of a computer. Jacket 10' with disk drive 20' inside is placed within the perimeter of a fence 30', which is attached to housing 31' and defines a cavity 32'. The respective heights of jacket 10' and fence 30' are essentially equal. After jacket 10' and drive 20' have been placed into cavity 32', a planar cover (not shown) is placed on top of fence 30', thereby securing disk drive 20' in place. It has been found that for maximum protection against shock forces a space of approximately 0.5 to 1.5 mm should be allowed between the external surfaces of drive 20' and the opposing surfaces of fence 30', computer housing 31' and the cover. The thickness of jacket 10' should fill this space so that drive 20' is loosely but securely held in cavity 32'.

If the center of gravity of drive 20' is at or near its physical center (as is normally the case), the material of which jacket 10' is fabricated should be uniform in terms of thickness and stiffness on all sides of drive 20'. This will insure that the resultant of any force applied to drive 20' through jacket 10' will be substantially directed through its center of gravity. If the center of gravity of drive 20' is significantly to one side of its physical center, jacket 10' should be made somewhat thicker and/or stiffer, and therefore capable of absorbing a greater shock force, on that side. Otherwise, drive 20' will tend to rotate within cavity 32' in the presence of a translational force and the "coupling" referred to above will occur.

Figure 24:
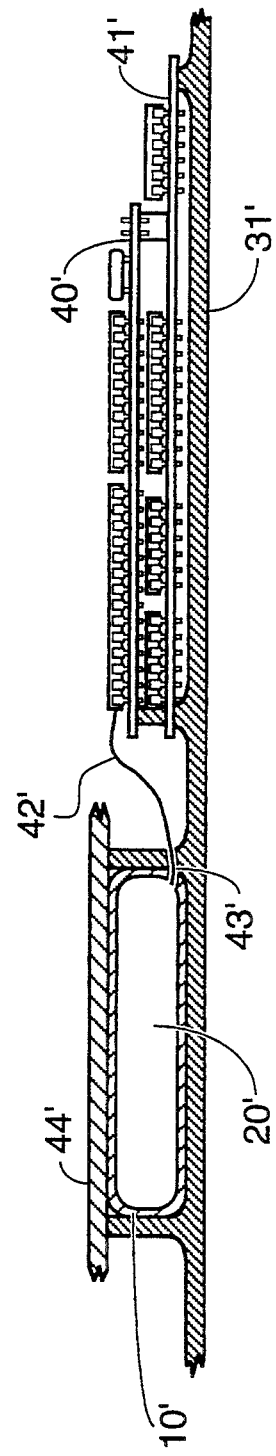
FIG. 24 shows in cross section a disk drive and associated circuit boards mounted in a computer housing in accordance with the invention.
Figure 25A:
FIG. 25A to 25E show in cross section illustrative patterns into which a shock absorbent jacket in accordance with the invention may be formed.
Figure 25B:
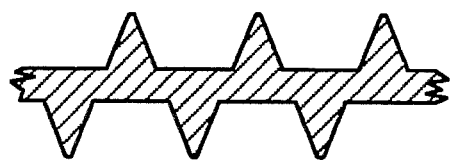
Figure 25C:
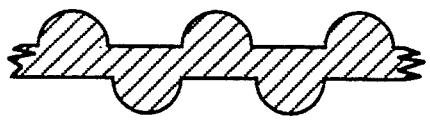
Figure 25D:
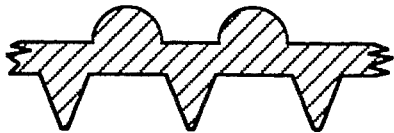
Figure 25E:
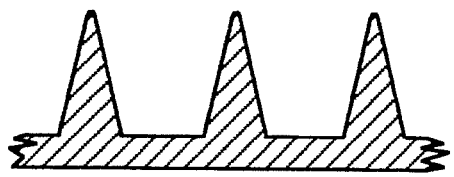

FIG. 24 shows a cross-sectional view of the structure just described and illustrates in addition the connection of disk drive 20' to drive controller board 40' and computer motherboard 41' via a flexible connector 42'. Flexible connector 42', passes through a channel 43' in fence 30'. A cover 44', which contacts the top edge of fence 30', forms a closed cavity within which disk drive 20' rests. Cover 44' and housing 31' are preferably made of molded plastic and are designed to fit together so as to create a rigid or semi-rigid cavity within which disk drive 20' is lodged.

Drive controller board 40', which is associated with and controls disk drive 20', is "piggybacked" onto motherboard 41', which contains circuits and devices for the computer. The piggyback assembly of drive controller board 40' and motherboard 41' is typically attached to housing 31' by screws or clips which fit into threaded sockets or snap-tight devices in housing 31'. It will be noted that the structure of FIG. 24 provides a low profile for the assembly of disk drive 20', drive controller board 40' and motherboard 41' which is particularly suitable for a laptop, hand held or other small computer.

The advantages of the arrangements described above and shown in FIGS. 21–24 will be evident to those skilled in the art. Disk drive 20' can be inserted into shock absorbent jacket 10' and placed into a cavity in the computer housing with a minimal amount of effort and expense. There is no need to assemble a multiplicity of small parts such as the screws and grommets frequently used in previous shock protective mounting arrangements. Moreover, when fitted into the cavity, the center of mass of disk drive 20' will be directly in line with the resultant force imposed on drive 20' by jacket 10' if the computer is subjected to an external shock. Accordingly, there is no danger of the undesirable coupling of translational shocks into rotatory shocks typically experienced in prior art structures.

The shock absorbent jacket discussed above was manufactured from foam rubber or other soft material, preferably having a durometer reading of approximately 40 Shore A. An elastomer or other material formed into a rippled, ribbed, beaded or other pattern may also be used. Examples of such structures are shown in cross section in FIGS. 25A–25E. These structures exhibit a relatively low stiffness or resistance to deformation in the presence of low shock forces such as might be encountered when the computer or other instrument is in operation, while providing a high stiffness in the presence of a large, high-energy shock force and the resulting relatively large displacement. If a ribbed or other patterned material is used, the mechanical stiffness thereof (i.e., the material plus section modulus) should preferably be about the same as that of the foamed material.

Figure 26:
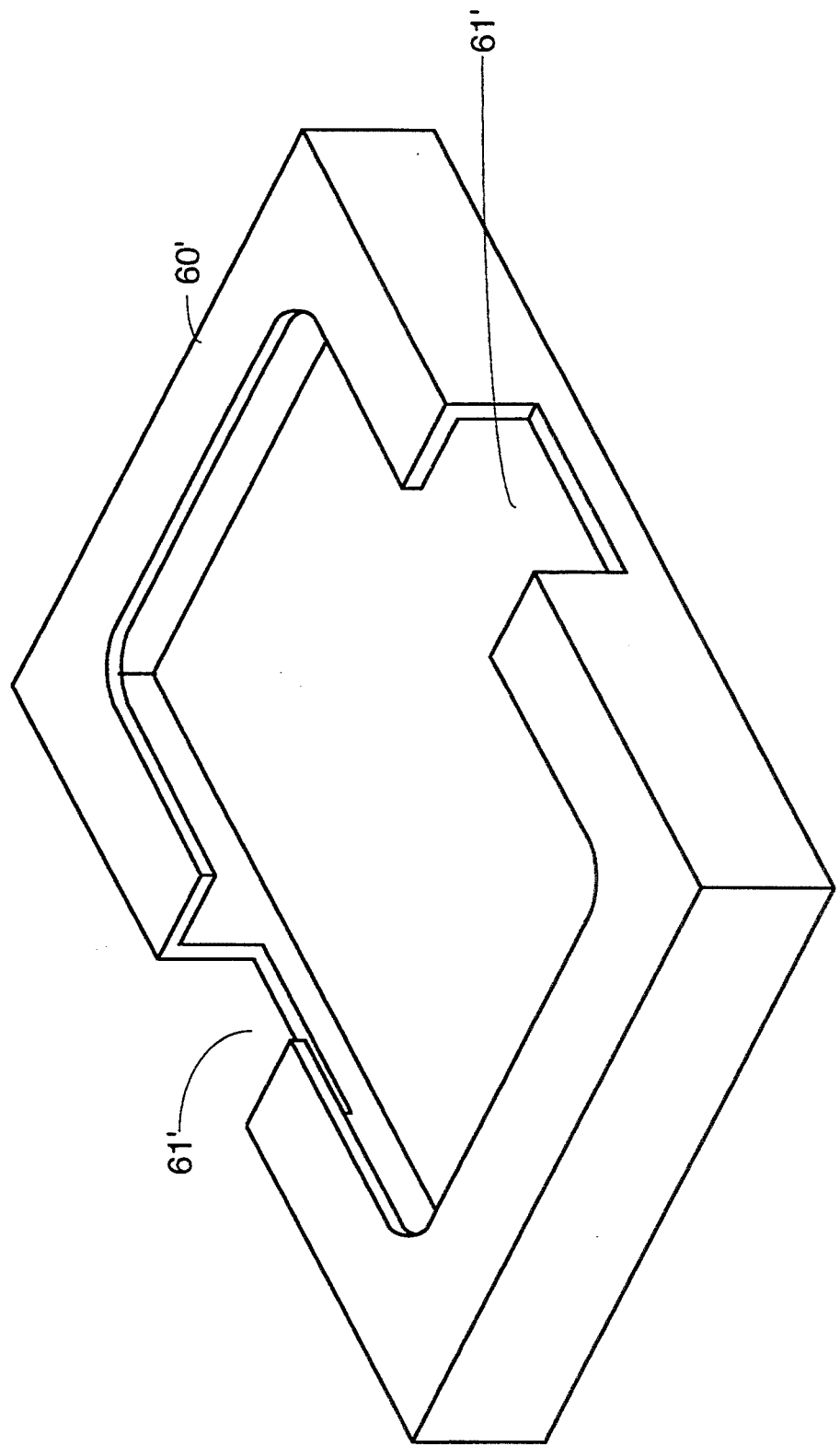
FIG. 26 shows a perspective view of another embodiment of a shock absorbent jacket in accordance with this invention.

A shock absorbent jacket in accordance with this invention may be fabricated in an infinite variety of configurations and may have apertures of various sizes and shapes formed in its surface, provided that, when installed, the jacket provides the component enclosed inside with protection against shocks regardless of the direction from which they originate. Manufacturing considerations may also affect the form of the jacket. For example, FIG. 26 shows a jacket 60' with slots 61' in either side. Jacket 60' could be molded with its ends bent back on one another so that it forms a U-shaped profile when viewed from the side. This would allow it to be easily formed in an injection mold and removed from the mold when completed. Also, several jackets can be used in lieu of a unitary jacket, provided again that they assure protection from shocks in any direction. It will be apparent, for example, that disk drive 20' could be protected by cup-shaped jackets fitted over both ends.

The cavity or recess into which the component is fitted need not be fully enclosed either, so long as it retains the component at an essentially fixed position in relation to the computer or other instrument on which the component is to be mounted and, working in conjunction with the shock absorbent jacket, it protects the component against any shock, whatever the direction. The component could, for example, be placed inside a cage or lattice-type arrangement.

Disk drives (particularly their read/write heads) are frequently subjected to the adverse effects of electromagnetic radiation from sources inside the computer or other instrument in which they are mounted, or beyond. In a computer, for example, electromagnetic interference (EMI) may emanate from the power supply, switching devices or display screen. In addition, electrostatic charge may build up in the drive and may damage the drive when it discharges.

In another embodiment of this invention, the shock absorbent jacket is constructed of an electrically conductive material which protects the drive or other component against electrostatic discharge (ESD) and which shields it against EMI from sources outside the jacket. Available foams and elastomers which contain carbon or metallic particles or fibers dispersed within them will provide adequate ESD protection and some EMI protection. Superior EMI protection will be obtained with foams or elastomers which have metallic wire meshes imbedded in them or bonded to them. For good ESD and EMI protection, it is desirable to provide a jacket which encloses the drive or component on all sides.

Figure 12:
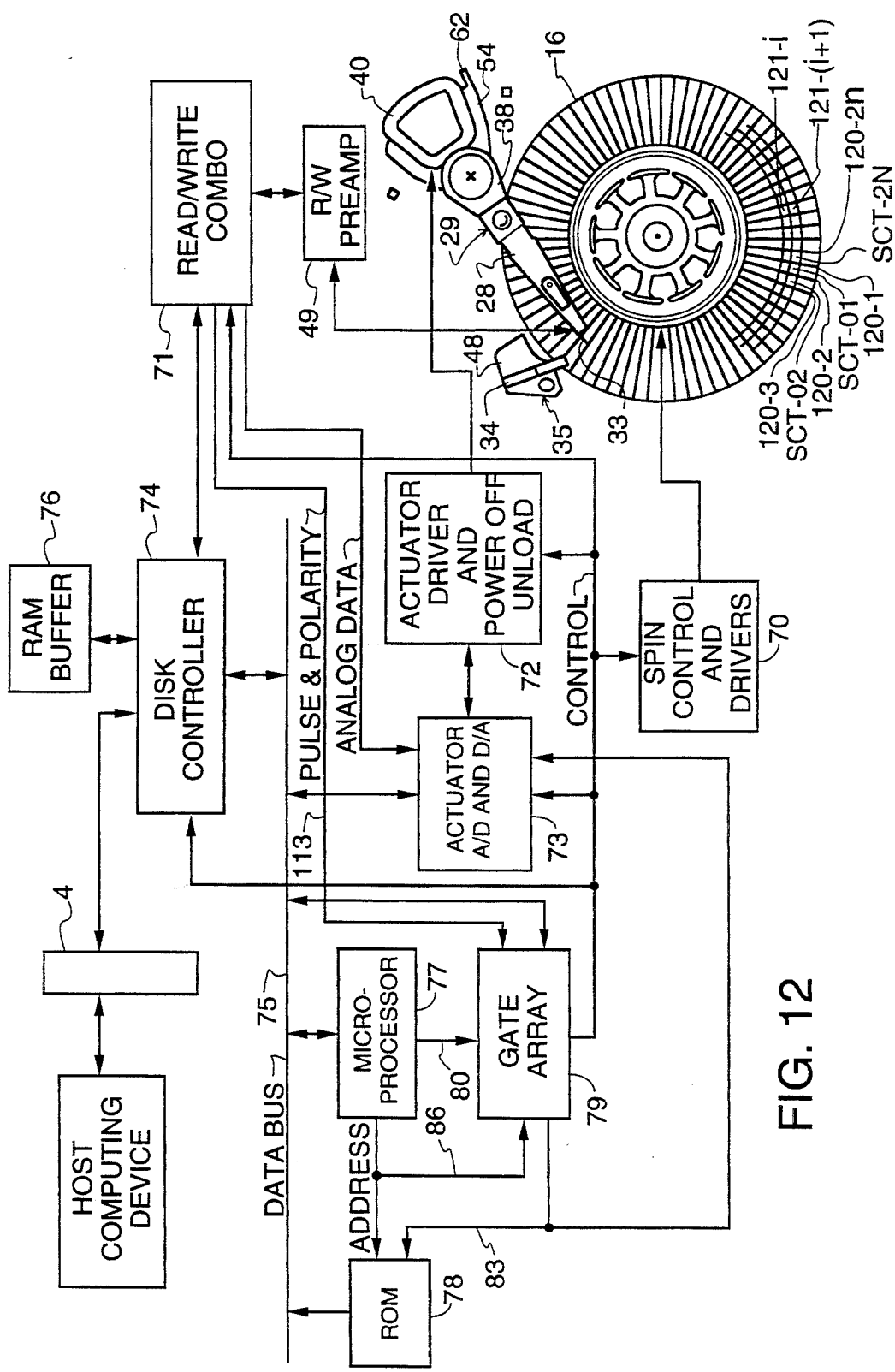
FIG. 12 is a combined electrical block diagram and partial structural diagram of the head disk assembly.
Figure 13:
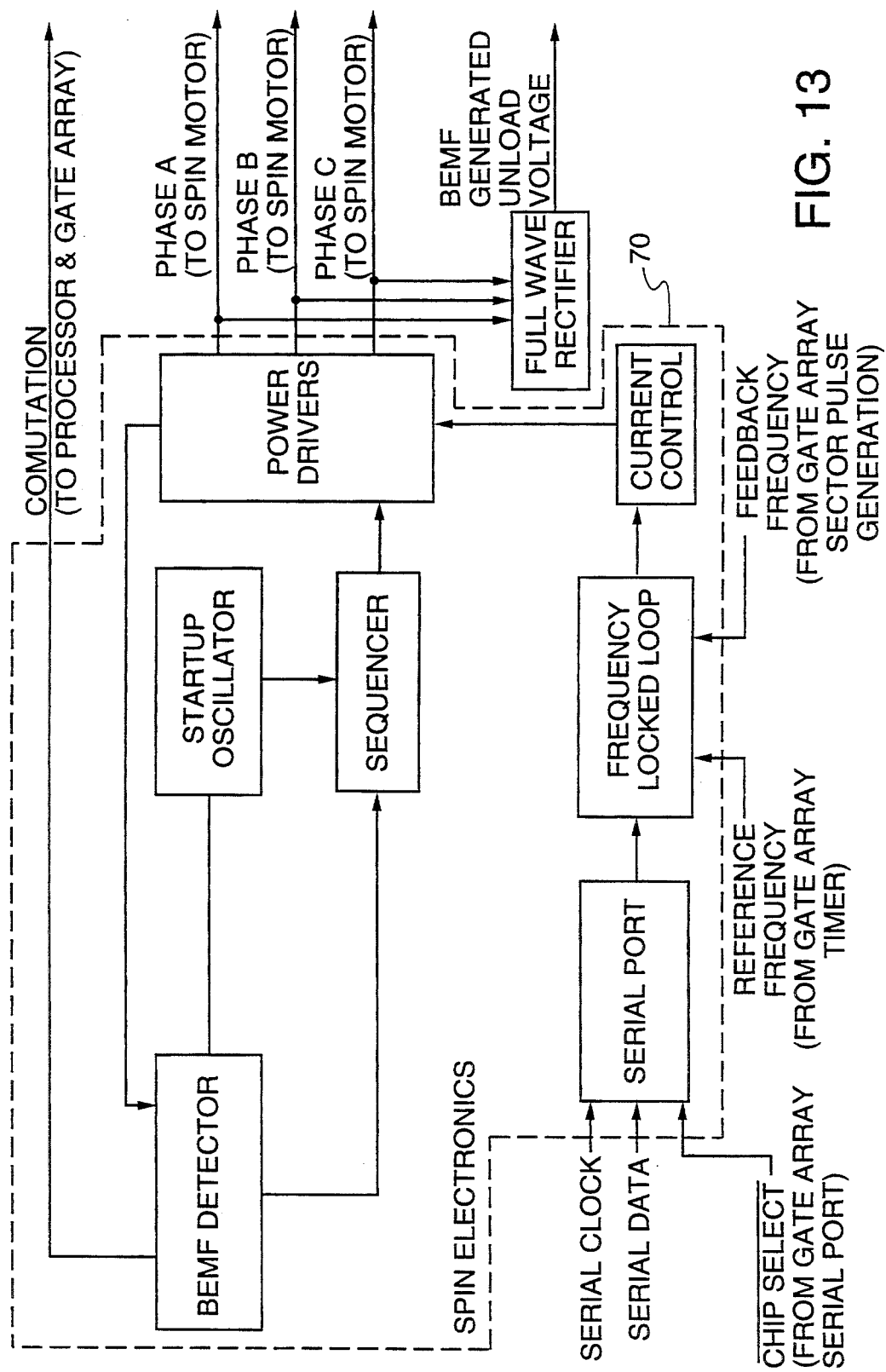
FIG. 13 is a block diagram of the spin control circuitry utilized to control the spin motor.

FIG. 12 is a combined electrical block diagram and partial structural diagram illustrating, from a circuit standpoint the drive and controller electronics board 2 and in addition the read/write preamplifier circuit 49 which is included within head disk assembly 1 (FIG. 6). In FIG. 12, rigid disk 16 is illustrated in conjunction with lamination portions 17 of the spin motor. The spin-up and control of the drive of the spin motor is under the electrical control of spin control and drivers circuitry 70, an expanded block diagram of which is illustrated in FIG. 13. In the present embodiment, as illustrated in FIG. 1, spin control circuitry 70 is included on circuit board 6. Spin control circuitry 70 may be implemented using an Allegro MicroSystems, Inc., part no. ULN 8902 denominated Three Phase Brushless DC Motor Drive With Back-EMF Sensing (illustrated in FIG. 13 in block diagram form). Alternatively, the spin control and drivers circuitry described in the above identified U.S. Pat. No. 5,258,695 to Utenick et al., issued Nov. 2, 1993 could be used to control and drive the spin motor.

Figure 27:
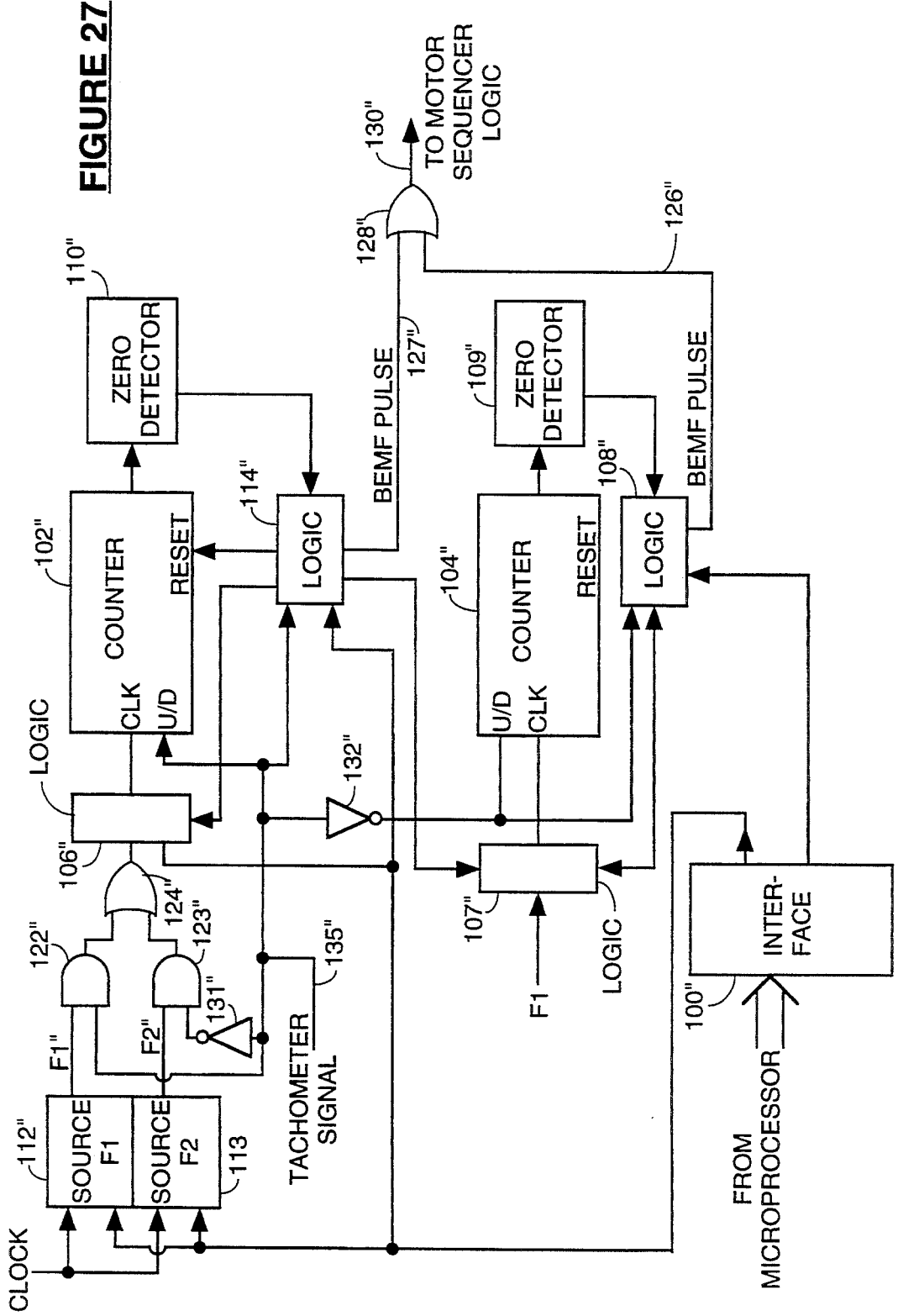
FIG. 27 is a block diagram of a BEMF commutation control circuit in accordance with the invention.

Referring next to FIG. 27, a block diagram of a BEMF commutation circuit primarily within the BEMF detector 250" is shown. The components of the BEMF commutation circuit include a microprocessor interface 100", two up/down counters 102", 104", control logic circuits 106", 107", 108", 114", and frequency sources 112" and 113" for supplying signal sources (F1 and F2). The circuit further includes zero detectors 109", 110", AND gates 122", 123", OR gates 124", 128", and inverter gates 131", 132".

During operation, comparator and decoding circuitry as described previously is used to generate the tachometer signal of FIG. 3E. The tachometer signal is provided to line 135" and is thereby received by the up/down control pin of counter 102", by logic circuit 114", and by gates 122", 131" and 132".

When the motor is running at nominal speed, counter 102" counts up when the tachometer signal is in a high state. Signal F1 from frequency source 112" is used to clock the counter 102". When the tachometer signal changes to a low state, the counter clock changes to signal F2 from frequency source 113" by way of logic circuit 106" and gates 122", 123", 124" and 131". Frequency source 113" generates a signal F2 that is twice the frequency of signal F1. In addition, the counter 102" is controlled by the tachometer signal at the U/D terminal to count down. Referring to FIGS. 28A and 28B, when counter 102" reaches a count value of zero as detected by zero detector 110", the tachometer signal is at point Y, which is the optimal time at which to commutate the motor. Logic circuit 114" holds the counter 102" in a reset state until the tachometer signal goes to a high state. Logic circuit 114" also generates a BEMF commutation pulse when counter 102" reaches a count value of zero. This commutation pulse is provided to the motor sequencer through OR gate 128".

While counter 102" is counting down, counter 104" is counting up with signal F1 as its clock source. The clock to counter 104" is disabled by logic circuit 107" when counter 102" reaches a count value of zero. When the tachometer signal changes to a high state, counter 104" is controlled at the U/D terminal to count down (with signal F1 as the source). When a count value of zero is reached, the tachometer signal is at point X which is also the optimal time at which to commutate the motor. Accordingly, logic circuit 108" issues a BEMF pulse on line 126" which is coupled to the motor sequencer through OR gate 128".

The operation of the BEMF commutation circuit also accommodates for the commutation of the motor during initial spinup. When the motor is first turning at startup, the period of the tachometer signal is much longer and the counters 102", 104" count to a larger value. Since a much larger count value is reached in each counter, it also takes the respective counters much longer to count down to zero. Thus, the circuit is self-adjusting correcting and commutates the motor at the optimal time regardless of the period of the tachometer signal.

A potential problem could exist, however, if the motor is running extremely slow. For such a case, the tachometer period is very long and the counters 102", 104" may not be sufficiently large to avoid an overflow condition. This would cause the respective counter 102", 104" to have a much lower value when the tachometer signal changed state. The wrong count value would then cause the motor to be commutated at the wrong time.

The circuit in accordance with the present invention can avoid this problem in one of several ways. The circuit can be designed by making the counters 102", 104" large enough so that overflow conditions can never occur. Alternatively, the frequency of signal F1 and of signal F2 can be programmed to a lower frequency during startup so that the counters do not count up/down so quickly and thus not overflow. This can be achieved by providing programmable frequency sources 112" and 113" that are controllable by the microprocessor.

There are several other advantages provided by the above-described commutation control circuit as shown in FIG. 27. By using frequency sources and/or counters that are programmable, motors with widely varying parameters can be used without physically changing components such as capacitors. Operating parameters of the spin motor can thus be changed at the command of the microprocessor, and therefore, if a system parameter is changed such as substituting disk drives, the microprocessor can automatically change the operating parameters of the spin motor.

In addition, the requirement for external capacitors is eliminated. Thus, the entire control circuit can be fabricated on a single integrated circuit chip to thereby minimize space requirements.

Furthermore, the control circuit is insensitive to leakage currents and critical timing is not effected by temperature, humidity, and other environmental effects.

Finally, the critical timing is essentially identical from one spindle driver chip to the next, and does not depend upon identical matching of analog current sinks and sources.

Figure 29:
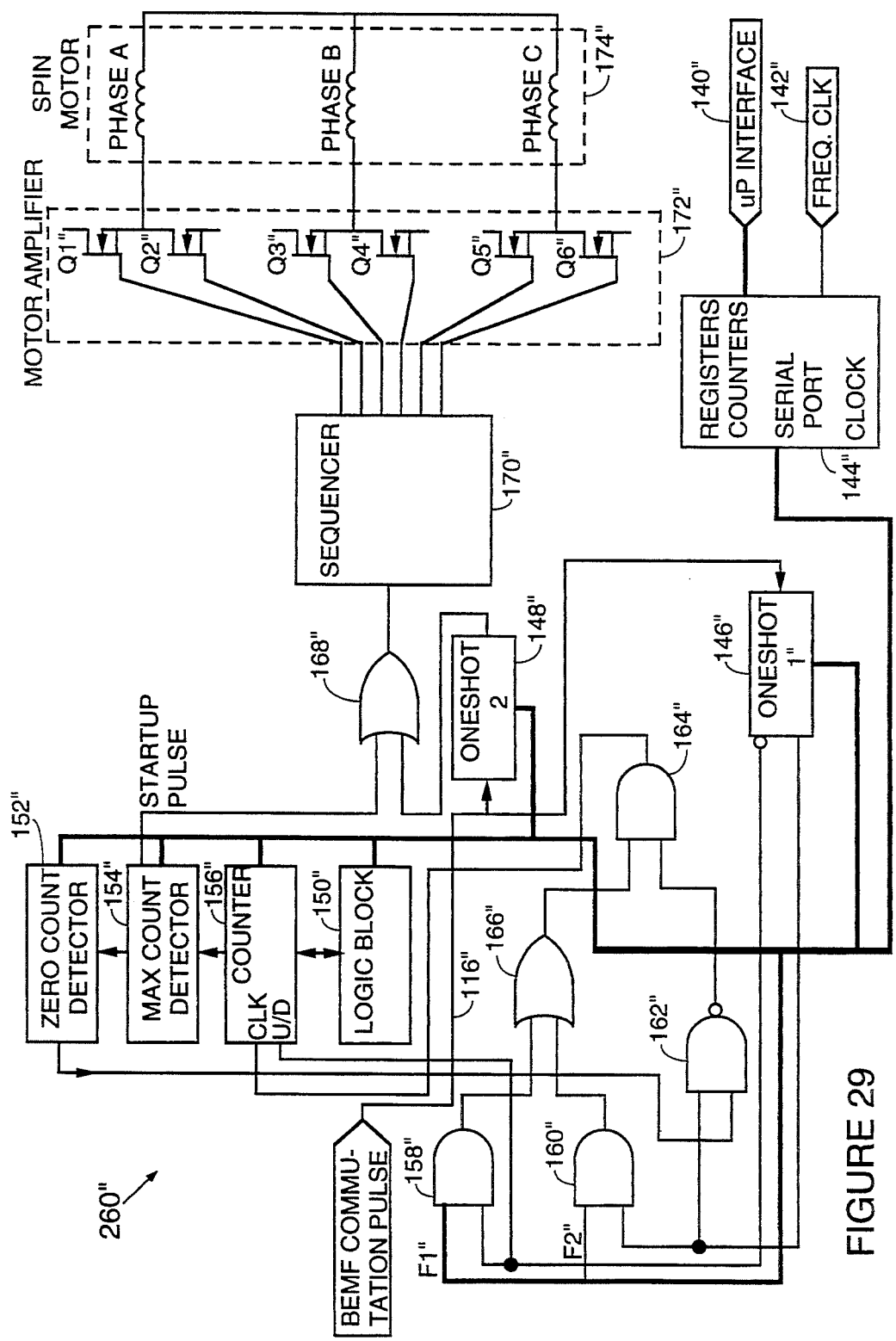
FIG. 29 is a block diagram of a startup circuit in accordance with the invention.

Referring next to FIG. 29, a block diagram is shown of a startup oscillator circuit 260" that allows the spin motor to be spunup from a stalled condition. When the BEMF signal generated by the motor is of sufficient amplitude, the startup-pulse generating circuitry is disabled. When disabled, the BEMF signal received at line 116" (from line 130" of FIG. 27) is used to commutate the motor amplifier.

The circuit includes a microprocessor interface 140", a frequency clock 142", a registers and counter block 144", oneshot circuits 146", 148", and logic block 150". The circuit further includes a zero count detector 152", a maximum count detector 154", a counter 156", AND gates 158", 160", 162", 164", and OR gates 166", 168". The circuit finally includes a sequencer 170", a motor amplifier 172", and a spin motor 174".

The sequencer 170", motor amplifier 172", and spin motor 174" operate in accordance with the above related description. Therefore, the specifics of their operation are not explained again below.

Figure 30:
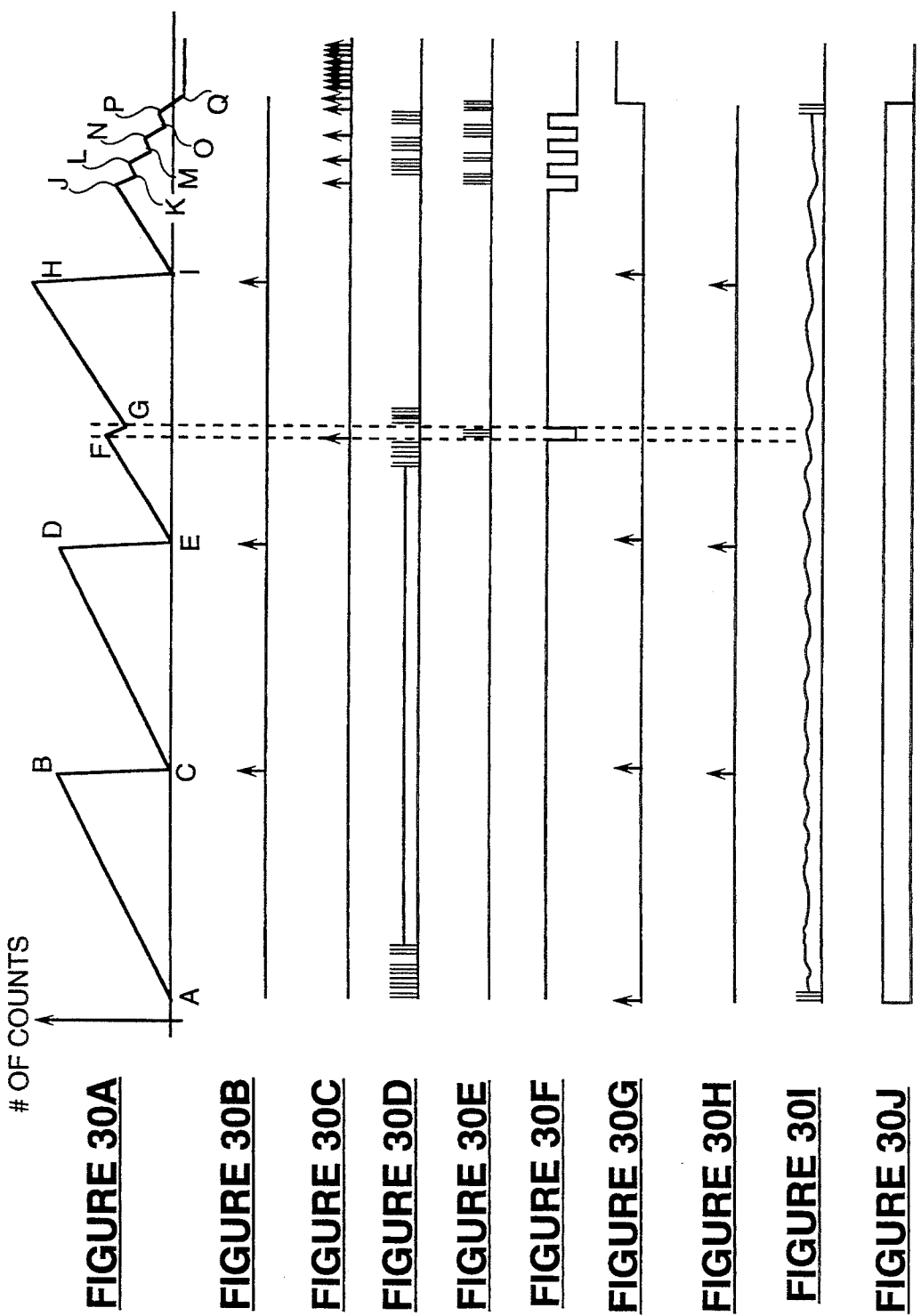
FIGS. 30A–30J are a set of waveforms illustrating operation of the start-up circuit.

FIGS. 30A–30J show waveforms and signals associated with the startup oscillator. FIG. 30A represents the count value of counter 156" with respect to motor electrical degrees. FIG. 30B shows the generated startup pulses from maximum count detector 154" and FIG. 30C shows BEMF commutation pulses received at line 116". FIGS. 30D and 30E show output signals from AND gates 158" and 160", respectively, and FIG. 30F shows the control signal applied to the U/D terminal of counter 156". FIG. 30G shows the occurrence of a zero value detected by zero count detector 152", and FIG. 30H shows the occurrence of a maximum value detected by maximum count detector 154". Finally, FIGS. 30I and 30J show output signals from gates 164" and 162", respectively.

At initial operation of the disk drive unit, the spin motor is stationary. It is assumed herein that the desired direction of rotation of the spin motor is clockwise. The microprocessor, through the interface 140", programs the frequency of signals F1 and F2 provided from block 144". In addition, the microprocessor further initializes counter 156" to zero, sets the oneshot pulse duration times, and sets the count value in the maximum count detector 154". Signal F1 is gated through gates 158", 164", 166" to the clock input of counter 156". Accordingly, counter 156" starts to count up as shown in FIG. 30A. The counter 156" increases in value until it reaches the maximum count value, which is represented as point B. At this time, the maximum count detector 154" generates a startup pulse to the sequencer 170" through OR gate 168" to commutate the amplifier 172". The resulting startup pulse is shown in FIG. 30B. The motor accordingly switches to the next phase and logic block 150" simultaneously resets counter 156" to zero. This sequence continues in the absence of any BEMF generated commutation pulses.

The time period represented from point A to point C is set in accordance with the motor parameters to cause the motor to rotate to the next commutation point with each startup oscillator pulse. It should be noted that the oscillations due to the motor movements should be allowed to settle down before the next startup pulse is delivered. In addition, the proper setting of the time period A-C is important since if the pulse arrives too soon, the motor may rotate counter-clockwise, whereas if the pulse arrives too late, the motor may not rotate fast enough to generate a BEMF signal.

When point F is reached, the motor is rotating sufficiently fast that a BEMF commutation pulse is generated as shown in FIG. 30C. This pulse is received by oneshot circuit 148" that accordingly steps the sequencer to commutate the motor and amplifier. In addition, oneshot circuit 146" is also triggered. When oneshot circuit 146" is triggered, counter 156" counts down and signal F2 becomes the counter clock. Counter 156" counts down for the duration of the time programmed in for oneshot circuit 146". This time is shown as the period from point F to point G. After oneshot circuit 146" times out, counter 156" continues to count up toward point H. Normal operation continues until point J is reached. At this time another BEMF pulse is generated and counter 156" is again controlled to count down. However, during this time, more BEMF pulses are provided from the circuit of FIG. 27, thus preventing counter 156" from reaching the maximum count value. Eventually, counter 156" is driven to a count of zero. By this time, BEMF pulses are generated fast enough such that oneshot circuit 146" is continuously triggered. Since the counter 156" value is zero, no startup pulses are generated. Thus the startup circuitry is disabled and the motor 174" and amplifier 172" are commutated entirely by the BEMF pulses.

As a result of the startup oscillation circuit described above in accordance with the invention, the frequency of the spinup pulses is programmable to accommodate motors with varying parameters and changing environmental conditions. Furthermore, the entire circuit can be fabricated on a single integrated circuit chip since no external capacitor is required. Thus, space requirements are minimized. Finally, variations in the spinup pulses due to capacitance instability and board leakage are eliminated.

A monitor circuit for blanking out the BEMF commutation circuitry and for detecting proper spin direction is finally considered. Referring to the schematic diagram of FIG. 31, a monitor circuit is shown in accordance with a further aspect of the invention. The monitor circuit includes counters 180", 182", decode logic circuits 184", 186", and a microprocessor interface 120" that allows the counters 180", 182" and decode logic circuits 184", 186" to be programmed differently as conditions or parameters are changed. The monitor circuit further includes a comparator 190" for testing the polarity of the BEMF signal, a flip-flop 192", AND gates 194", 196", 198", OR gates 200", 202", and inverter gates 204", 206".

Figure 32:
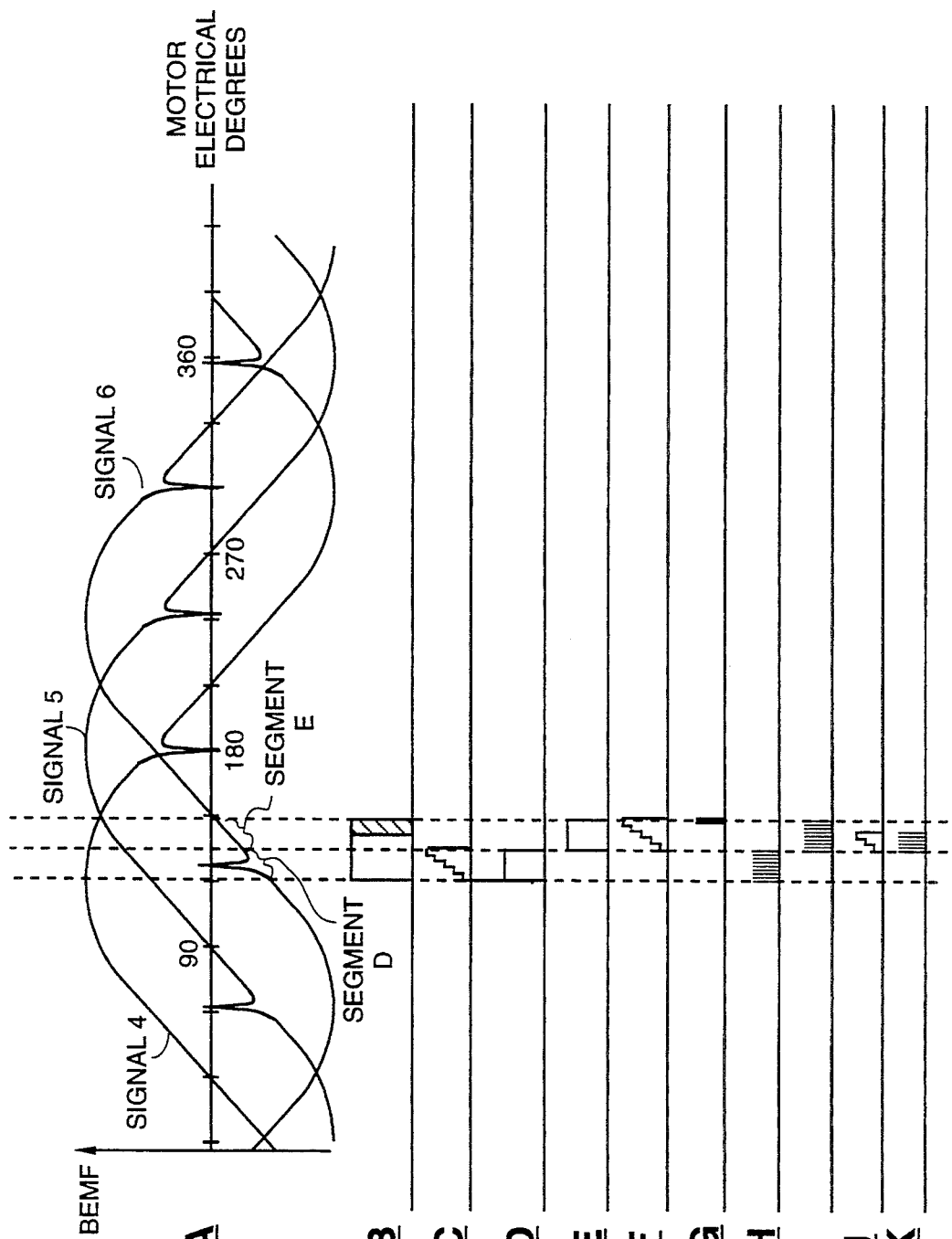
FIGS. 32A–32K are a set of waveforms illustrating operation of the monitor circuit.

Referring to FIGS. 32A-32K in conjunction with the circuit schematic, initially the microprocessor programs the count length of counter 180" and the decode value of decode logic 184" for providing an output signal at the terminal count 1 (TC1) line. This sets the delay period time during which the pulse shown in FIG. 32D is asserted. During this time period, the BEMF comparators are degated so that the noise glitches will not affect their output signals. Counter 182" and the decode value for decode logic 186" for providing an output signal at the terminal count 2 (TC2) line are programmed to set the duration of time as shown in FIG. 32E during which the polarity of the BEMF signal is checked after the delay period.

The circuit is activated through OR gate 200" when either a BEMF commutation pulse, a startup oscillator pulse, or a TC2 pulse toggles flip-flop 192" to a high state. The output signal from flip-flop 192" is shown in FIG. 32B. When the output signal of flip-flop 192" goes high, AND gate 194" then generates a clock signal as shown in FIG. 32H to counter 180" and the counter 180" begins counting up as shown in FIG. 32C. When the terminal count 1 (TC1) value is reached AND gate 194" is disabled and AND gates 196" and 198" are enabled. Thus, counter 182" starts to count up as shown in FIG. 32F in accordance with the clock signal from the output line of AND gate 196".

If the motor is not spinning in the correct direction, the BEMF signal from Phase C will be positive and thus the output signal of comparator 190" will be low, thus allowing counter 182" to reach the terminal count 2 (TC2) value in accordance with the clock signal (AND gate 196" output signal) of FIG. 32I. When TC2 is reached, flip-flop 192" and counter 182" are reset and a pulse as shown in FIG. 32G is issued to the sequencer to advance the motor amplifier to the next phase. Since the terminal circuit 2 (TC2) signal is input to OR gate 200", the cycle is repeated.

If the BEMF signal is negative, the output signal of comparator 190" and AND gate 198" is high and thus counter 182" is reset by the output signal of OR gate 202". An example of the counter 182" value during this reset operation is illustrated in the waveform of FIG. 32J. Note that the clock signal from AND gate 196" as shown in FIG. 32K for this case has fewer repetitions. Since the motor is spinning in the correct direction, no pulse is issued to the sequencer by means of a TC2 pulse since the terminal count 2 value is not reached. The output signal from OR gate 202″ causes flip-flop 192″ to be reset and the circuit waits for the next pulse input to OR gate 200″.

Figure 31:
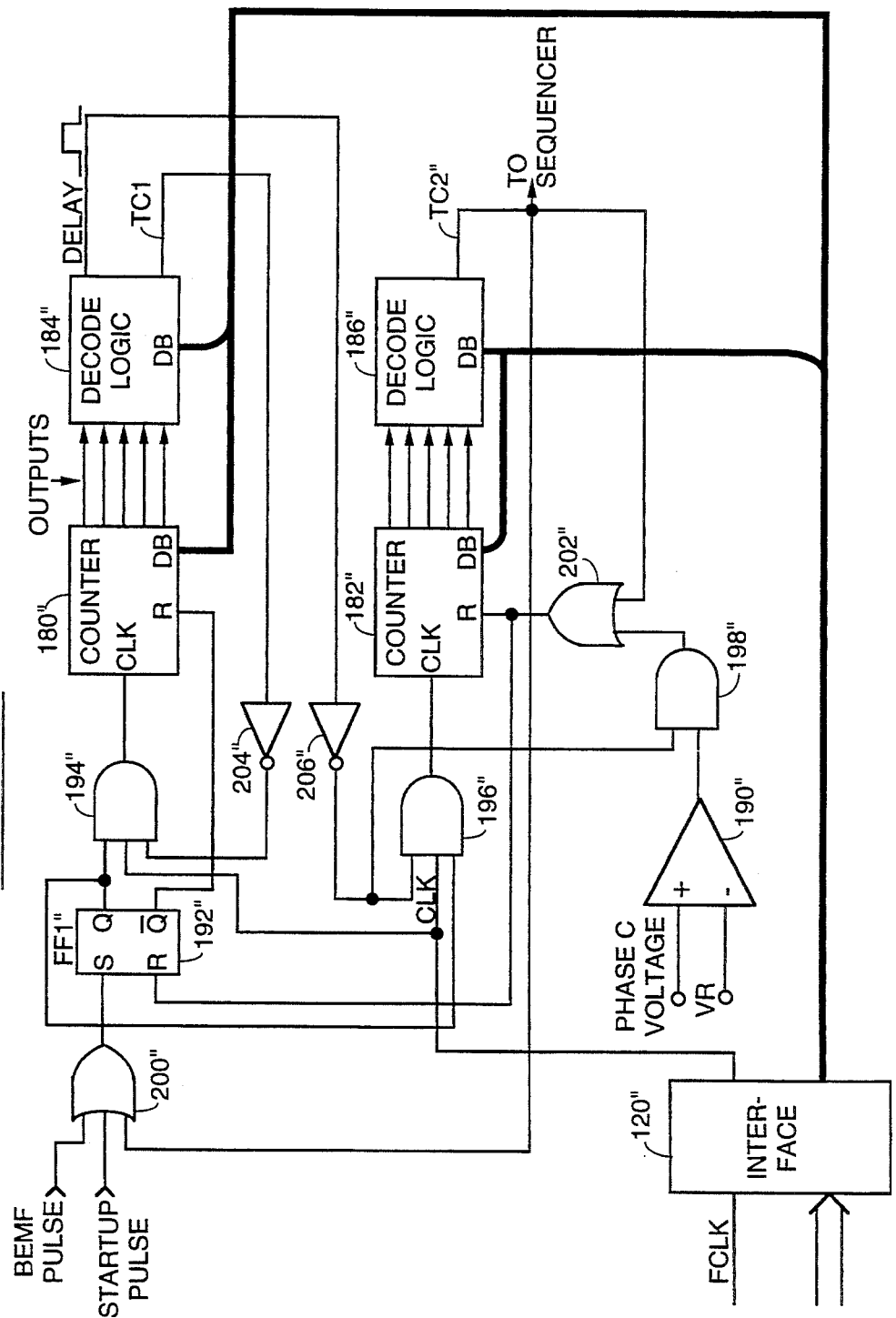
FIG. 31 is a block diagram of a monitor circuit in accordance with the invention.

It is noted that only one comparator 190″ is shown in the circuit of FIG. 31. Comparator 190″ monitors the phase C voltage. Two other comparators are similarly connected in the circuit to monitor the voltage signals of phase A and B.

The monitor circuit described in accordance with the invention provides several advantages. Since a microprocessor interface and a serial port are provided, the operating parameters of the circuit can be programmably modified to accommodate changing motor parameters and environmental conditions. In addition, no external capacitor is required, thus minimizing space requirements. Finally, timing variations due to variances in capacitance values and due to board leakage currents are eliminated.

In FIG. 12, upper load beam 28 is illustrated as positioned over a read/write area of disk 16, positioning slider 31 to a desired, addressed track location. Electrical conductors in cable 56 (FIGS. 10 and 11) provide analog information from the read/write recording element to read/write preamp 49, which in the present embodiment is located in baseplate 8 (as illustrated in FIGS. 6 and 7). Read/write preamp 49 may be implemented, for example, by a Silicon Systems Incorporated, of Tustin, Calif., part no. 32R2030, or equivalent amplifier. Read/write preamp 49 provides the functions well known to those skilled in the art to facilitate the recording and playback of digital information from the surface of rigid disk 16. Signals from read/write preamp 49 are provided to and received from read/write combo circuit 71, which in the present embodiment is included on circuit board 6 of the driving controller electronics board 2.

Figure 14:
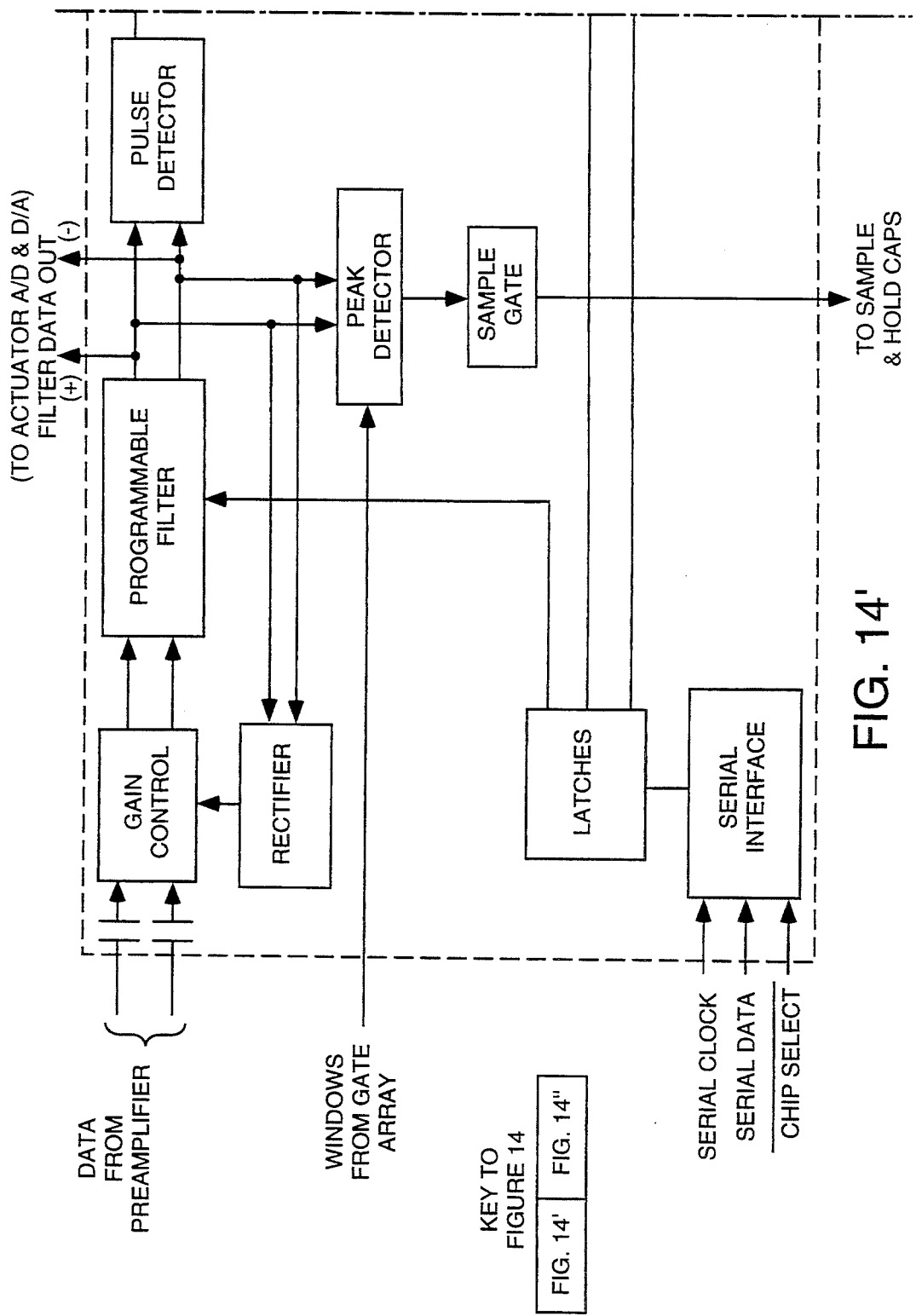
FIG. 14, which is made up of FIG. 14' and FIG. 14" arranged as illustrated in FIG. 14', is a block diagram of the read/write combo circuitry.

FIG. 14 illustrates in functional block form the circuits included in read/write combo circuit 71. Read/write combo circuit 71 may be implemented by, for example, a National Semiconductor part no. DP8491 denominated Hard Disk Data Path Electronics Circuit.

Figure 15:
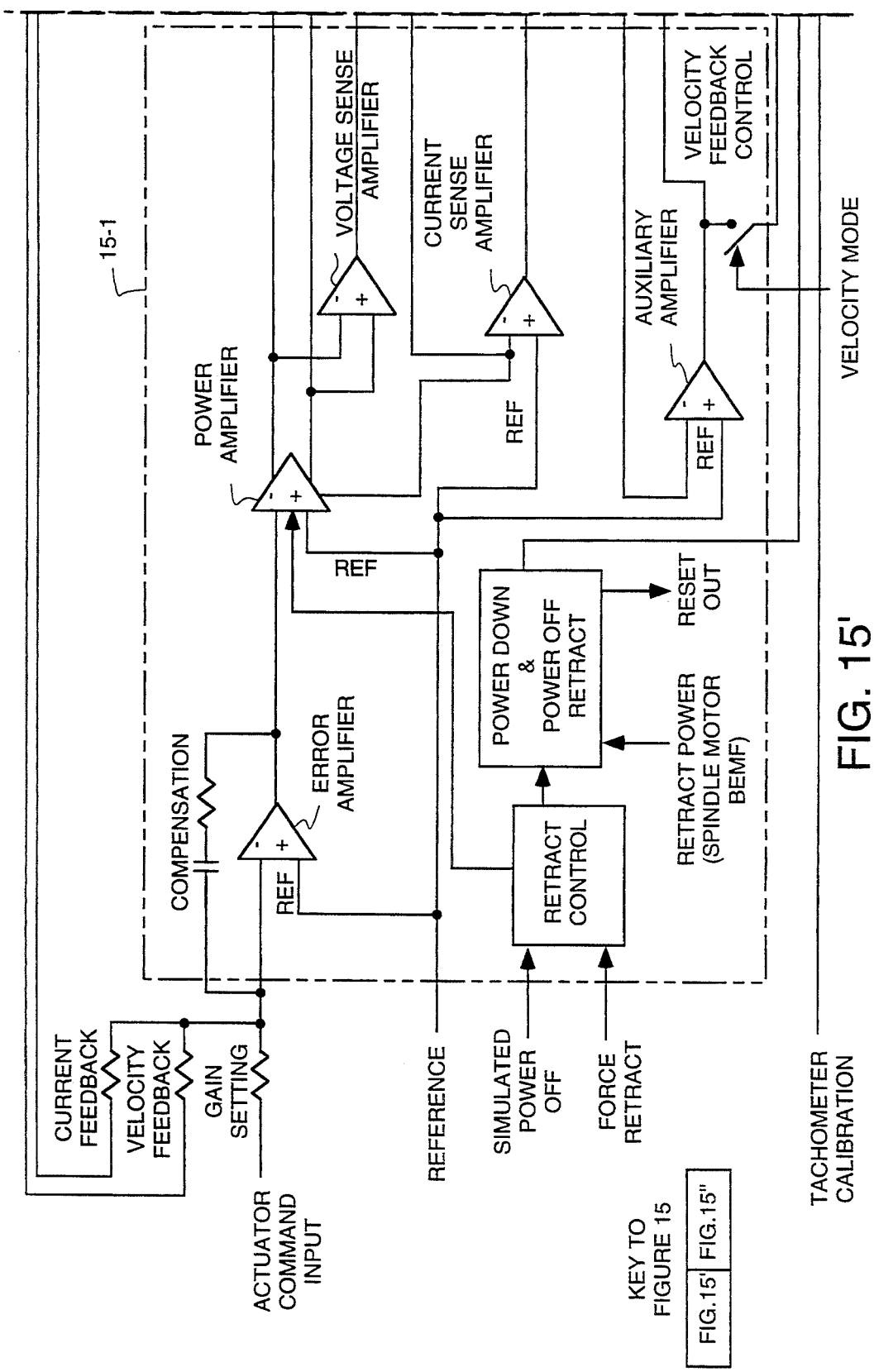
FIG. 15, which is comprised of FIG. 15' and FIG. 15" arranged as illustrated in FIG. 15', is a block diagram of the actuator driver and power off unload circuitry.
Figure 16:
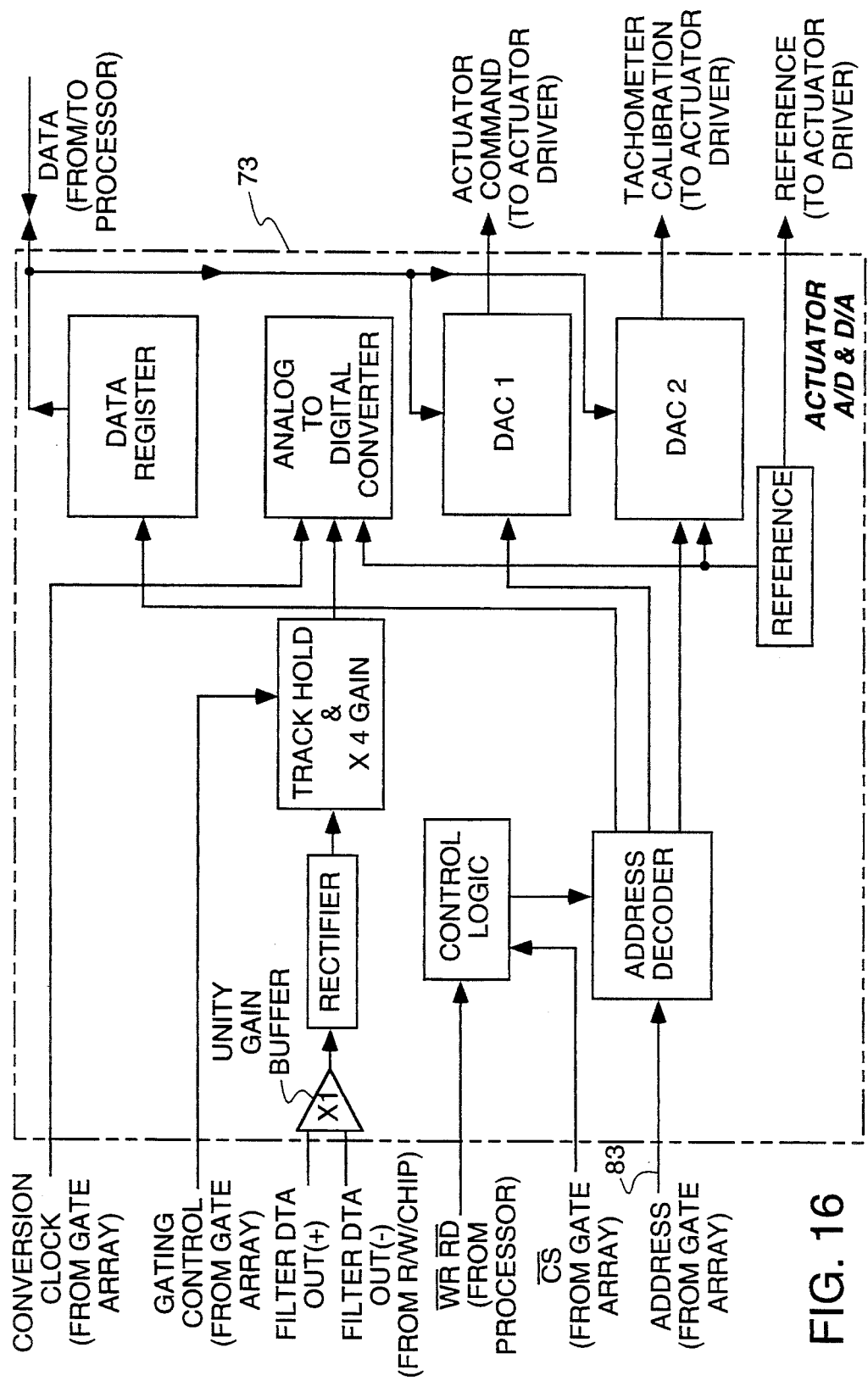
FIG. 16 is a block diagram of the actuator A/D & D/A circuitry.

Control signals to actuator coil 40 of the rotary actuator control the position of the read/write recording elements supported on their respective load beams. In the present embodiment, actuator driver and power off unload circuit 72 (FIG. 12) provides control signals to position the read/write recording elements to the desired location. A detailed block diagram of actuator driver and power off unload circuit 72 is illustrated in FIG. 15. The portion of actuator driver and power off unload circuit 72 of FIG. 15 illustrated within dashed line denoted by reference character 15-1 may be implemented by, for example, Allegro MicroSystems, Inc., Worchester, Mass., part no. 8932, denominated as a voice coil motor driver. The control signal to actuator coil 40 is analog and is provided via actuator driver and power off unload circuit 72. Also, as is well known to those skilled in the art, the feedback signals from the embedded servo (which will be described hereinafter) are provided in analog form. The seek control signals when the host desires that the read/write recording element be positioned over a designated track, are provided in digital form. To convert the analog signals returned from the embedded servo loop to digital and to convert the digital signals required for addressing a particular track to analog signals, actuator A/D & D/A circuit 73 is utilized. A detailed block diagram of the circuitry utilized in actuator A/D & D/A circuit 73 is illustrated in FIG. 16. This circuit may be conveniently implemented utilizing a generally available part from Analog Devices, Norwood, Mass., their part no. ADC 7773, denominated as a complete embedded servo front end for hard disk drive.

Returning to FIG. 12, disk controller 74 is coupled between read/write combo circuit 71, data bus 75, RAM buffer 76, and also provides signals to and receives signals from interface connector 4 for communication outside of the drive and controller electronics board 2. Disk controller 74 may be conveniently implemented using Cirrus Logic, Inc. of Milpitas, Calif., Integrated PC Disk and Controller part no. CL-SH 265. RAM buffer 76 may be any digital storage device having a capacity of 32K addressable storage locations, each of 8 bits in width, and is preferably for convenience a semiconductor type random access memory device.

Figure 17:
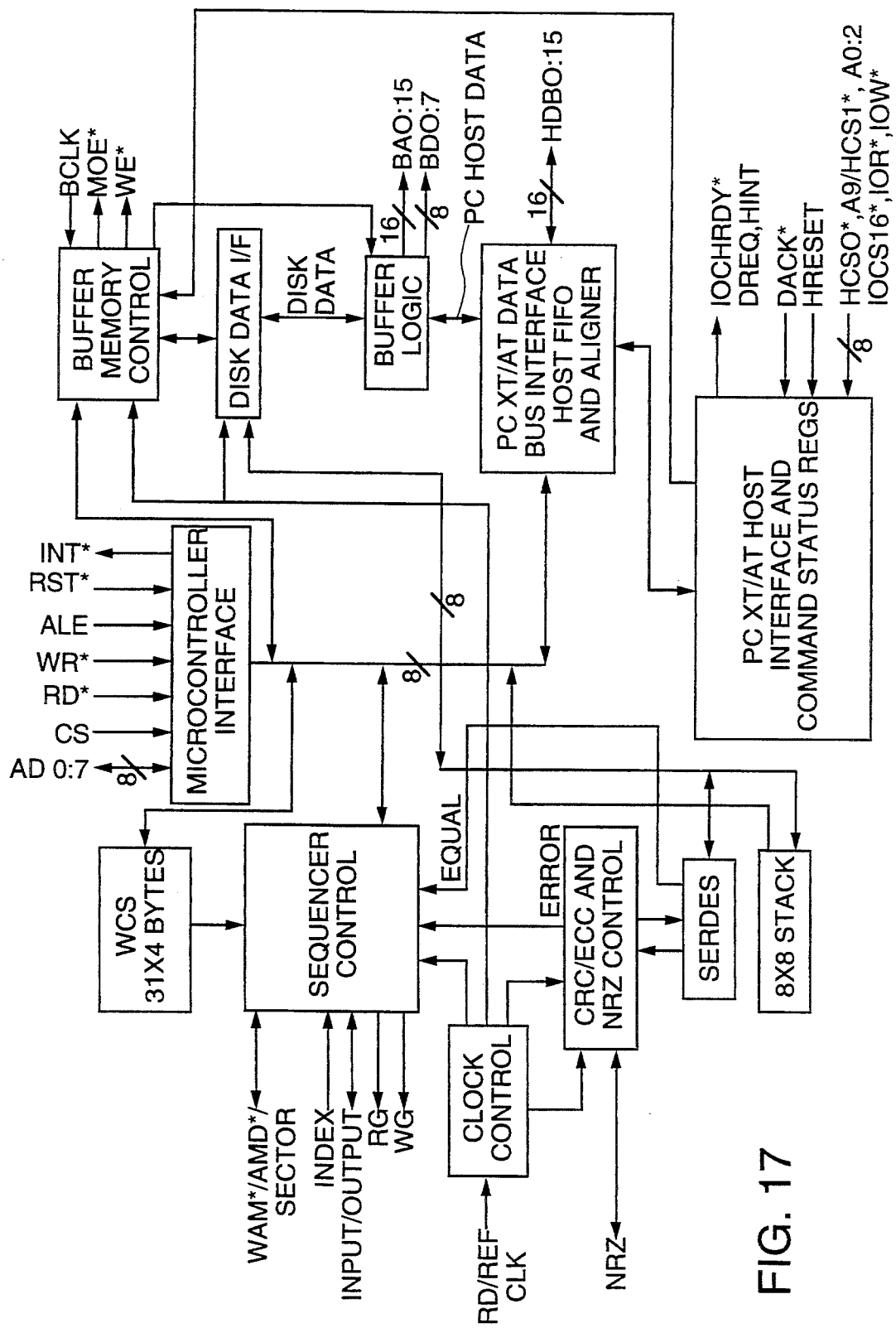
FIG. 17 is a block diagram of the disk controller circuitry.

A high level block diagram of disk controller 74 is illustrated in FIG. 17.

Drive and controller electronics board 2 further includes microprocessor 77 which is coupled to data bus 75, read only memory 78 and gate array 79. Microprocessor 77 may be implemented by, for example, a Motorola microprocessor model no. 68HC11 or an Intel Corporation microprocessor part no. 80C196, or similarly functional microprocessors from other sources. Read only memory 78 may be any suitable memory device having 32,000 storage locations, each 8 bits wide, and in the present implementation, for reduction of size, is preferably a semiconductor memory device.

Figure 18:
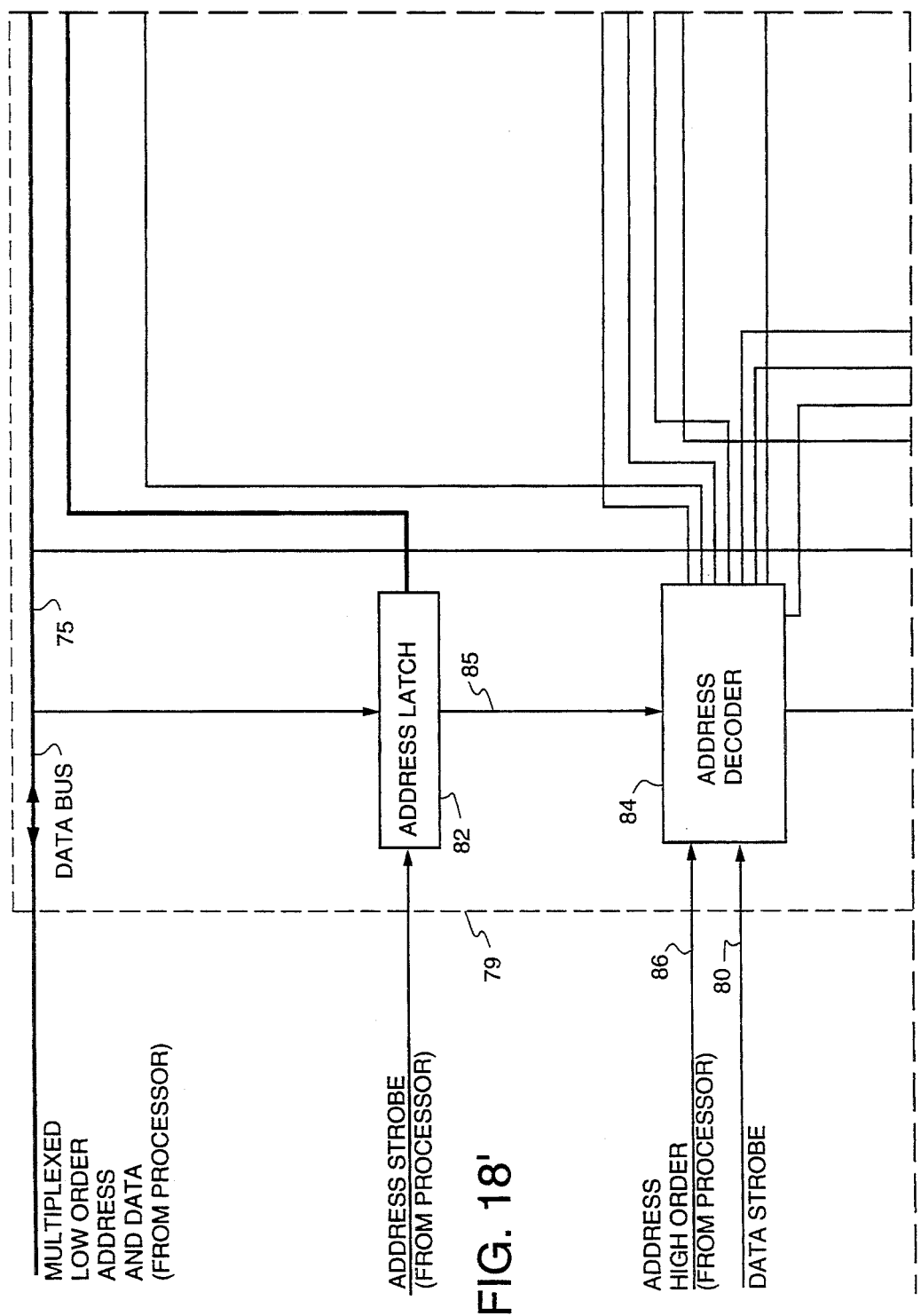
FIG. 18, which is comprised of FIG. 18', FIG. 18''', FIG. 18'''' and FIG. 18'''' arranged as illustrated in FIG. 18', is a block diagram of the gate array circuitry.

FIG. 18 is a block diagram of gate array 79, illustrating the blocks utilized therein, and a description of the operation of gate array 79 will follow hereinafter.

An embedded servo system is utilized in head disk assembly 1 of the present invention, the embedded servo system being implemented with the use of electronics which is illustrated in FIG. 12 (which includes other circuitry). As illustrated in FIG. 12, rigid disk 16 includes a plurality of circular tracks, for example tracks 121-i and 121-(i+1). If both sides of rigid disk 16 are used for data, corresponding tracks on the disk surfaces are approximately cylindrically aligned. Each track is segmented into one or more sectors SCT-01, SCT-02, . . . , SCT-2n by prerecorded information in embedded servo field regions 120-1 through 120-2n. Each servo field region 120-j, where j=1, 2, . . . , 2n, includes m concentric servo fields, where m is the number of concentric circular tracks on the disk, that is, one servo field in each data track at position j (a total of 2 nm servo fields per surface). The particular embedded servo system utilized with disk assembly 1 and its associated drive and controller electronics is more completely described in copending and commonly assigned U.S. patent application Ser. No. 07/630,475 described above.

Attention is directed to FIG. 18 which is a block diagram of gate array 79 of FIG. 12. As will be appreciated by reference to FIGS. 12 and FIG. 18, multiplexed low address and data bus 75 is coupled to gate array 79 for the bidirectional flow of information between microprocessor 77 and gate array 79. Throughout the drawing figures, lines with arrows on both ends indicate that there is a bidirectional flow of information over the lines in contrast to lines with an arrow on a single end which indicates that information passes in the direction of the arrow only. As will also be appreciated by reference to FIGS. 12 and 18, address information is provided from microprocessor 77 to gate array 79 as inputs to gate array 79. In addition, gate array 79 provides information to and receives information from other circuitry in FIG. 12 and for convenience for understanding lines entering and leaving gate array 79 in FIG. 18 have labels adjacent thereto to indicate the circuitry from which or to which the line is coupled. Referring to FIG. 18, address latch 82 is coupled to multiplexed low address and data bus 75 from which it receives and holds the lower order address information received from multiplexed low address and data bus 75. Address latch 82 receives an address strobe from microprocessor 77 which establishes the timing when the address is valid. All outputs from address latch 82 are provided over bus 83 to read only memory 78 and additionally low order address information is also provided from address latch 82 to actuator A/D & D/A circuit 73. The low order address from address latch 82 is also provided to address decoder 84 over bus 85. Address latch 82 is equivalent to any available 8 bit latch, such as a TTL74LS373 latch. Address decoder 84 receives the high order address information from microprocessor 77 via bus 86. Address decoder 84 uses the external high order address bits, the latched low order address bits from address latch 82 and the timing signal, denominated DATASTROBE, received over line 80 from microprocessor 77 to decode the address for the gate array registers as well and for external chip select lines. More particularly, EXTERNAL CHIP SELECTS signals are provided over line 87 to the serial port select of read/write combo circuit 71, the select port for spin control circuit 70, as well as for the chip select inputs to actuator A/D & D/A circuit 73. Internally within gate array 79 the decoded address information is used to select memory mapped control/status registers for all of the blocks in gate array 79. Address decoder 84 may take the form of a well known circuit such as a group 74LS138 decoders.

Figure 19:
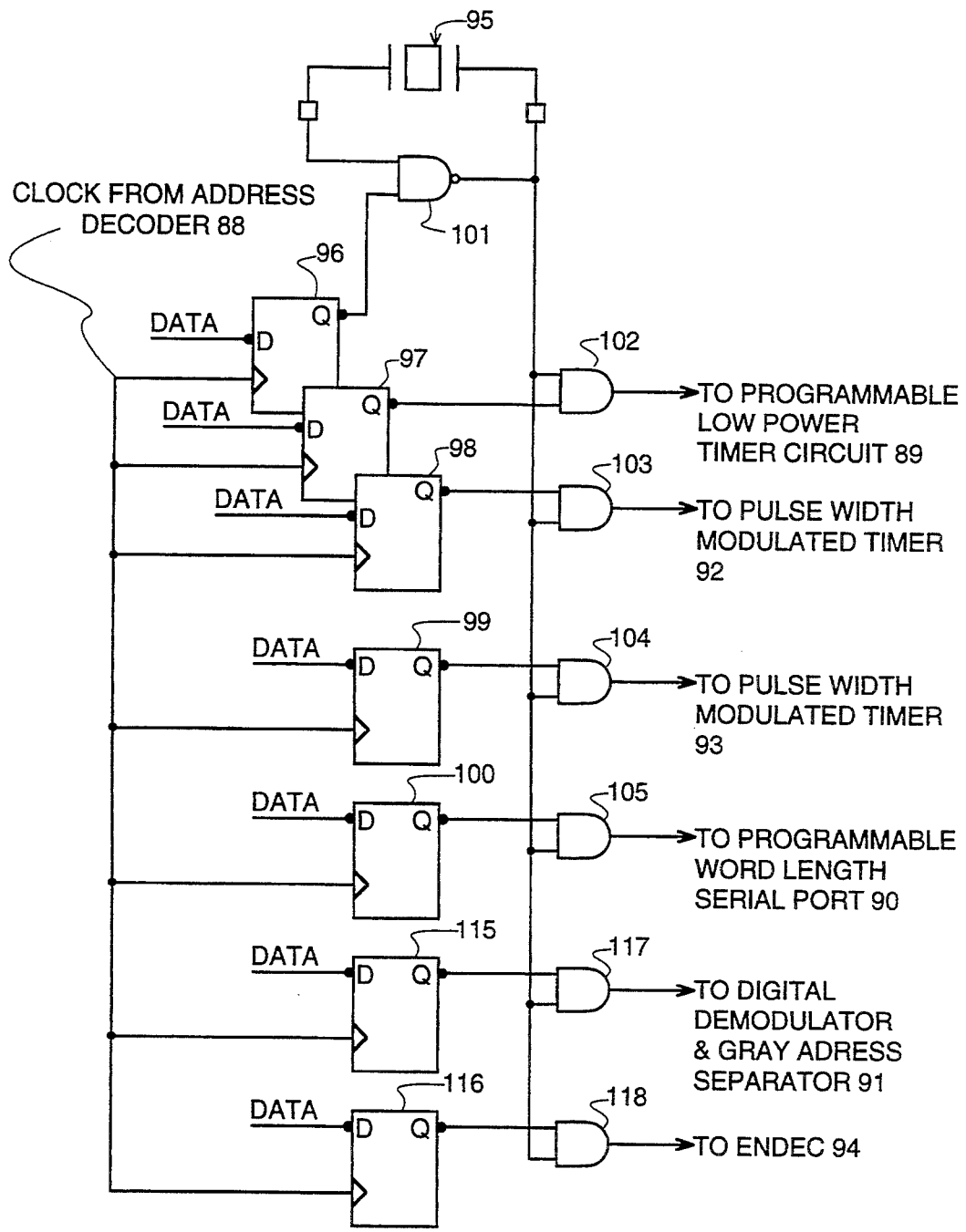
FIG. 19 is a schematic circuit of the memory mapped register portion of the clock logic circuit utilized in the gate array.

Clock logic memory mapped register 88 generates all of the required clock signals for programmable low power timer circuit 89, programmable word length serial port 90, digital demodulator & Gray address separator 91, pulse width modulated timer 92, pulse width modulated timer 93 and encoder/decoder 94. Crystal 95, which is provided externally of gate array 79, is used to provide a stable frequency of oscillation for clock logic memory mapped register 88. The memory mapped register portion of clock logic memory mapped register 88 functions to insure that minimum power is used or dissipated by enabling only the required clocks for the operation in progress at the time the clock signal is required. The memory mapped register circuitry utilized in clock logic memory mapped register 88 is illustrated in FIG. 19. Referring to FIG. 19, the portion of memory mapped register utilized to provide clock signals to programmable low power timers 89, pulse width modulated timer 92, pulse width modulated timer 93 ENDEC 94, digital demodulator & Gray address separator 91, and programmable word length serial port 90 is illustrated. A two input AND gate is provided for each of these functions. In implementing the memory mapped register, D flip-flops 96 through 100 and 115–116 are utilized. Each of these flip-flops receives a clock signal from address decoder 88. The Q output of D flip-flop 96 is provided to one of the inputs of NAND implemented oscillator 101. The other input to NAND oscillator 101 is coupled to one of the terminals of crystal 95 and the output of NAND implemented oscillator 101 is coupled to the other terminal of crystal 95. The output of NAND implemented oscillator 101 is coupled to one of the inputs of AND gates 102–105 and 117–118. The D inputs of D flip-flops 96–100 and 115–116 are connected to unique lines of multiplexed low address and data bus 75. D flip-flop 96 drives through its Q output NAND implemented oscillator 101, while the Q output of D flip-flops 97–100 drive the associated second inputs to AND gates 102–105 respectively; and the Q output of D flip-flops 115 and 116 drive the second input of AND gates 117 and 118 respectively. From the circuit, it will of course be appreciated that clock signals to the circuits which are coupled to AND gates 102–105 and 117–118 are provided only at the time during which a clock signal is required.

Figure 20:
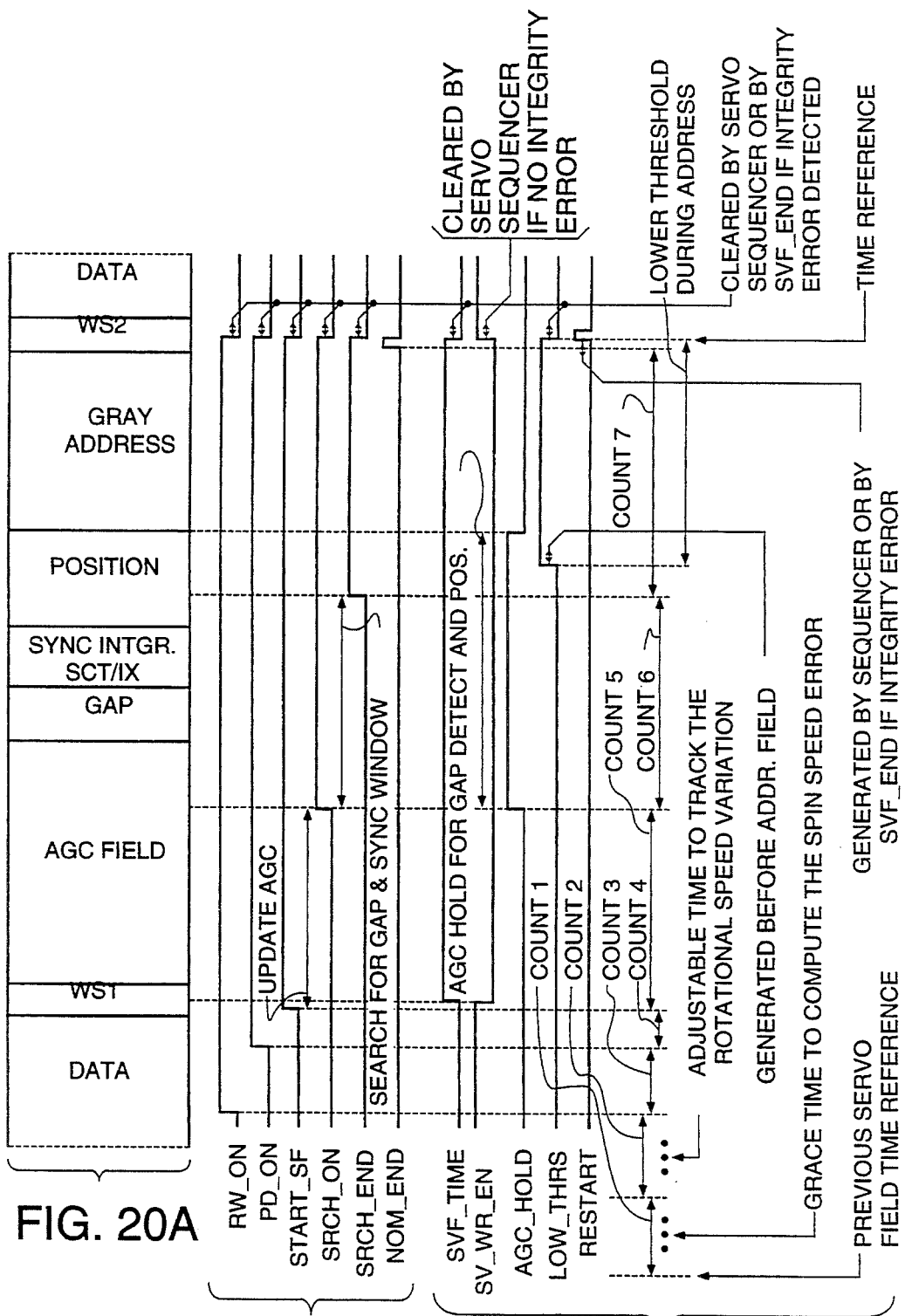
FIG. 20a is an illustration of a typical sector utilized on the magnetic recording disk of the head disk assembly.
FIG. 20b is a timing diagram of the window signals produced by the programmable low power timer circuit of the gate array.
FIG. 20c is a timing diagram of the window signals produced by the digital demodulator & Gray address separator of the and gate array.

Programmable low power timer circuit 89 generates timing signals which are provided to read/write preamp 49, over line 106, a timing signal on line 107 to read/write combo circuit 71, a plurality of timing signals (which will be fully described hereinafter) over bus 108 to digital demodulator & Gray address separator 91 and, a timing signal over line 109 to integrity checks & address comparator 110. Digital demodulator & Gray address separator 91 generates windows for the pulse detector included in read/write combo circuit 71, over bus 111. To aid in understanding the operation of the various circuits and timing windows, attention is directed to FIG. 20a which illustrates the servo field utilized on the disk of the present invention, along with FIG. 20b which illustrates the windows produced by programmable low power timer circuit 89 and FIG. 20c which illustrates the windows produced by digital demodulator & Gray address separator 91. As will be appreciated by reference to FIGS. 20b and 20c, the timing of the respective windows have been illustrated in timed relationship to the servo field of FIG. 20a. A detailed description of the servo field in FIG. 20a along with the circuitry involved is found in U.S. patent application Ser. No. 07/630,475 referred to above and the explanation therefore will not be repeated. As an aid to understanding the windows generated by programmable low timers circuit 89 and digital demodulator & Gray address separator 91, the following table is provided which in the left hand column lists the window acronym designation illustrated in FIGS. 20b and 20c, in the center column provides a descriptive title for the windows function and in the far right column indicates the circuit to which the window signal is provided.

TABLE

| Window Acronym | Descriptive Function Of Window | Window Signal Provided to |
|---|---|---|
| RW_ON | Read/write preamp turned on | R/W Preamp 49 R/W combo 71 |
| PD_ON | Pulse detector turned on | R/W combo 71 |
| START_SF | Start servo field | Digital Demodulator 91 & Gray Addressing Separator |
| SRCH_ON | Search for Gap and Sync | Digital Demodulator 91 & Gray Addressing Separator |
| SRCH_END | End search for Gap and Sync | Digital Demodulator 91 & Gray Addressing Separator |
| NOM_END | Nominal end of servo field | Digital Demodulator 91 & Gray Addressing |

TABLE-continued

| Window Acronym | Descriptive Function Of Window | Window Signal Provided to |
|---|---|---|
| SVF_Time | Servo field time | Separator Read/Write Combo 71 |
| SV_WR_EN | Servo write enable | Read/Write Combo 71 |
| AGC_HOLD | Hold gain of AGC during gap and position | Read/Write Combo 71 |
| LOW_THRS | Lower detection threshold during Gray address field | Read/Write Combo 71 |
| RESTART | Restart low power timers | To low power timers |

Integrity checks & address comparator 110 compares the integrity check pattern which is created from reading the servo field information (which is described in detail from the above-referenced Nov. 7, 1994 U.S. patent application Ser. No. 07/630,475) with the expected pattern stored in a memory mapped register in integrity check & address comparator 110. In addition, the track address is selectively compared with the expected track address during track following (ON track MODE). If either of these comparisons do not match, an error condition stored in a status register is assumed and is sent to microprocessor 77 over data line 112 as status information.

Returning to digital demodulator & Gray address separator 91 which was briefly referred to above, the output of this circuit is provided over bus 111 as windows for the pulse detector in read/write combo chip 71. Digital demodulator & Gray address separator 91 receives, over line 113, the transition pulse and polarity signals from read/write combo chip 71. Using this information, digital demodulator & Gray address separator 91 determines the track address and provides this track address information to microprocessor 77, as well as to integrity checks & address comparator 110.

Pulse width modulated timer 92 has an input coupled to multiplexed low address and data bus 75 through which the microprocessor programs the frequency and the duty cycle of the output. This data is stored in two memory registers which are included in pulse width modulated timer 92 which generates at its output a control signal to set the level of the read threshold, this control signal being provided to read/write combo circuit 71 over line 123. Pulse width modulated timer 93 also receives an input from multiplexed low address and data bus 75 and provides at its output a write current control signal which is provided to read/write preamp circuit 49 over line 114. The outputs of timers 92 and 93 are filtered by suitable RC networks (not shown) to provide an appropriate voltage for the above two functions. The time constant of the RC network for the output of these two timers is a function of the device being driven and is determined by well known techniques.

Programmable word length serial port 90 is utilized to program read/write combo circuit 71, actuator driver 72 and spin control circuit 70. Serial clock output from programmable word length serial port 90 is also provided to each of the foregoing chips. The programming information to be provided to read/write combo circuit 71, actuator driver 72 and spin control and driver circuit 70 is loaded into programmable word length serial port 90 from microprocessor 77 over multiplexed low address and data bus 75. The designated address for this programming is set by the microprocessor through address decoder 84, and the data contents and length is set by a microprocessor through the memory map register included in programmable word length serial port 90.

Power management circuit 119 is a memory mapped set of registers which controls the activation of each functional block of the drive. Only the blocks requiring to be active at a given time are activated and therefore the minimum overall power required by the drive is utilized.

Encoder/decoder 94 receives NRZ write data and clock signals from disk controller 74 and generates from these signals write code data which is provided over line 120 to read/write combo circuit 71. Encoder/decoder 94 receives RDGATE and WRGATE signals as enable signals from disk controller 74. Encoder/decoder 94 receives read code data and clock signals from read/write combo circuit 71 and generates NRZ read data and NRZ read clock signals which are provided to disk controller 74 over lines 121 and 122 respectively. Encoder decoder circuit 94 may be implemented by using standard 1,7 encoding circuitry well known to those skilled in the art.

We claim:

1. A disk drive information storage device comprising:
   disk means for recording and reproducing information;
   a housing having a first external dimension of about 51 mm;
   a spin motor supported by said housing for rotating said disk means, said spin motor including a rotor for receiving said disk means and rotating said disk means about an axis;
   a start-up control circuit coupled to said spin motor, said start-up control circuit comprising:
   a BEMF commutation pulse input line for receiving a BEMF commutation pulse from a BEMF commutation circuit;
   counter circuit means having an input line, a count direction control terminal, and an output line;
      wherein said counter circuit means changes a count value in response to a signal on said input line;
      a start-up pulse is generated on said output line upon said count value equaling a predetermined value; and
      a signal on said direction control terminal determines the direction of change of said count value; and
   logic circuit means having (i) an input line coupled to said BEMF commutation pulse input line, (ii) an output line connected to said input line of said counter circuit means;
   counter direction control circuit having an input line connected to said BEMF commutation pulse input line and an output line connected to said count direction control terminal of said counter circuit means wherein upon start-up of said spin motor, said counter direction control circuit generates a signal having a first level on said output line;
      wherein upon start-up of said spin motor, said count value of said counter circuit means changes value in a first direction in response to each clock pulse generated on said output line by said logic circuit; and
      in response to said BEMF commutation pulse, said counter direction control circuit generates a signal providing a second level to said count direction control terminal of said counter circuit means so that said count value changes in a second direction different from said first direction thereby providing a smooth transition from a start-up mode to a BEMF commutation mode of said spin motor.

2. The disk drive according the claim 1, wherein said counter circuit means further comprises:
a count value bus wherein said count value bus carries a signal representing said count value; and
a count detector connected to said count value bus and to said counter circuit output line wherein said count detector generates said startup pulse upon detection of a selected count value.

3. The disk drive according to claim 1, wherein said counter circuit means further comprises:
a count value bus wherein said count value bus carries a signal representing said count value; and
a count detector having an input line connected to said count value bus and an output line connected to said logic circuit;
wherein said count detector generates a signal on said output line upon detection of a selected count value; and
said logic circuit, in response to said count detector output signal, inhibits generation of signals on said output line of said logic circuit.

4. The disk drive according to claim 3, wherein said startup control circuit further comprises sequencer circuit means having an input line coupled to said counter circuit output line wherein said sequencer circuit commutates a phase of said spin motor in response to said start-up pulse from said counter circuit means.

5. The disk drive according to claim 4 wherein said start-up control circuit further comprises a first pulse generator circuit having (i) an input line connected to said BEMF commutation pulse input line and (ii) an output line coupled to said sequencer circuit means wherein in response to said BEMF commutation pulse, said first pulse generator circuit generates a pulse on said output line.

6. The disk drive according to claim 5, wherein said counter direction control circuit comprises a second pulse generator circuit having (i) an input line connected to said BEMF commutation pulse input line and (ii) an output line connected to said count direction control terminal of said counter circuit means wherein said input line and output line of said second pulse generator are said input line and output line, respectively, of said counter direction control circuit.

7. The disk drive according to claim 1, wherein a count modulo of said counter circuit means is programmable.

8. The disk drive according to claim 7, further comprising a microprocessor interface coupled to said counter circuit means.

9. The disk drive according to claim 1, wherein said signal on said input line of said counter circuit means is programmable in frequency.

10. The disk drive according to claim 2, wherein said selected count value of said count detector is programmable.

11. The disk drive according to claim 9 further comprising a microprocessor interface coupled to said counter circuit means.

12. The disk drive according to claim 10, further comprising a microprocessor interface coupled to said counter circuit means.

13. The disk drive according to claim 1, wherein said disk drive comprises a contact start/stop disk drive.

14. The disk drive according to claim 1, wherein said disk drive comprises a dynamic head loading disk drive.

15. A disk drive information storage device comprising:
disk means for recording and reproducing information;
a housing having a first external dimension of about 51 mm;
a permanent magnet direct current spin motor supported by said housing for rotating said disk means, said spin motor including a rotor for receiving said disk means and rotating said disk means about an axis; and
a circuit for blanking a BEMF commutation pulse for said spin motor, said circuit comprising:
a sequencer circuit that commutates a phase of said spin motor;
first circuit means having:
a BEMF commutation pulse input line;
a clock input line;
first counter circuit means having (i) an input line operatively coupled to said BEMF commutation pulse input line and to said clock input line, (ii) a first output line having a first signal level when said counter circuit means has a selected count value and a second signal level otherwise, (iii) a second output line having said second signal level when said counter circuit has said selected count value and a first signal level otherwise;
wherein said first counter circuit means counts clock pulses on said clock input line upon said second output line having said first signal level and a BEMF commutation pulse is received on said BEMF commutation pulse input line; and
second circuit means having:
an input line coupled to said first output line of said first circuit means;
a clock input line;
second counter circuit means having (i) an input line operatively coupled to said second circuit means input line and to said clock input line, and (ii) an output line connected to said sequencer circuit and having a first signal level when said counter circuit means has a selected count value and a second signal level otherwise
wherein said second counter circuit means requires that said first output line of said first circuit means have said first signal level as one condition for counting clock pulses on said clock input line.

16. The disk drive according to claim 15, further comprising a monitor circuit, operatively coupled to said second counter circuit means, for detecting a spin direction of said spin motor wherein upon said spin motor having a selected spin direction, a monitor circuit output signal resets said second counter circuit means.

17. The disk drive according to claim 16, wherein said monitor circuit comprises a spin motor phase voltage comparator circuit coupled to receive a BEMF signal.

18. The disk drive according to claim 16, wherein said monitor circuit is operatively coupled to said first counter circuit means wherein upon said spin motor having said selected spin direction, said monitor circuit output signal resets said first counter circuit means.

19. A disk drive according to any of claims 1-6 or 15-18, wherein said disk means has a diameter in the range of from about 45 mm to about 50 mm.

20. A disk drive according to claim 19, wherein said housing includes a second external dimension of about 70 mm.

21. A disk drive information storage device comprising:
 a housing;
 disk means for recording and reproducing information, said disk means having a diameter in the range of from about 45 mm to about 50 mm;
 a spin motor supported by said housing for rotating said disk means, said spin motor including a rotor for receiving said disk means and rotating said disk means about an axis;
 a start-up control circuit coupled to said spin motor, said start-up control circuit comprising:
 a BEMF commutation pulse input line for receiving a BEMF commutation pulse from a BEMF commutation circuit;
 counter circuit means having an input line, a count direction control terminal, and an output line;
  wherein said counter circuit means changes a count value in response to a signal on said input line;
  a start-up pulse is generated on said output line upon said count value equaling a predetermined value; and
  a signal on said direction control terminal determines the direction of change of said count value; and
 logic circuit means having (i) an input line coupled to said BEMF commutation pulse input line, (ii) an output line connected to said input line of said counter circuit means;
 counter direction control circuit having an input line connected to said BEMF commutation pulse input line and an output line connected to said count direction control terminal of said counter circuit means wherein upon start-up of said spin motor, said counter direction control circuit generates a signal having a first level on said output line;
  wherein upon start-up of said spin motor, said count value of said counter circuit means changes value in a first direction in response to each clock pulse generated on said output line by said logic circuit; and
  in response to said BEMF commutation pulse, said counter direction control circuit generates a signal providing a second level to said count direction control terminal of said counter circuit means so that said count value changes in a second direction different from said first direction thereby providing a smooth transition from a start-up mode to a BEMF commutation mode of said spin motor.

22. The disk drive according the claim 21, wherein said counter circuit means further comprises:
 a count value bus wherein said count value bus carries a signal representing said count value; and
 a count detector connected to said count value bus and to said counter circuit output line wherein said count detector generates said startup pulse upon detection of a selected count value.

23. The disk drive according to claim 21, wherein said counter circuit means further comprises:
 a count value bus wherein said count value bus carries a signal representing said count value; and
 a count detector having an input line connected to said count value bus and an output line connected to said logic circuit;
 wherein said count detector generates a signal on said output line upon detection of a selected count value; and
 said logic circuit, in response to said count detector output signal, inhibits generation of signals on said output line of said logic circuit.

24. The disk drive according to claim 23, wherein said startup control circuit further comprises sequencer circuit means having an input line coupled to said counter circuit output line wherein said sequencer circuit commutates a phase of said spin motor in response to said start-up pulse from said counter circuit means.

25. The disk drive according to claim 24, wherein said start-up control circuit further comprises a first pulse generator circuit having (i) an input line connected to said BEMF commutation pulse input line and (ii) an output line coupled to said sequencer circuit means wherein in response to said BEMF commutation pulse, said first pulse generator circuit generates a pulse on said output line.

26. The disk drive according to claim 25, wherein said counter direction control circuit comprises a second pulse generator circuit having (i) an input line connected to said BEMF commutation pulse input line and (ii) an output line connected to said count direction control terminal of said counter circuit means wherein said input line and output line of said second pulse generator are said input line and output line, respectively, of said counter direction control circuit.

27. A disk drive information storage device comprising:
 a housing;
 disk means for recording and reproducing information, said disk means having a diameter in the range of from about 45 mm to about 50 mm;
 a permanent magnet direct current spin motor supported by said housing for rotating said disk means, said spin motor including a rotor for receiving said disk means and rotating said disk means about an axis; and
 a circuit for blanking a BEMF commutation pulse for said spin motor, said circuit comprising:
  a sequencer circuit that commutates a phase of said spin motor;
  first circuit means having:
   a BEMF commutation pulse input line;
   a clock input line;
   first counter circuit means having (i) an input line operatively coupled to said BEMF commutation pulse input line and to said clock input line, (ii) a first output line having a first signal level when said counter circuit means has a selected count value and a second signal level otherwise, (iii) a second output line having said second signal level when said counter circuit has said selected count value and a first signal level otherwise;
   wherein said first counter circuit means counts clock pulses on said clock input line upon said second output line having said first signal level and a BEMF commutation pulse is received on said BEMF commutation pulse input line; and second circuit means having:
- an input line coupled to said first output line of said first circuit means;
- a clock input line;
- second counter circuit means having (i) an input line operatively coupled to said second circuit means input line and to said clock input line, and (ii) an output line connected to said sequencer circuit and having a first signal level when said counter circuit means has a selected count value and a second signal level otherwise
  - wherein said second counter circuit means requires that said first output line of said first circuit means have said first signal level as one condition for counting clock pulses on said clock input line.

28. The disk drive according to claim 27, further comprising a monitor circuit, operatively coupled to said second counter circuit means, for detecting a spin direction of said spin motor wherein upon said spin motor having a selected spin direction, a monitor circuit output signal resets said second counter circuit means.

29. The disk drive according to claim 28, wherein said monitor circuit comprises a spin motor phase voltage comparator circuit coupled to receive a BEMF signal.

30. The disk drive according to claim 28, wherein said monitor circuit is operatively coupled to said first counter circuit means wherein upon said spin motor having said selected spin direction, said monitor circuit output signal resets said first counter circuit means.

31. A disk drive according to any of claims 21–30, wherein said housing includes a first external dimension of about 51 mm and a second external dimension of about 70 mm.

* * * * *